United States Patent
Izumi

(10) Patent No.: US 10,911,781 B2
(45) Date of Patent: Feb. 2, 2021

(54) IMAGE PROCESSING DEVICE AND IMAGE PROCESSING METHOD FOR ENCODING/DECODING OMNIDIRECTIONAL IMAGES AT DIFFERENT RESOLUTIONS

(71) Applicant: SONY CORPORATION, Tokyo (JP)

(72) Inventor: Nobuaki Izumi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/540,609

(22) PCT Filed: Feb. 19, 2016

(86) PCT No.: PCT/JP2016/054835
§ 371 (c)(1),
(2) Date: Jun. 29, 2017

(87) PCT Pub. No.: WO2016/140083
PCT Pub. Date: Sep. 9, 2016

(65) Prior Publication Data
US 2018/0007387 A1  Jan. 4, 2018

(30) Foreign Application Priority Data

Mar. 5, 2015  (JP) .................................. 2015-043613
Jun. 12, 2015  (JP) .................................. 2015-119142

(51) Int. Cl.
*G06K 9/62* (2006.01)
*H04N 19/597* (2014.01)
(Continued)

(52) U.S. Cl.
CPC ............. *H04N 19/597* (2014.11); *G06T 9/00* (2013.01); *H04N 19/132* (2014.11);
(Continued)

(58) Field of Classification Search
CPC .............................. G06T 9/00; H04N 21/4728
(Continued)

(56) References Cited

U.S. PATENT DOCUMENTS

2004/0126085 A1* 7/2004 Braun .................. G11B 27/105
386/201
2014/0087867 A1 3/2014 Hightower
(Continued)

FOREIGN PATENT DOCUMENTS

| JP | 2001-298652 | 10/2001 |
| JP | 2002-312778 | 10/2002 |
| JP | 2006-014174 | 1/2006 |

OTHER PUBLICATIONS

Kimata, et al., 'Interactive Panorama Video Distribution System', 2011 Technical Symposium at ITU, Telecom World(ITU WT), Oct. 24-27, 2011, pp. 45-50, Geneva, CH.
(Continued)

*Primary Examiner* — Richard T Torrente
(74) *Attorney, Agent, or Firm* — Paratus Law Group, PLLC

(57) ABSTRACT

There is provided an image processing device and an image processing method for instantaneously displaying an image of a user's field of view. An encoder encodes a celestial sphere image of a cube formed by images of multiple planes generated from omnidirectional images, the encoding being performed plane by plane at a high resolution, to generate a high-resolution encoded stream corresponding to each of the planes. The encoder further encodes, at a low resolution, the celestial sphere image to generate a low-resolution encoded stream. The present disclosure may be applied, for example, to image display systems that generate a celestial sphere image so as to display an image of the user's field of view derived therefrom.

16 Claims, 32 Drawing Sheets

(51) Int. Cl.
| | |
|---|---|
| *H04N 21/4728* | (2011.01) |
| *G06T 9/00* | (2006.01) |
| *H04N 19/59* | (2014.01) |
| *H04N 19/39* | (2014.01) |
| *H04N 19/162* | (2014.01) |
| *H04N 19/132* | (2014.01) |
| *H04N 19/17* | (2014.01) |
| *H04N 19/177* | (2014.01) |
| *H04N 19/44* | (2014.01) |
| *H04N 21/2343* | (2011.01) |
| *H04N 21/4402* | (2011.01) |
| *H04N 21/81* | (2011.01) |
| *H04N 21/4223* | (2011.01) |

(52) U.S. Cl.
CPC ........... *H04N 19/162* (2014.11); *H04N 19/17* (2014.11); *H04N 19/177* (2014.11); *H04N 19/39* (2014.11); *H04N 19/44* (2014.11); *H04N 19/59* (2014.11); *H04N 21/23439* (2013.01); *H04N 21/44029* (2013.01); *H04N 21/4728* (2013.01); *H04N 21/816* (2013.01); *H04N 21/4223* (2013.01)

(58) Field of Classification Search
USPC .................................................. 375/244.26
See application file for complete search history.

(56) References Cited

U.S. PATENT DOCUMENTS

2016/0012855 A1* 1/2016 Krishnan ........... H04N 21/4728
386/241
2016/0112489 A1* 4/2016 Adams ................. H04L 65/607
375/240.01

OTHER PUBLICATIONS

Jul. 1, 2019, Chinese Office Action issued for related CN Application No. 201680012776.2.
Kimata et al., Panorama video coding for user-driven interactive video application, The 13th IEEE International Symposium on Consumer Electronics (ISCE2009), May 25-28, 2009, pp. 112-113, Kyoto, Japan.

* cited by examiner

FIG.16
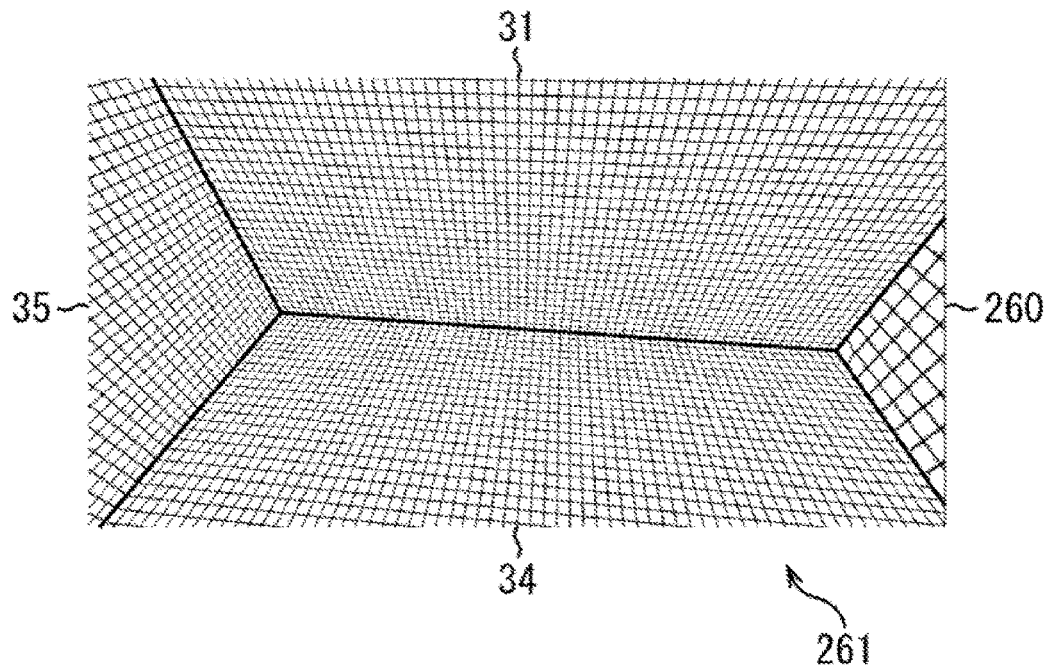
A
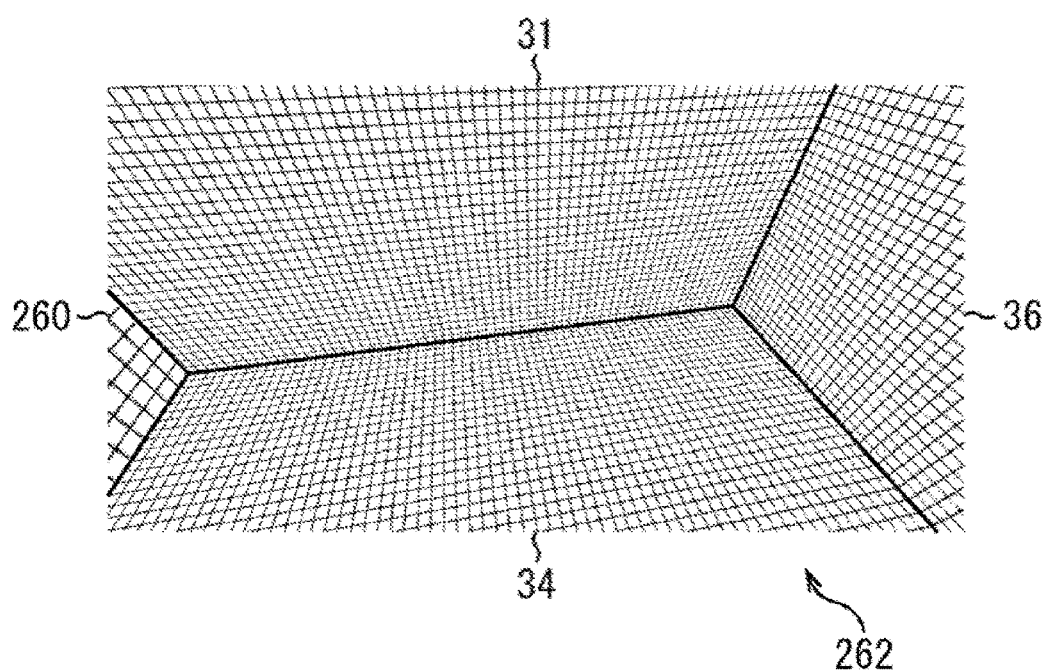
B

FIG. 30

| PATTERN | HIGH-RESOLUTION IMAGES | LOW-RESOLUTION IMAGES |
|---|---|---|
| 1 | CUBE MAPPING | EQUIDISTANT CYLINDRICAL PROJECTION |
| 2 | CUBE MAPPING | CUBE MAPPING |
| 3 | EQUIDISTANT CYLINDRICAL PROJECTION | EQUIDISTANT CYLINDRICAL PROJECTION |
| 4 | EQUIDISTANT CYLINDRICAL PROJECTION | CUBE MAPPING |
| 5 | CUBE MAPPING | NEW EQUIDISTANT CYLINDRICAL PROJECTION |
| 6 | NEW EQUIDISTANT CYLINDRICAL PROJECTION | NEW EQUIDISTANT CYLINDRICAL PROJECTION |
| 7 | NEW EQUIDISTANT CYLINDRICAL PROJECTION | CUBE MAPPING |

IMAGE PROCESSING DEVICE AND IMAGE PROCESSING METHOD FOR ENCODING/DECODING OMNIDIRECTIONAL IMAGES AT DIFFERENT RESOLUTIONS

CROSS REFERENCE TO PRIOR APPLICATION

This application is a National Stage Patent Application of PCT International Patent Application No. PCT/JP2016/054835 (filed on Feb. 19, 2016) under 35 U.S.C. § 371, which claims priority to Japanese Patent Application Nos. 2015-119142 (filed on Jun. 12, 2015) and 2015-043613 (filed on Mar. 5, 2015), which are all hereby incorporated by reference in their entirety.

TECHNICAL FIELD

The present disclosure relates to an image processing device and an image processing method. More particularly, the disclosure relates to an image processing device and an image processing method for instantaneously displaying an image of the field of view of a user.

BACKGROUND ART

There exist recording devices that generate, from omnidirectional images captured by a multi-camera apparatus, a celestial sphere image by having images of 360 degrees in the horizontal direction and of 180 degrees in the vertical direction mapped to two-dimensional (2D) images (planar images), the generated celestial sphere image being encoded and recorded (e.g., see PTL 1).

The above-mentioned type of recording device uses a method such as equidistant cylindrical projection or cube mapping by which three-dimensional (3D) images are mapped to 2D images in generating the celestial sphere image. Where equidistant cylindrical projection is used as the method for generating the celestial sphere image, the celestial sphere image is a sphere image formed by equidistant cylindrical projection from the captured images mapped to the sphere surface. Where cube mapping is used as the method for generating the celestial sphere image, the celestial sphere image is an expansion plan of a regular hexahedron (cube) whose planes are mapped with the captured images.

Meanwhile, there exist reproduction devices that decode encoded streams of the celestial sphere image recorded by the recording device and, using the celestial sphere image obtained by decoding, display an image of the user's field of view. This type of reproduction device pastes the celestial sphere image onto a 3D model such as a sphere or a cube as a texture on its surface. The reproduction device then displays an image of the user's field of view obtained by viewing the texture on the surface of the 3D model in the direction of a visual line vector of the user from a single point within the 3D model. This is how the captured images in the user's field of view are reproduced.

In the field of computer graphics (CG), the above method of reproduction is called an ambient light model. An ambient light model of which the sphere surface is pasted with images generated by equidistant cylindrical projection is called a sphere model. An ambient light model of which the cube surface is pasted with images generated by cube mapping is called a cube model.

The captured images in the user's field of view may be reproduced using only a specific region of the celestial sphere image that corresponds to the user's visual line vector. For example, if the viewing angle in the horizontal direction is 90 degrees, only one-fourth of the celestial sphere image mapped with omnidirectional images of 360 degrees in the horizontal direction is used in reproducing the captured images in the user's field of view. The same also applies to the vertical direction.

It follows that decoding the encoded streams of the entire celestial sphere image is often a wasteful process. However, since the visual line vector is determined by the user, the recording device cannot encode only the specific region of the celestial sphere image that corresponds to the visual line vector.

If the celestial sphere image is encoded by a common encoding method such as Moving Picture Experts Group phase 2 (MPEG2) or Advanced Video Coding (AVC)/H.264, the information regarding the entire screen is used for encoding. It is therefore difficult to decode, from among the encoded streams representing the celestial sphere image as a single image, only the encoded stream of the region corresponding to the user's visual line vector.

Thus, it has been proposed that the recording device have the celestial sphere image divided when encoded and that the reproduction device decode only the encoded stream of the divided region of the image corresponding to the user's visual line vector, so as to reduce the load of the decoding process (e.g., PTLS 2 and 3).

CITATION LIST

Patent Literatures

[PTL 1]
JP 2006-14174A
[PTL 2]
JP 2001-298652A
[PTL 3]
JP 2002-312778A

SUMMARY

Technical Problems

However, common encoding methods such as MPEG2 or AVC involve using chronological correlation in encoding. That means it is impossible to switch the encoded streams of the object to be decoded except in randomly accessible positions such as at the beginning of a group of pictures (GOP), in instantaneous decoding refresh (IDR) pictures, or at random access points. Because the efficiency of data compression increases the longer the interval between randomly accessible positions, it is difficult to sufficiently shorten that interval between the randomly accessible positions.

Thus, if the user's visual line vector is abruptly changed, it is impossible instantaneously to display the image of the user's field of view using the region of the celestial sphere image corresponding to the changed visual line vector. As a result, the image of the unchanged field of view may remain displayed, or part of the image of the changed field of view may not be displayed.

The present disclosure has been made in view of the above circumstances. An object of the disclosure is therefore to display the image of the user's field of view instantaneously.

Solution to Problems

According to a first aspect of the present disclosure, there is provided an image processing device including a first encoding section configured to encode a first celestial sphere image of a model formed by images of a plurality of planes generated from omnidirectional images, the encoding being performed plane by plane at a first resolution, to generate a first encoded stream corresponding to each of the planes; and a second encoding section configured to encode, at a second resolution, a second celestial sphere image generated from the omnidirectional images to generate a second encoded stream.

An image processing method according to the first aspect of the present disclosure corresponds to the image processing device according to the first aspect of the present disclosure.

According to the first aspect of the present disclosure, a first celestial sphere image of a model formed by images of a plurality of planes generated from omnidirectional images is divided into the planes and encoded plane by plane at a first resolution to generate a first encoded stream corresponding to each of the planes, and a second celestial sphere image generated from the omnidirectional images is encoded at a second resolution to generate a second encoded stream.

According to a second aspect of the present disclosure, there is provided an image processing device including a decoding section configured to decode, with respect to a first encoded stream generated by dividing a first celestial sphere image of a model formed by images of a plurality of planes generated from omnidirectional images into the planes and encoding the image plane by plane at a first resolution and a second encoded stream generated by encoding a second celestial sphere image generated from the omnidirectional images at a second resolution, the first encoded stream corresponding to one of each opposed pair of the planes to generate the first celestial sphere image of the corresponding plane at the first resolution.

An image processing method according to the second aspect of the present disclosure corresponds to the image processing device according to the second aspect of the present disclosure.

According to the second aspect of the present disclosure, with respect to a first encoded stream generated by dividing a first celestial sphere image of a model formed by images of a plurality of planes generated from omnidirectional images into the planes and encoding the image plane by plane at a first resolution and a second encoded stream generated by encoding a second celestial sphere image generated from the omnidirectional images at a second resolution, the first encoded stream corresponding to one of each opposed pair of the planes is decoded to generate the first celestial sphere image of the corresponding plane at the first resolution.

The image processing devices according to the first and the second aspects of the present disclosure may each be implemented by a computer that executes programs.

The programs to be executed by the computer to implement the image processing devices according to the first and the second aspects of the present disclosure may be either transmitted via transmission media or recorded on recording media when offered.

The image processing devices according to the first and the second aspects of the present disclosure may each be an independent device or one or more of the internal blocks constituting a single device.

Advantageous Effects of Invention

According to the first aspect of the present disclosure, the celestial sphere image is encoded. Also according to the first aspect of the present disclosure, it is possible to generate encoded streams for instantaneously displaying the image of the user's field of view.

According to the second aspect of the present disclosure, the encoded streams of the celestial sphere image are decoded. Also according to the second aspect of the present disclosure, it is possible instantaneously to display the image of the user's field of view.

The advantageous effects outlined above are not limitative of the present disclose. Further advantages of the disclosure will become apparent from the ensuing description.

BRIEF DESCRIPTION OF DRAWINGS

FIG. 16 is a schematic view explanatory of cube images generated by a mapping processing section included in FIG. 13.

FIG. 30 is a schematic view explanatory of methods for generating a celestial sphere image corresponding to high-resolution and low-resolution images according to the present disclosure.

DESCRIPTION OF EMBODIMENTS

Described below are the prerequisites of the present disclosure and the modes for carrying out the disclosure (called the embodiments hereunder). The description will be given under the following headings:

0. Prerequisites of the present disclosure (FIGS. 1 to 8)

1. First embodiment: image display system (FIGS. 9 to 19)

2. Second embodiment: image display system (FIGS. 20 to 28)

Figure 29:
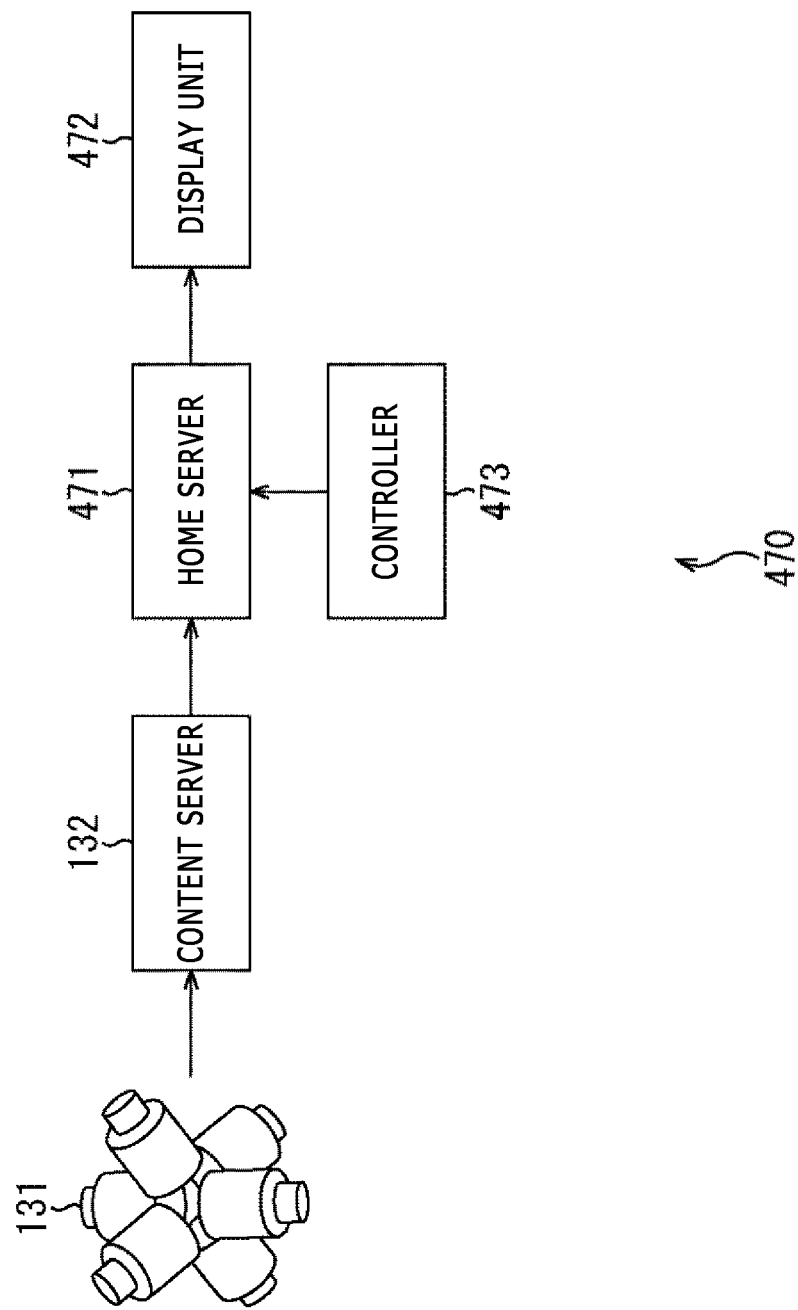
FIG. 29 is a block diagram depicting a typical configuration of an image display system as a third embodiment of the present disclosure.

3. Third embodiment: image display system (FIG. 29)

Figure 31:
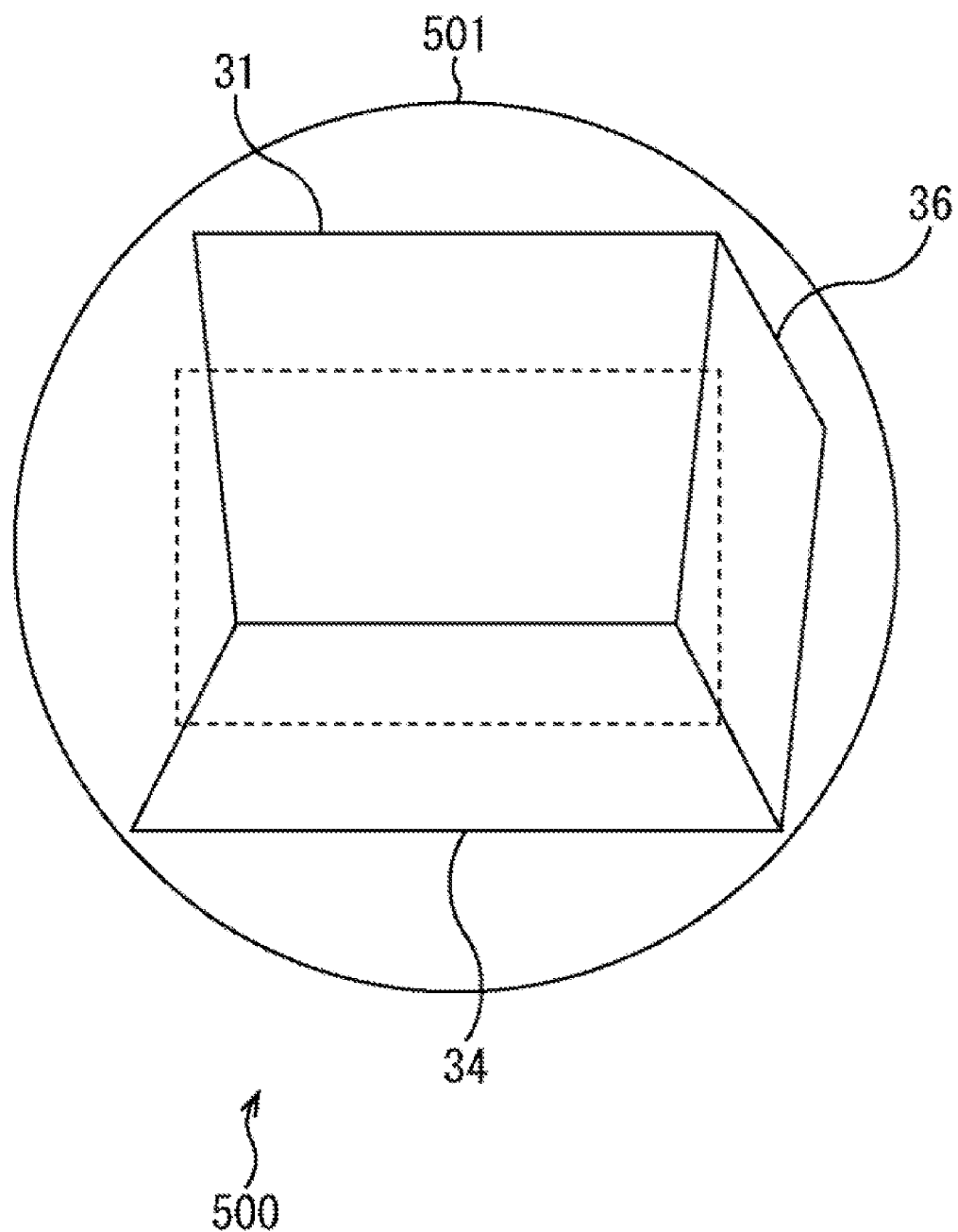
FIG. 31 is a schematic view depicting an image of a sphere mapped by the home server according to a first pattern.

4. Explanation of the method for generating a celestial sphere image corresponding to high-resolution and low-resolution images (FIGS. 30 and 31)

Figure 32:
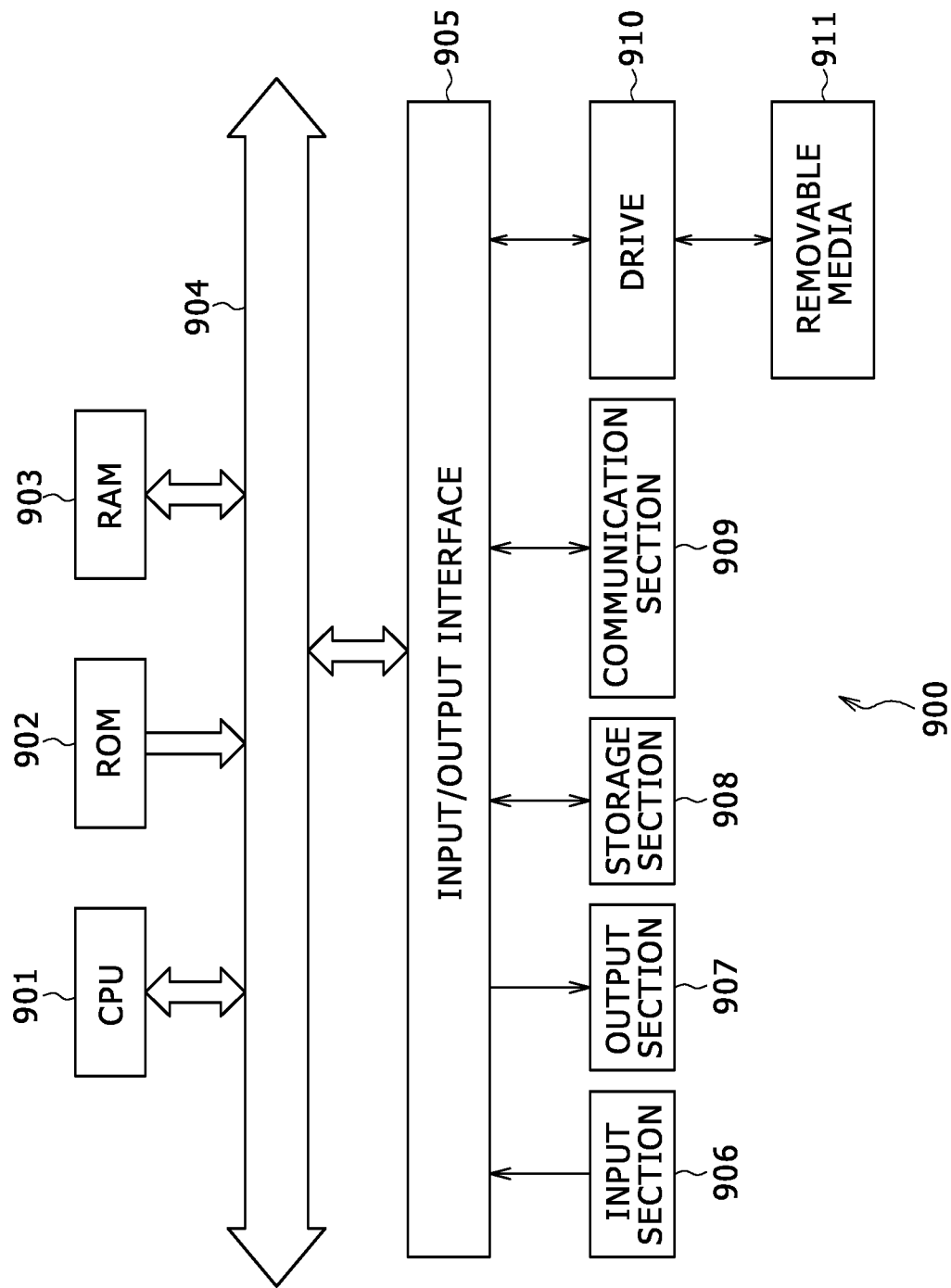
FIG. 32 is a block diagram depicting a typical hardware structure of a computer.

5. Fourth embodiment: computer (FIG. 32)

<Prerequisites of the Present Disclosure>

(Explanation of Cube Mapping)

Figure 1:
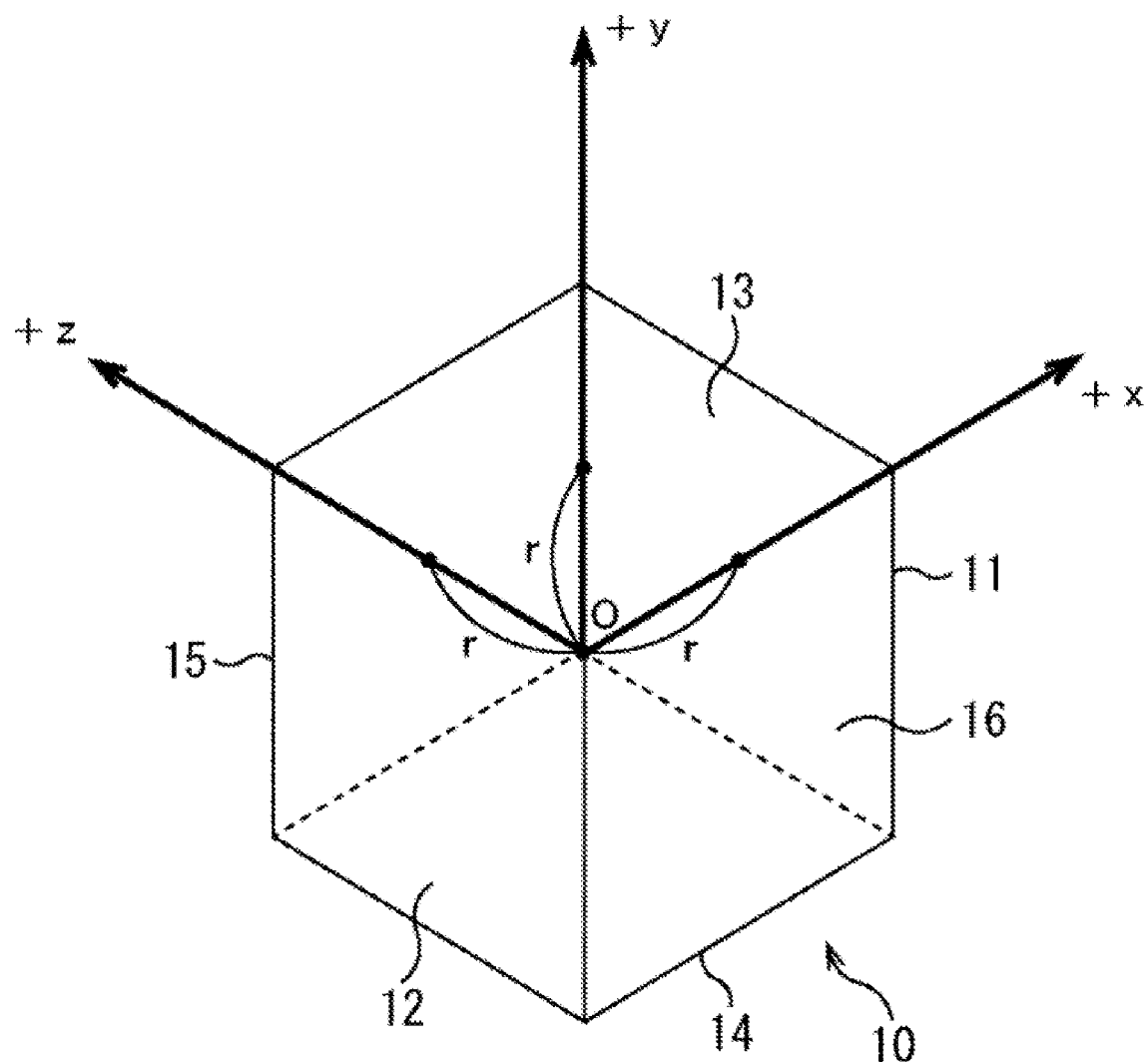
FIG. 1 is a perspective view depicting a cube as a 3D model.

FIG. 1 is a perspective view depicting a cube as a 3D model to which images are mapped by cube mapping used as the method for generating a celestial sphere image.

As depicted in FIG. 1, when cube mapping is used as the method for generating a celestial sphere image, the image is mapped to six planes 11 to 16 constituting a cube 10.

In this description, an axis that passes through origin O as the center of the cube 10 and intersects perpendicularly with planes 11 and 12 is called the x axis; an axis that intersects perpendicularly with planes 13 and 14 is called the y axis; and an axis that intersects perpendicularly with planes 15 and 16 is called the z axis. The plane 11 such that x=r where r denotes the distance from the origin O to each of the planes 11 to 16 is called the +x plane 11 and the plane 12 such that x=−r is called the −x plane 12 as needed. Likewise, the plane 13 such that y=r is called the +y plane 13; the plane 14 such that y=−r is called the −y plane 14; the plane 15 such that z=r is called the +z plane 15; and the plane 16 such that z=−r is called the −z plane 16 as needed.

The +x plane 11 is opposed to the −x plane 12, the +y plane 13 to the −y plane 14, and the +z plane 15 to the −z plane 16.

Figure 2:
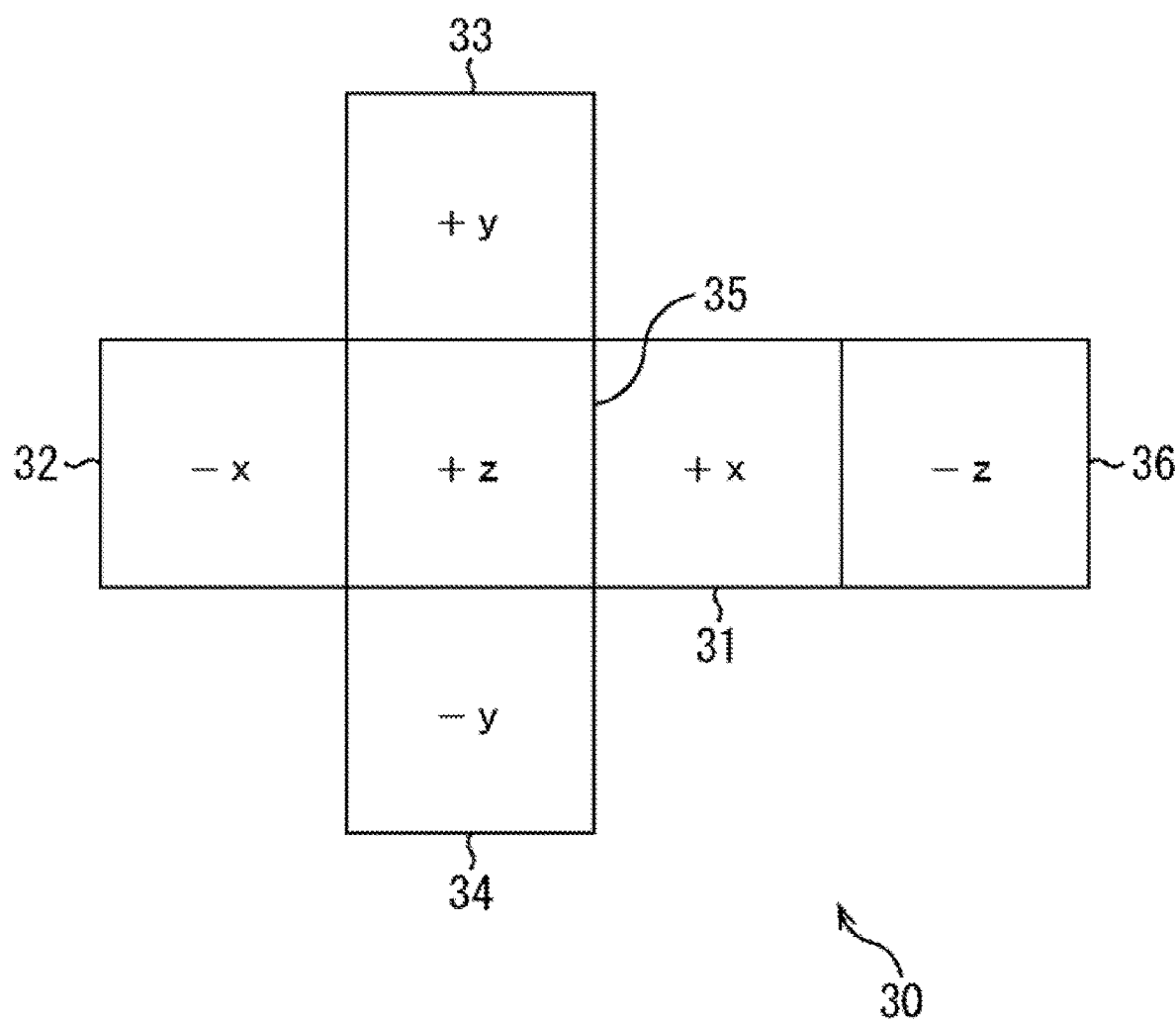
FIG. 2 is a schematic view depicting a typical celestial sphere image generated by cube mapping.

FIG. 2 is a schematic view depicting a typical celestial sphere image generated by cube mapping.

As depicted in FIG. 2, a celestial sphere image 30 generated by cube mapping is an expansion plan image of the cube 10. Specifically, the celestial sphere image 30 is made up of an image 32 of the −x plane 12, an image 35 of the +z plane 15, an image 31 of the +x plane 11, and an image 36 of the −z plane 16 arranged from left to right at the center of the drawing, the image 35 being topped by an image 33 of the +y plane 13 and having an image 34 of the −y plane 14 disposed immediately below.

Figure 3:
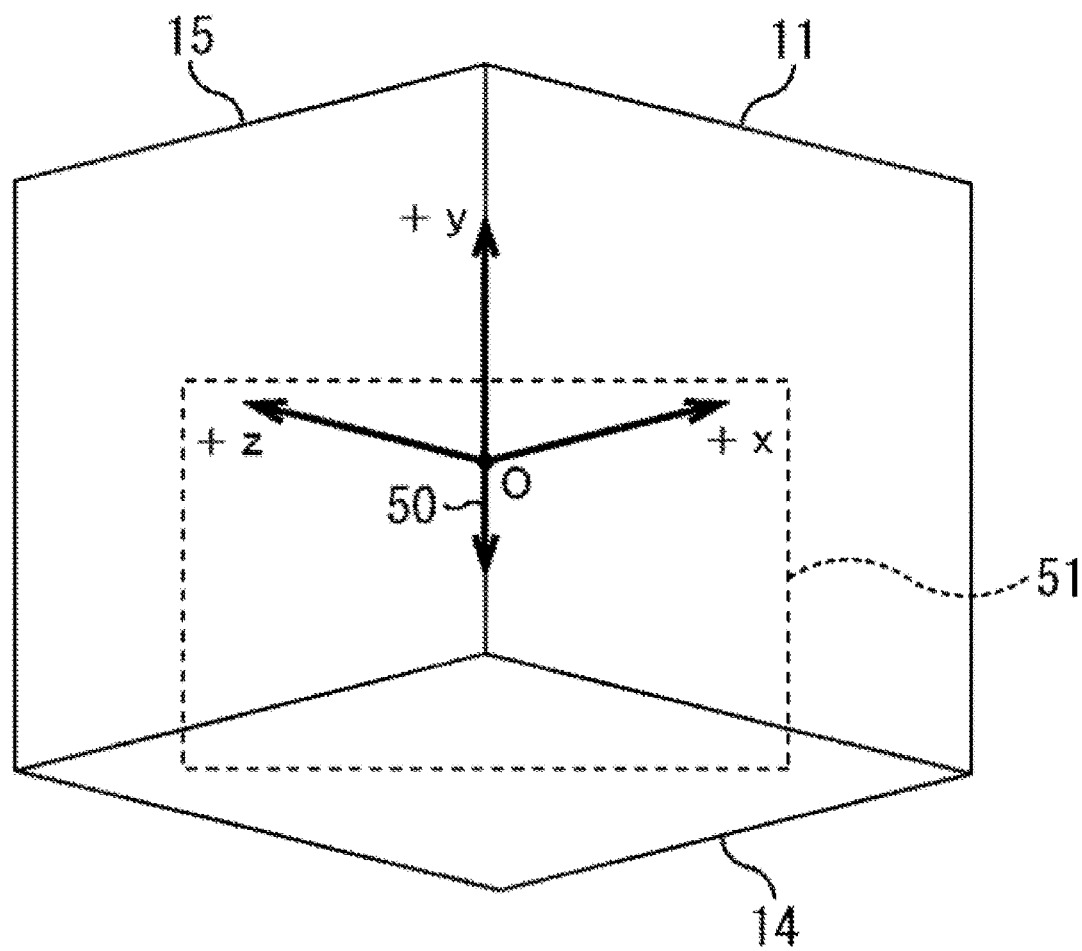
FIG. 3 is a schematic view depicting a typical image of a user's field of view generated by use of the celestial sphere image in FIG. 2.

FIG. 3 is a schematic view depicting a typical image of a user's field of view generated by use of the celestial sphere image 30 in FIG. 2.

In the example of FIG. 3, a user's visual line vector 50 is directed from the origin O down the side where the +x plane 11 and +z plane 15 are in contact with each other (i.e., a vector in the visual line direction).

In that case, an image of a user's field of view 51 may be generated using the image 31 of the +x plane 11, the image 34 of the −y plane 14, and the image 35 of the +z plane 15. That is, the planes corresponding to the user's visual line vector 50 are the +x plane 11 such that the sign of the x axis component of the visual line vector 50 and the sign of the x axis coordinate are the same, the −y plane 14 such that the sign of the y axis component and the sign of the y axis coordinate are the same, and the +z plane 15 such that the sign of the z axis component and the sign of the z axis coordinate are the same.

In this description, of each pair of the opposed planes making up the celestial sphere image, the plane that can be used to generate an image of the user's field of view is called a plane corresponding to the user's visual line vector.

Figure 4:
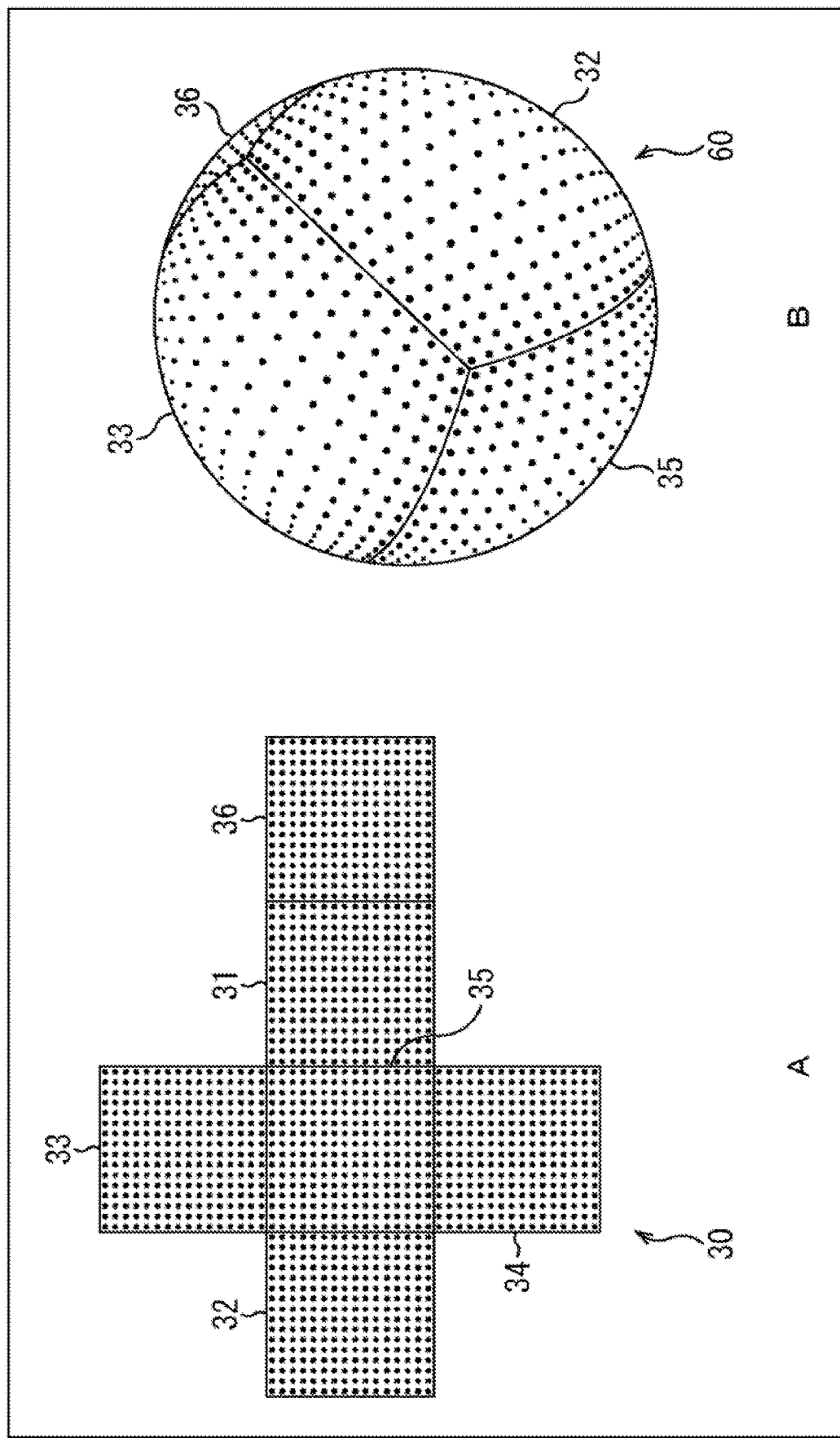
FIG. 4 is a schematic view depicting the distribution of pixels in the celestial sphere image in FIG. 2.

FIG. 4 is a schematic view depicting the distribution of pixels in the celestial sphere image 30 in FIG. 2.

In FIG. 4, each point represents the center of a pixel.

As depicted in A of FIG. 4, the centers of the pixels making up the celestial sphere image 30 are arranged at equal distances apart horizontally and vertically. In addition, as depicted in B of FIG. 4, when the celestial sphere image 30 is mapped to the surface of a sphere 60, the centers of the pixels constituting the mapped celestial sphere image 30 are arranged at short distances apart. That is, pixel density varies little throughout the celestial sphere image 30 mapped to the surface of the sphere 60. As a result, the celestial sphere image 30 has good image quality.

(Explanation of Equidistant Cylindrical Projection)

Figure 5:
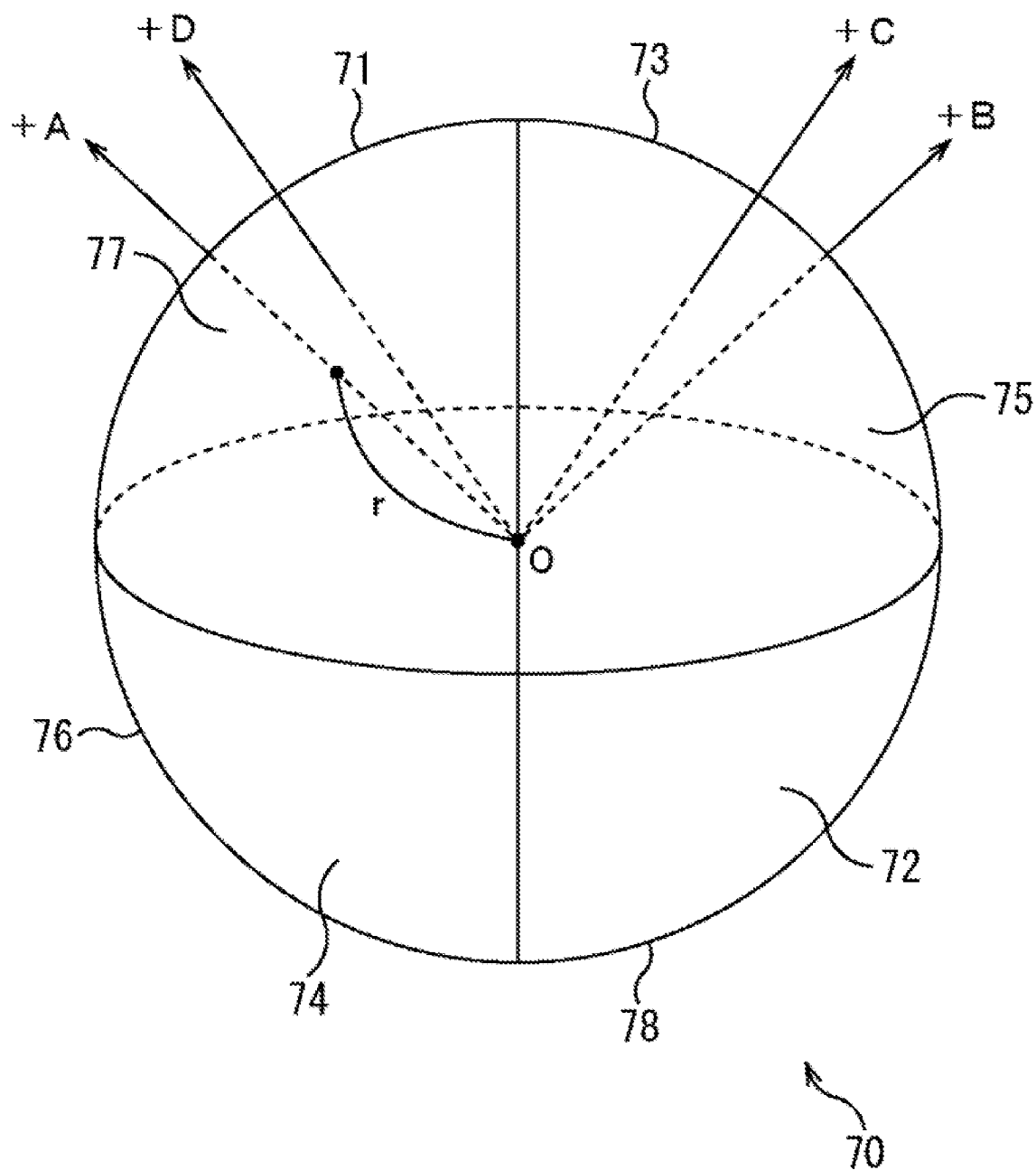
FIG. 5 is a perspective view depicting a sphere as a 3D model.

FIG. 5 is a perspective view depicting a sphere as a 3D model to which a celestial sphere image generated by equidistant cylindrical projection is mapped.

As depicted in FIG. 5, where equidistant cylindrical projection is used as the method for generating a celestial sphere image, the image is mapped to the surface of a sphere 70. The surface of the sphere 70 may be divided, for example, into eight planes 71 to 78 of the same size and shape.

In this description, an axis passing through origin O as the center of the sphere 70, the center of the plane 71, and the center of the plane 72 is called the A axis; an axis passing through the center of the plane 73 and the center of the plane 74 is called the B axis; an axis passing through the center of the plane 75 and the center of the plane 76 is called the C axis; and an axis passing through the center of the plane 77 and the center of the plane 78 is called the D axis. The plane 71 such that A=r where r denotes the distance from the origin O to each of the planes 71 to 78 is called the +A plane 71 and the plane 72 such that A=−r is called the −A plane 72 as needed. Likewise, the plane 73 such that B=r is called +B plane 73; the plane 74 such that B=−r is called the −B plane 74; the plane 75 such that C=r is called the +C plane 75; the plane 76 such that C=−r is called the −C plane 76; the plane 77 such that D=r is called the +D plane 77; and the plane 78 such that D=−r is called the −D plane 78 as needed.

The +A plane 71 is opposed to the −A plane 72, the +B plane 73 to the −B plane 74, the +C plane 75 to the −C plane 76, and the +D plane 77 to the −D plane 78.

Figure 6:
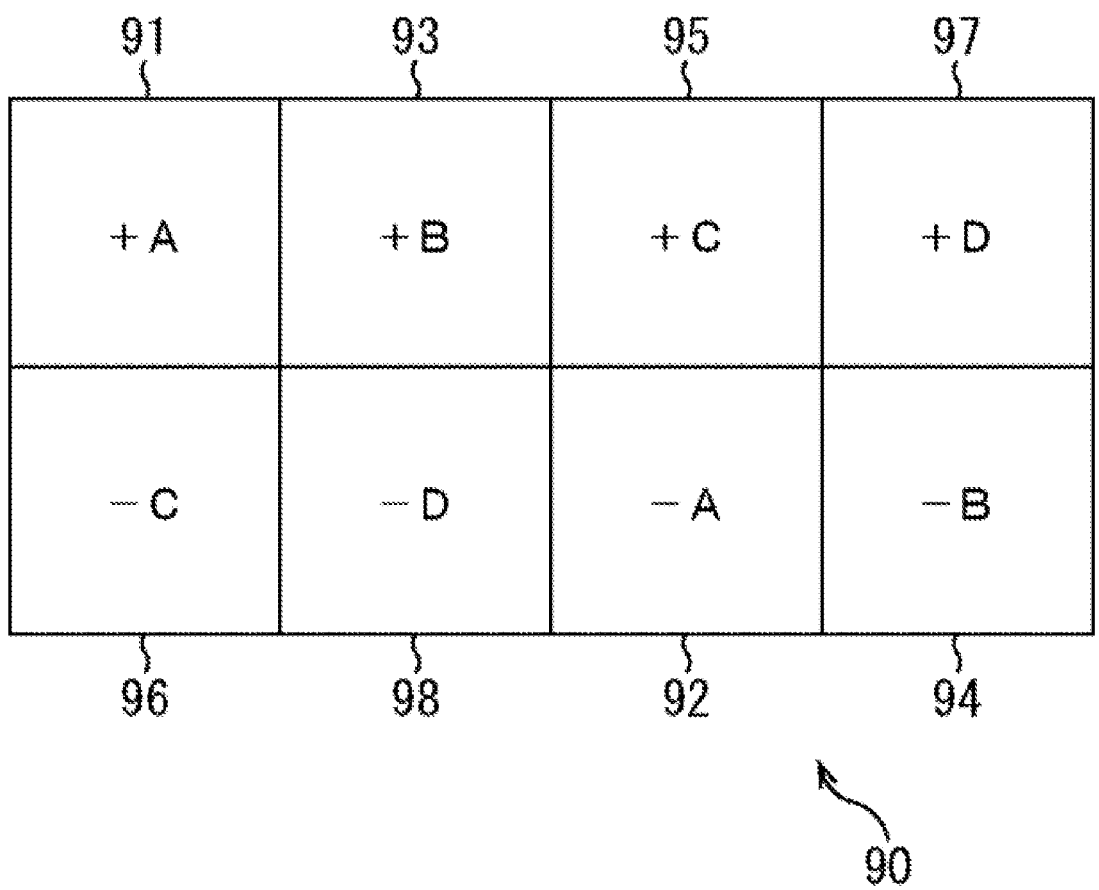
FIG. 6 is a schematic view depicting a typical celestial sphere image generated by equidistant cylindrical projection.

FIG. 6 is a schematic view depicting a typical celestial sphere image generated by equidistant cylindrical projection.

As depicted in FIG. 6, a celestial sphere image 90 generated by equidistant cylindrical projection is generated by equidistant cylindrical projection using the sphere 70. That is, the horizontal and vertical coordinates of the celestial sphere image 90 correspond to the longitude and latitude, respectively, of the sphere 70 when it represents the earth.

Specifically, the celestial sphere image 90 is made up of an image 91 of the +A plane 71, an image 93 of the +B plane 73, an image 95 of the +C plane 75, and an image 97 of the +D plane 77 arranged from left to right in the upper row; and an image 96 of the −C plane 76, an image 98 of the −D plane 78, an image 92 of the −A plane 72, and an image 94 of the −B plane 74 arranged from left to right in the lower row.

Figure 7:
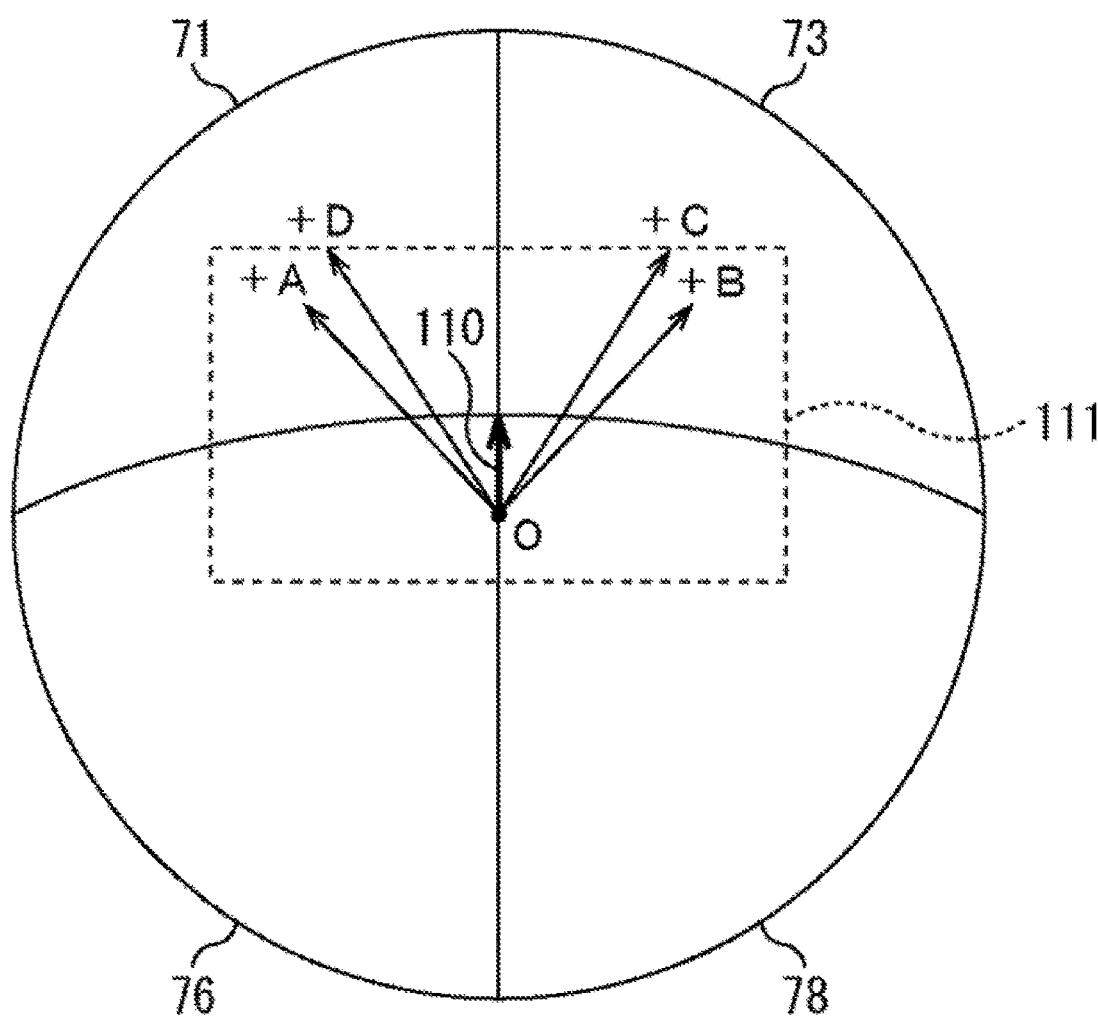
FIG. 7 is a schematic view depicting a typical image of a user's field of view generated by use of the celestial sphere image in FIG. 6.

FIG. 7 is a schematic view depicting a typical image of the user's field of view generated by use of the celestial sphere image 90 in FIG. 6.

In the example of FIG. 7, a user's visual line vector 110 is directed from the origin O to the points of intersection with the +A plane 71, +B plane 73, −C plane 76, and −D plane 78.

In that case, an image of a user's field of view 111 may be generated using the image 91 of the +A plane 71, the image 93 of the +B plane 73, the image 96 of the −C plane 76, and the image 98 of the −D plane 78. That is, the planes corresponding to the user's visual line vector 110 are the +A plane 71 such that the sign of the A axis component of the visual line vector 110 and the sign of the A axis coordinate are the same, the +B plane 73 such that the sign of the B axis component and the sign of the B axis coordinate are the same, the −C plane 76 such that the sign of the C axis component and the sign of the C axis coordinate are the same, and the −D plane 78 such that the sign of the D axis component and the sign of the D axis coordinate are the same.

Figure 8:
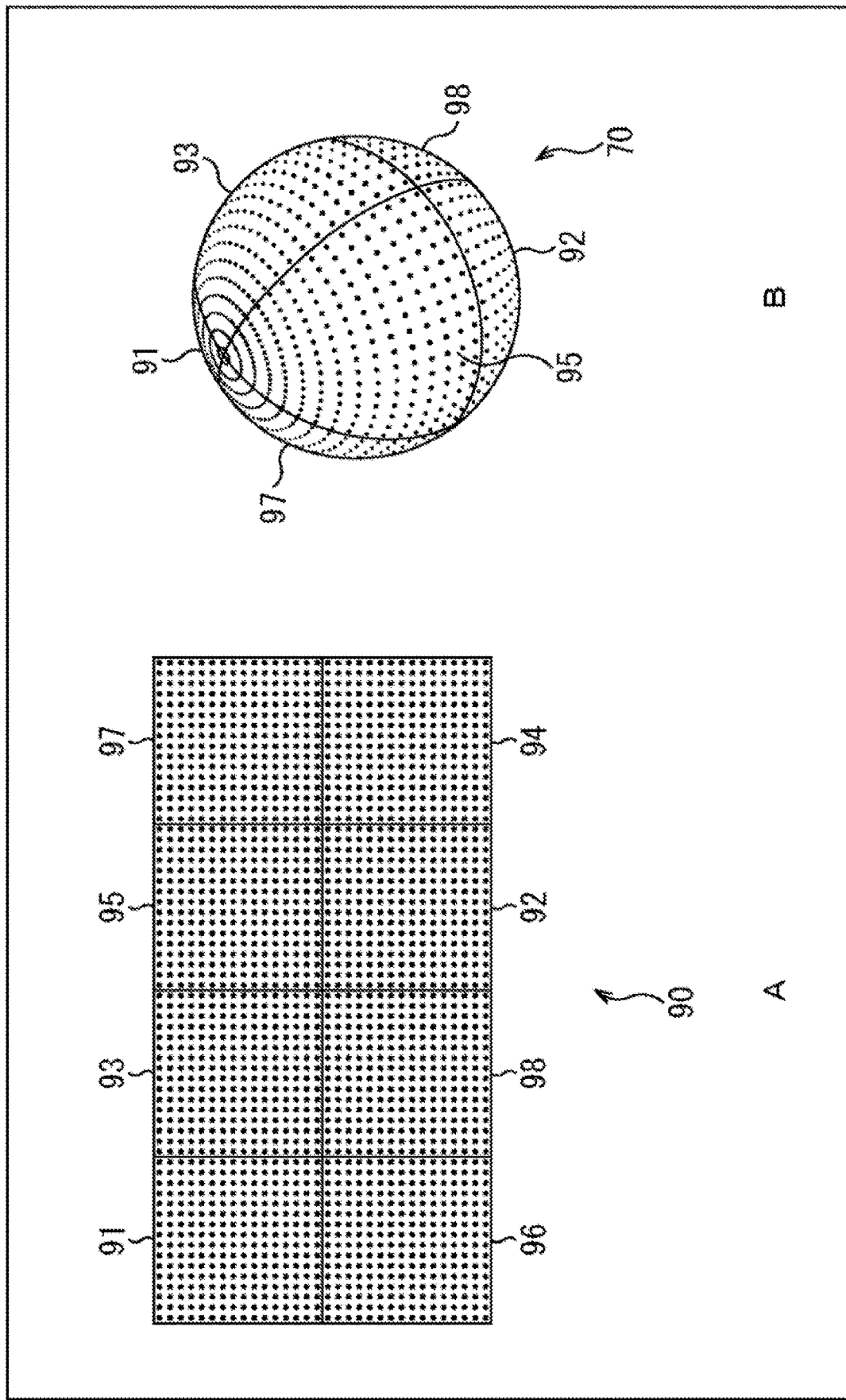
FIG. 8 is a schematic view depicting the distribution of pixels in the celestial sphere image in FIG. 6.

FIG. 8 is a schematic view depicting the distribution of pixels in the celestial sphere image 90 in FIG. 6.

In FIG. 8, each point represents the center of a pixel.

As depicted in A of FIG. 8, the centers of the pixels making up the celestial sphere image 90 are arranged at equal distances apart horizontally and vertically. In addition, as depicted in B of FIG. 8, when the celestial sphere image 90 is mapped to the surface of the sphere 70, each of the images 91 to 98 making up the mapped celestial sphere image 90 is approximately triangular in shape. That is, the upper portions of the images 91, 93, 95, and 97 are contracted toward the upper pole of the sphere 70, and the lower portions of the images 92, 94, 96, and 98 are contracted toward the lower pole of the sphere 70. Thus, the density of the pixels near the poles is very high.

Generally, the higher the density of the pixels constituting an object, the higher its resolution, so that the object is reproduced down to high-frequency components. Furthermore, the object with high pixel density is assigned numerous bits when encoded, so that its image quality is enhanced. However, because the human beings usually look horizontally, objects of interest are often found in the horizontal direction. It follows that in the celestial sphere image 90, objects near the upper and lower poles are often not very important.

Equidistant cylindrical projection has been used extensively as the method for generating the celestial sphere image especially where moving images are involved. One reason for the extensive use of equidistant cylindrical projection is that the latitude and longitude of the sphere 70 correspond directly to the x and y coordinates of the celestial sphere image 90 in its rectangular form, which facilitates coordinate transformation. Another reason is that the rectangular form of the celestial sphere image 90 has no discontinuities inside, which is amenable to common encoding methods for processing rectangular images.

However, the celestial sphere image 90 generated by equidistant cylindrical projection has high resolution in the images of relatively unimportant objects mapped near the upper and lower poles of the sphere 70 as discussed above. These images are assigned numerous bits when encoded.

By contrast, the celestial sphere image 30 generated by cube mapping has substantially constant pixel density when mapped to the sphere 60. Also, the number of the planes corresponding to the user's visual line vector is smaller than that in equidistant cylindrical projection. Furthermore, the images 31 to 36 divided from the celestial sphere image 30 are each a square, which is amenable to common encoding methods for processing rectangular images.

However, since the celestial sphere image 30 is cross-shaped, calculating the visual line vector is more complicated than in equidistant cylindrical projection. When the celestial sphere image 90 is converted to the celestial sphere image 30 and encoded, pixel shift incurs conversion distortion. This leads to lower image quality than if the celestial sphere image 90 is encoded without conversion.

Thus, the present technology is aimed at making substantially uniform the density of the pixels in the celestial sphere image generated by equidistant cylindrical projection and mapped to a sphere.

As described above, the image of the user's field of view is generated using only the images of the planes corresponding to the user's visual line vector out of the celestial sphere image 30 (90). With this taken into account, it has been proposed that the planes constituting the celestial sphere image 30 (90) be encoded plane by plane so that only the encoded streams of the images of the planes corresponding to the user's visual line vector may be decoded in order to reduce the decoding load.

However, common encoding methods such as MPEG or AVC involve using chronological correlation in encoding. That means it is impossible to switch the encoded streams of a decoding target object except in randomly accessible positions. Thus, if the user's visual line vector is abruptly changed, it is impossible instantaneously to display the image of the user's field of view using the images of the planes corresponding to the changed visual line vector.

The present technology is designed in such a manner that if the user's visual line vector is abruptly changed, the image of the user's field of view can be instantly displayed using the images of the planes corresponding to the changed visual line vector.

First Embodiment (Typical Configuration of the Image Display System as the First Embodiment)

Figure 9:
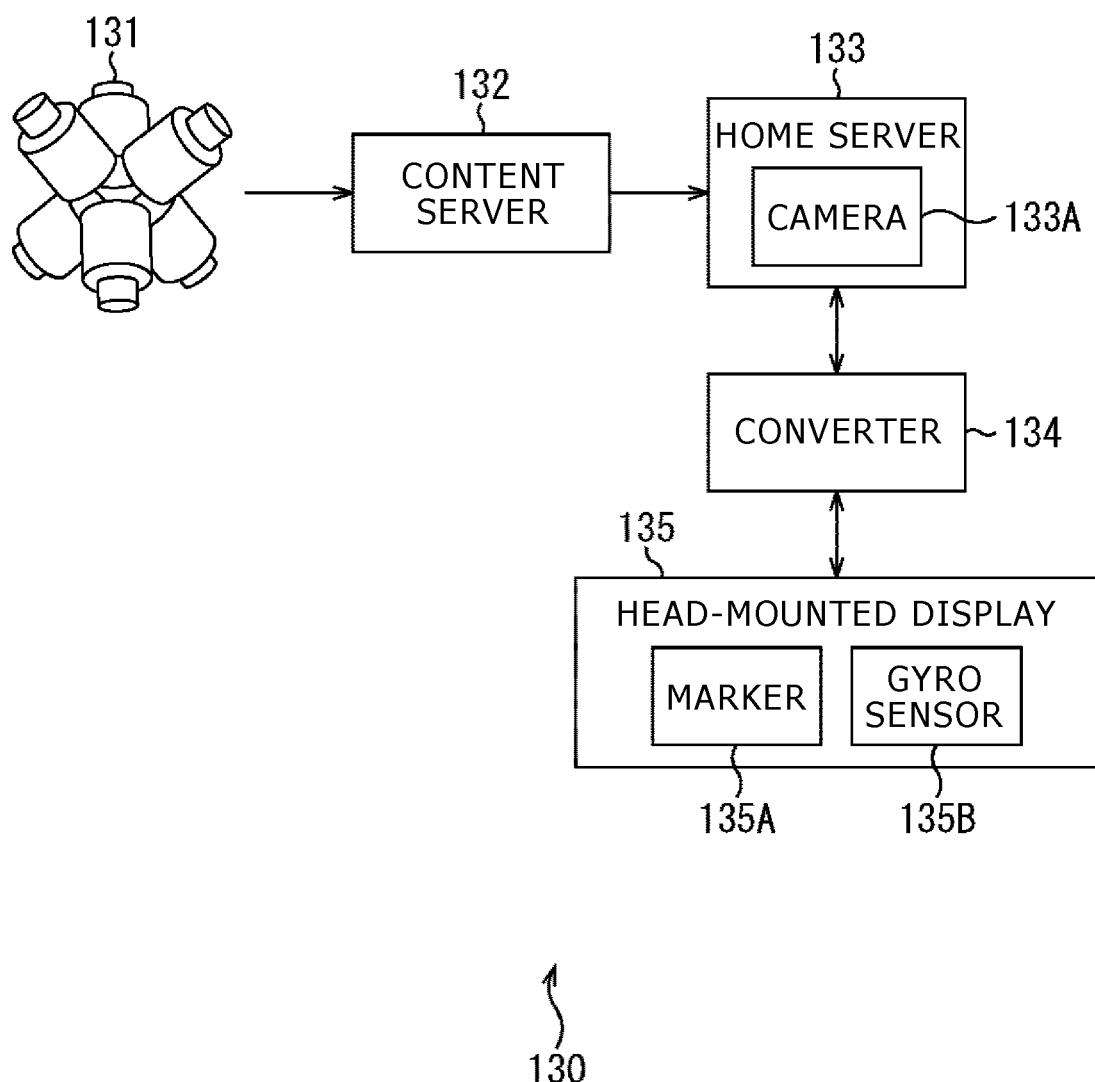
FIG. 9 is a block diagram depicting a typical configuration of an image display system as a first embodiment of the present disclosure.

FIG. 9 is a block diagram depicting a typical configuration of an image display system as the first embodiment of the present disclosure.

An image display system 130 in FIG. 9 is made up of a multi-camera apparatus 231, a content server 132, a home server 133, a converter 134, and a head-mounted display 135. The image display system 130 generates the celestial sphere image 30 from images captured by the multi-camera apparatus 131 and displays the image of the user's field of view derived from the generated celestial sphere image 30.

Specifically, the multi-camera apparatus 131 in the image display system 130 is constituted by multiple cameras. The cameras capture images individually to form omnidirectional images in units of frames. The multi-camera apparatus 131 supplies the captured omnidirectional images to the content server 132.

From the captured images supplied by the multi-camera apparatus 131, the content server 132 generates the celestial sphere image 30 using cube mapping. The content server 132 down-converts the celestial sphere image 30. The content server 132 further divides the celestial sphere image 30 into images of six planes 11 to 16. This generates two kinds of images: high-resolution images of the planes 11 to 16 yet to be down-converted, and a low-resolution image of the entire celestial sphere image 30 having been down-converted.

The content server 132 compression-encodes each of the high-resolution images of the planes 11 to 16 using an encoding method under AVC or High Efficiency Video Coding (HEVC)/H.265, thereby generating six nigh-resolution encoded streams (first encoded streams). The content server 132 further compression-encodes the low-resolution image using an encoding method also under AVC or HEVC to generate one low-resolution encoded stream (second encoded stream).

The content server 132 records the six high-resolution encoded streams and one low-resolution encoded stream thus generated. Also, the content server 132 transmits the recorded six high-resolution encoded streams and one low-resolution encoded stream to the home server 133 via a network, not depicted.

The home server 133 receives the six high-resolution encoded streams and one low-resolution encoded stream transmitted from the content server 132. Using an internal camera 133A, the home server 133 captures an image of a marker 135A attached to the head-mounted display 135. Based on the captured image of the marker 135A, the home-server 133 detects the position of the user. From the head-mounted display 135, the home server 133 receives the result of detection by a gyro sensor 135B in the head-mounted display 135 via the converter 134.

On the basis of the result of detection by the gyro sensor 135B, the home server 133 determines the user's visual line vector. Based on the position and visual line vector of the user, the home server 133 determines the user's field of view.

The home server 133 determines three planes corresponding to the user's visual line vector from among the planes 11 to 16. From the six high-resolution encoded streams, the home server 133 (image processing device or terminal) selects and decodes the high-resolution encoded streams of the three planes corresponding to the user's visual line vector, thus generating high-resolution images of the three planes.

The home server 133 also decodes the one low-resolution encoded stream to generate a low-resolution image. From the high-resolution images of the three planes and the low-resolution image thus generated, the home server 133 generates an image of the user's field of view as a display image. The home server 133 transmits the display image to the converter 134 via a High-Definition Multimedia Interface (HDMI; registered trademark) cable, not depicted.

The converter 134 converts the coordinates in the display image transmitted from the home server 133 into the coordinates of the head-mounted display 135. The converter 134 supplies the display image with the converted coordinates to the head-mounted display 135.

The head-mounted display 135 is worn on the user's head. The head-mounted display 135 displays the display image supplied from the converter 134. The gyro sensor 135B inside the head-mounted display 135 detects the inclination of the head-mounted display 135 and transmits the result of the detection to the home server 133 via the converter 134.

(Typical Structure of the Content Server)

Figure 10:
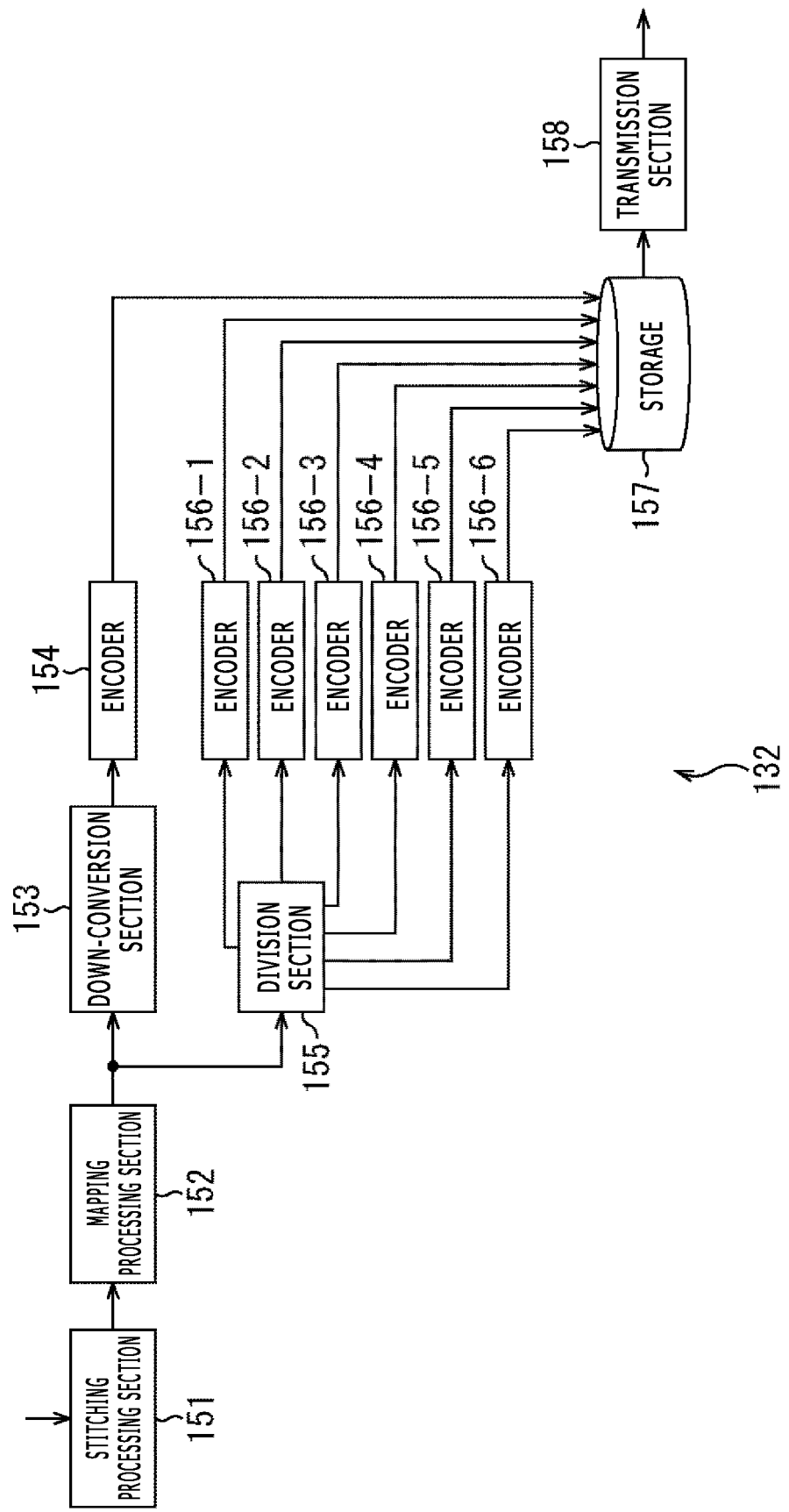
FIG. 10 is a block diagram depicting a typical structure of a content server included in FIG. 9.

FIG. 10 is a block diagram depicting a typical structure of the content server 132 included in FIG. 9.

The content server 132 in FIG. 10 is made up of a stitching processing section 151, a mapping processing section 152, a down-conversion section 153, an encoder 154, a division section 155, encoders 156-1 to 156-6, storage 157, and a transmission section 158.

The stitching processing section 151 makes uniform in color and brightness the captured omnidirectional images supplied from the multi-camera apparatus 131 in FIG. 9, and stitches the images together with no overlaps therebetween. The stitching processing section 151 supplies the mapping processing section 152 with the captured images thus obtained.

The mapping processing section 152 generates by cube mapping the celestial sphere image 30 from the captured images supplied by the stitching processing section 151. The mapping processing section 152 supplies the celestial sphere image 30 thus generated to the down-conversion section 153 and division section 155. Incidentally, the stitching processing section 151 and the mapping processing section 152 may be integrally formed.

The down-conversion section 153 (conversion section) generates a low-resolution image by halving horizontally and vertically the resolution of the celestial sphere image 30 supplied from the mapping processing section 152. The down-conversion section 153 supplies the low-resolution image to the encoder 154.

The encoder 154 (second encoding section) encodes the low-resolution image supplied from the down-conversion section 153 to generate a low-resolution encoded stream. The encoder 154 supplies the low-resolution encoded stream to the storage 157 for recording therein.

The division section 155 divides the celestial sphere image 30 supplied from the mapping processing section 152 into images 31 to 36 of six planes 11 to 16. The division section 155 supplies the image 31 as a high-resolution image of the +x plane 11 to the encoder 156-1 and the image 32 as a high-resolution image of the −x plane 12 to the encoder 156-2. The division section 155 also supplies the image 33 as a high-resolution image of the +y plane 13 to the encoder 156-3 and the image 34 as a high-resolution image of the −y plane 14 to the encoder 156-4. The division section 155 further supplies the image 35 as a high-resolution image of the +z plane 15 to the encoder 156-5 and the image 36 as a high-resolution image of the −z plane 16 to the encoder 156-6.

The encoders 156-1 to 156-6 (first encoding sections) encode the high-resolution images supplied from the division section 155 in such a manner that the opposed pairs of the planes 11 to 16 are synchronized in randomly accessible positions and that the planes are arranged into a closed group-of-pictures (GOP) structure. The encoders 156-1 to 156-6 supply the high-resolution encoded streams of the planes 11 to 16 thus generated to the storage 157 for recording therein.

The storage 157 (storage section) records one low-resolution encoded stream supplied from the encoder 154 and six high-resolution encoded streams of the planes 11 to 16 supplied from the encoders 156-1 to 156-6.

The transmission section 158 (delivery section) reads the one low resolution encoded stream and six high-resolution encoded streams stored in the storage 157 and transmits (delivers) the retrieved streams to the home server 133 in FIG. 9 via the network, not depicted.

(Typical Structure of the Encoder)

Figure 11:
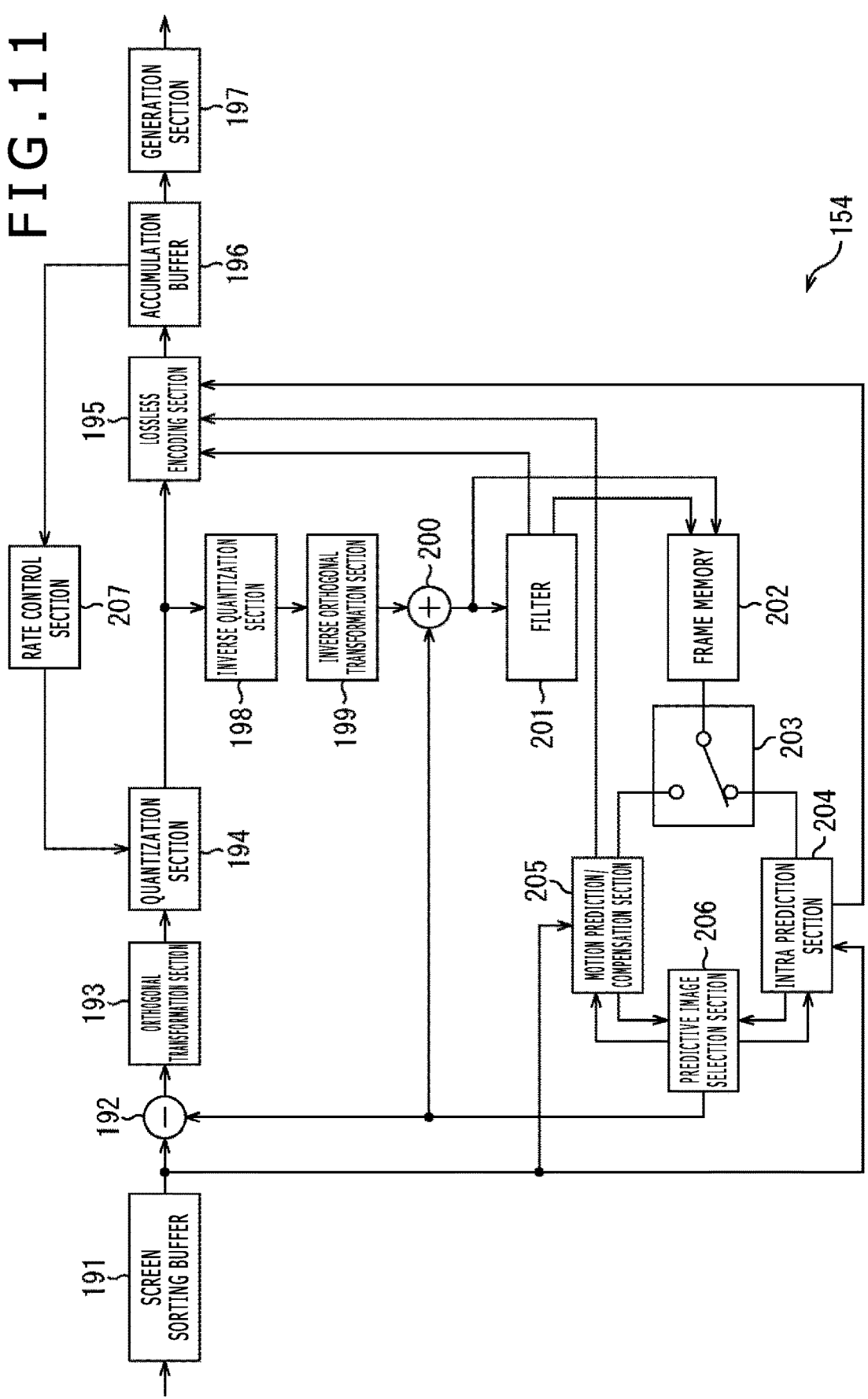
FIG. 11 is a block diagram depicting a typical structure of an encoder included in FIG. 10.

FIG. 11 is a block diagram depicting a typical structure of the encoder 154 included in FIG. 10.

The encoder 154 in FIG. 11 includes a screen sorting buffer 191, an arithmetic section 192, an orthogonal transformation section 193, a quantization section 194, a lossless encoding section 195, an accumulation buffer 196, a generation section 197, an inverse quantization section 198, an inverse orthogonal transformation section 199, and an addition section 200. The encoder 154 further includes a filter 201, a frame memory 202, a switch 203, an intra prediction section 204, a motion prediction/compensation section 205, a predictive image selection section 206, and a rate control section 207. The encoder 154 encodes low-resolution images in coding units (CUs) in accordance with the HEVC method.

Specifically, the screen sorting buffer 191 in the encoder 154 stores the low-resolution image supplied from the down-conversion section 153 in FIG. 10. The screen sorting buffer 191 sorts the frames of the stored low-resolution image in the display sequence into an image of the frames in the encoding sequence according to the GOP structure. The screen sorting buffer 191 outputs the sorted low-resolution image to the arithmetic section 192, intra prediction section 204, and motion prediction/compensation section 205.

The arithmetic section 192 subtracts a predictive image supplied by the predictive image selection section 206 from the low-resolution image supplied from the screen sorting buffer 191 before proceeding with encoding. The arithmetic section 192 outputs the resulting image to the orthogonal transformation section 193 as residual information. If no predictive image is supplied from the predictive image selection section 206, the arithmetic section 192 outputs the low-resolution image retrieved from the screen sorting buffer 191 directly to the orthogonal transformation section 193 as the residual information.

The orthogonal transformation section 193 orthogonally transforms the residual information from the arithmetic section 192 in transform units (TU). The orthogonal transformation section 193 supplies the quantization section 194 with an orthogonal transformation coefficient obtained as a result of the orthogonal transformation.

The quantization section 194 quantizes the orthogonal transformation coefficient supplied from the orthogonal transformation section 193. The quantization section 194 supplies the quantized orthogonal transformation coefficient to the lossless encoding section 195.

The lossless encoding section 195 acquires from the intra prediction section 204 intra prediction mode information indicative of optimal intra prediction mode. The lossless encoding section 195 acquires from the motion prediction/compensation section 205 inter prediction mode information indicative of optimal inter prediction mode, motion vectors, and information identifying a reference image, for example. The lossless encoding section 195 further acquires from the filter 201 offset filter information regarding an offset filter.

The lossless encoding section 195 subjects the quantized orthogonal transformation coefficient supplied from the quantization section 194 to lossless encoding such as variable length encoding (e.g., Context-Adaptive Variable Length Coding (CAVLC)) or arithmetic encoding (e.g., Context-Adaptive Binary Arithmetic Coding (CABAC)).

The lossless encoding section 195 further performs lossless encoding on the intra prediction mode information; or on the inter prediction mode information, motion vectors, information identifying the reference image, and offset filter information as encoded information regarding the encoding involved. The lossless encoding section 195 supplies the losslessly encoded information and the orthogonal transformation coefficient to the accumulation buffer 196 as encoded data for accumulation therein. Alternatively, the losslessly encoded information may be added to the encoded data as a header part such as a slice header.

The accumulation buffer 196 temporarily stores the encoded data supplied from the lossless encoding section 195. The accumulation buffer 196 supplies the stored encoded data to the generation section 197.

The generation section 197 generates a low-resolution encoded stream from a parameter set such as a sequence parameter set (SPS) or a picture parameter set (PPS) and from the encoded data supplied from the accumulation buffer 196. The generation section 197 supplies the generated low-resolution encoded stream to the storage 157 in FIG. 10.

The quantized orthogonal transformation coefficient output from the quantization section 194 is also input to the inverse quantization section 198. The inverse quantization section 198 inversely quantizes the orthogonal transformation coefficient quantized by the quantization section 194 in accordance with a method corresponding to the quantization method used by the quantization section 194. The inverse quantization section 198 supplies the inverse orthogonal transformation section 199 with the orthogonal transformation coefficient obtained as a result of the inverse quantization.

The inverse orthogonal transformation section 199 performs inverse orthogonal transformation on the orthogonal transformation coefficient supplied from the inverse quantization section 198 in TUs in accordance with a method corresponding to the orthogonal transformation method used by the orthogonal transformation section 193. The inverse orthogonal transformation section 199 supplies the addition section 200 with residual information obtained as a result of the inverse orthogonal transformation.

The addition section 200 partially decodes the low-resolution image by adding up the residual information supplied from the inverse orthogonal transformation section 199 and the predictive image supplied from the predictive image selection section 206. If no predictive image is supplied from the predictive image selection section 206, the addition section 200 uses the residual information supplied from the inverse orthogonal transformation section 199 as the partially decoded low-resolution image. When the entire screen of the low-resolution image has yet to be decoded, the addition section 200 supplies the decoded low-resolution image to the frame memory 202. When the entire screen is decoded, the addition section 200 supplies the decoded low-resolution image to the filter 201.

The filter 201 subjects the low-resolution image supplied from the addition section 200 to a deblock filtering process by which block distortion is removed. The filter 201 subjects the low-resolution image resulting from the deblock filtering process to an adaptive offset filtering (a sample adaptive offset (SAO)) process that mainly removes ringing from the low-resolution image.

Specifically, the filter 201 determines the type of adaptive offset filtering process for each of the largest coding units (LCUs), and obtains an offset used for each adaptive offset filtering process. Using the offset thus obtained, the filter 201 performs the determined type of adaptive offset filtering process on the low-resolution image resulting from the deblock filtering process.

The filter 201 supplies the frame memory 202 with the low-resolution image resulting from the adaptive offset filtering process. The filter 201 further supplies the lossless encoding section 195 with offset filter information indicative of the type of adaptive offset filtering process carried out and the offset involved.

The frame memory 202 accumulates the low-resolution image supplied from the filter 201 and the low-resolution image supplied from the addition section 200. The pixels adjacent to a prediction unit (PU) in the low-resolution image accumulated in the frame memory 202 and not undergoing the filtering process yet are supplied to the intra prediction section 204 as peripheral pixels via the switch 203. The low-resolution image accumulated in the frame memory 202 and having undergone the filtering process is output to the motion prediction/compensation section 205 as the reference image via the switch 203.

The intra prediction section 204 performs an intra prediction process on all candidate intra prediction modes using the peripheral pixels read from the frame memory 202 in PUs via the switch 203.

Also, the intra prediction section 204 calculates cost function values (to be discussed later in detail) for all candidate intra prediction modes based on the low-resolution image read from the screen sorting buffer 191 and on the predictive image generated as a result of the intra prediction process. The intra prediction section 204 proceeds to determine the intra prediction mode in which the cost function value is the smallest as optimal intra prediction mode.

The intra prediction section 204 supplies the predictive image selection section 206 with the predictive image generated in the optimal intra prediction mode and the corresponding cost function value. When notified by the predictive image selection section 206 of the selection of the predictive image generated in the optimal intra prediction mode, the intra prediction section 204 supplies the intra prediction mode information to the lossless encoding section 195.

The cost function value, also known as the rate distortion (RD) cost, may be calculated by the method of high complexity mode or low complexity mode such as one defined by Joint Model (JM), which is H.264/AVC reference software. The H.264/AVC reference software is disclosed in http://iphome.hhi.de/suehring/tml/index.htm.

The motion prediction/compensation section 205 performs a motion prediction/compensation process on all candidate inter prediction modes in PUs. Specifically, the motion prediction/compensation section 205 detects the motion vectors of all candidate inter prediction modes based on the low-resolution image and the reference image supplied from the screen sorting buffer 191. On the basis of the motion vectors, the motion prediction/compensation section 205 performs a compensation process on the reference image to generate the predictive image. Incidentally, the inter prediction modes are modes that represent PU sizes and other settings.

The motion prediction/compensation section 205 further calculates the cost function values for all candidate inter prediction modes based on the low-resolution image and the predictive image. The motion prediction/compensation section 205 then determines the inter prediction mode in which the cost function value is the smallest as optimal inter prediction mode. The motion prediction/compensation section 205 proceeds to supply the cost function value in the optimal inter prediction mode and the corresponding predictive image to the predictive image selection section 206.

When notified by the predictive image selection section 206 of the selection of the predictive image generated in the optimal inter prediction mode, the motion prediction/compensation section 205 outputs to the lossless encoding section 195 the inter prediction mode information, the corresponding motion vector, and information identifying the reference image, for example.

The predictive image selection section 206 determines as optimal prediction mode either the optimal intra prediction mode or the optimal inter prediction mode that has the smaller of the two corresponding cost function values on the basis of the cost function values supplied from the intra prediction section 204 and motion prediction/compensation section 205. The predictive image selection section 206 supplies the predictive image of the optimal prediction mode to the arithmetic section 192 and addition section 200. Also, the predictive image selection section 206 notifies the intra prediction section 204 or the motion prediction/compensation section 205 of the selection of the predictive image of the optimal prediction mode.

The rate control section 207 controls the quantification rate of the quantification section 194 in such a manner that an overflow or an underflow will not occur based on the encoded data accumulated in the accumulation buffer 196.

Although not depicted, the structure of the encoders 156-1 to 156-6 is substantially the same as that of the encoder 154.

(Explanation of the Process Performed by the Content Server)

Figure 12:
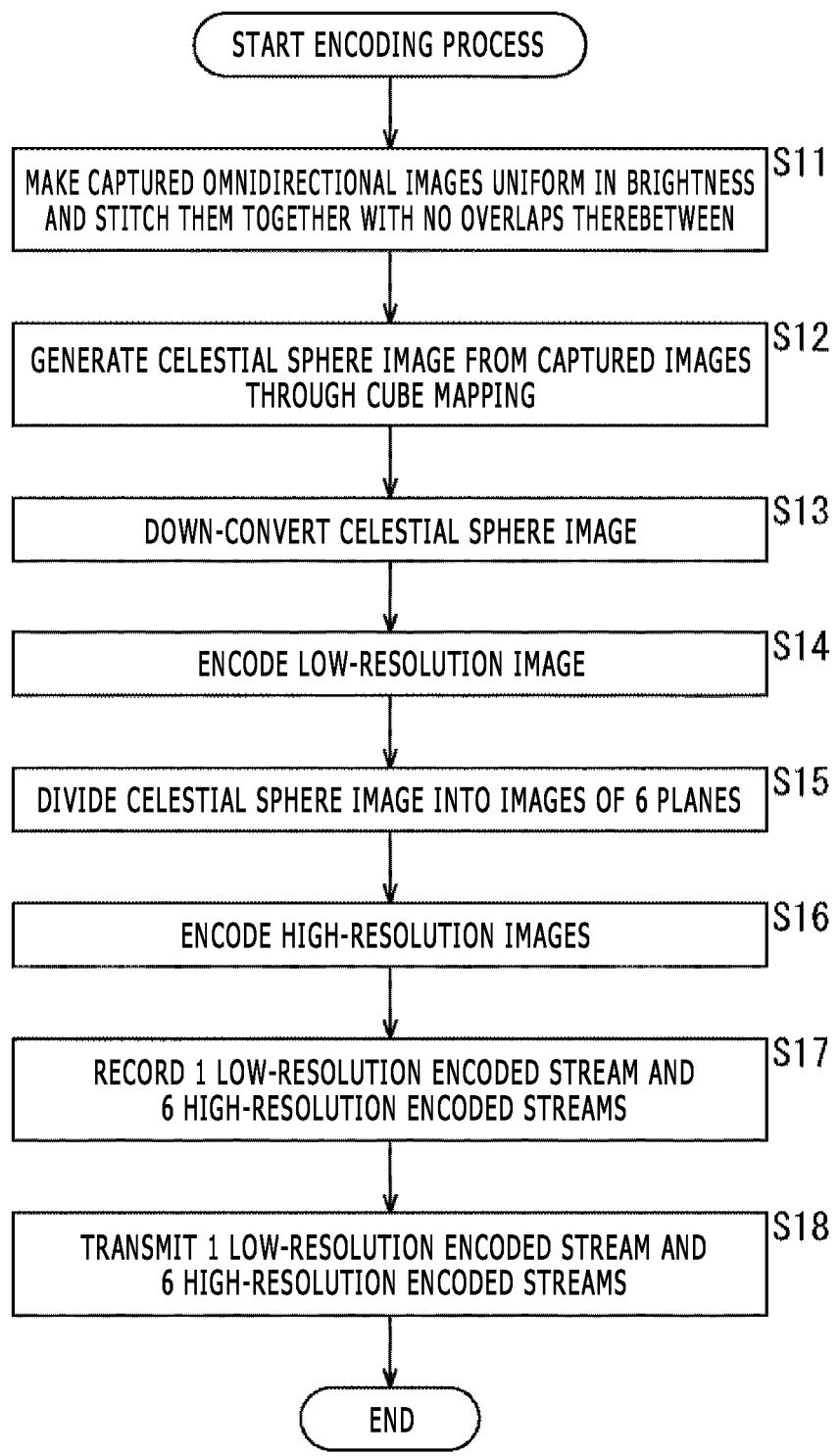
FIG. 12 is a flowchart explanatory of an encoding process performed by the content server in FIG. 10.

FIG. 12 is a flowchart explanatory of an encoding process performed by the content server 132 in FIG. 10. The encoding process is carried out in units of frames, for example.

In step S11 of FIG. 12, the stitching processing section 151 makes uniform in color and brightness the captured omnidirectional images supplied from the multi-camera apparatus 131 in FIG. 9 and stitches the images together with no overlaps therebetween. The stitching processing section 151 supplies the mapping processing section 152 with the captured images thus obtained.

In step S12, the mapping processing section 152 generates through cube mapping the celestial sphere image 30 from the captured images supplied from the stitch processing section 151. The mapping processing section 152 supplies the celestial sphere image 30 to the down-conversion section 153 and division section 155.

In step S13, the down-conversion section 153 down-converts the celestial sphere image 30 supplied from the mapping processing section 152 to generate a low-resolution image. The down-conversion section 153 supplies the resulting low-resolution image to the encoder 154.

In step S14, the encoder 154 encodes the low-resolution image supplied from the down-conversion section 153 to generate a low-resolution encoded stream. The encoder 154 supplies the low-resolution encoded stream to the storage 157.

In step S15, the division section 155 divides the celestial sphere image 30 supplied from the mapping processing section 152 into images 31 to 36 of six planes 11 to 16. The division section 155 supplies the images 31 to 36 to the encoders 156-1 to 156-6 as high-resolution images of the planes 11 to 16, respectively.

In step S16, the encoders 156-1 to 156-6 encode the high-resolution images of the planes 11 to 16 respectively to generate encoded streams. The encoders 156-1 to 156-6 supply the encoded streams to the storage 157.

In step S17, the storage 157 records the one low-resolution encoded stream supplied from the encoder 154 and the six high-resolution encoded streams supplied from the encoders 156-1 to 156-6.

In step S18, the transmission section 158 reads the one low-resolution encoded stream and the six high-resolution encoded streams from the storage 157 and transmits the retrieved streams to the home server 133 via the network, not depicted. This brings the process to an end.

(Typical Structure of the Home Server)

Figure 13:
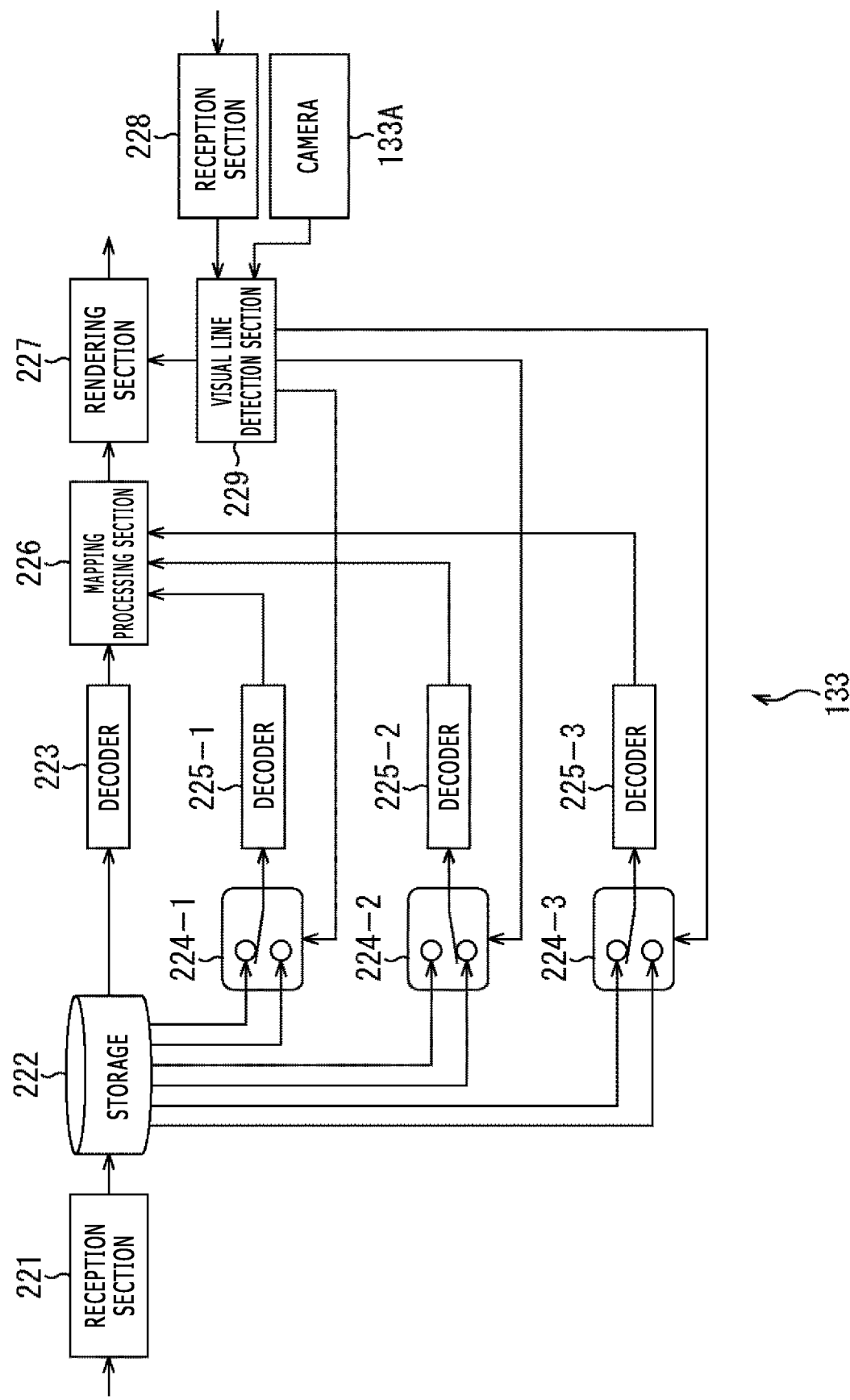
FIG. 13 is a block diagram depicting a typical structure of a home server included in FIG. 9.

FIG. 13 is a block diagram depicting a typical structure of the home server 133 included in FIG. 9.

The home server 133 in FIG. 13 is made up of the camera 133A, a reception section 221, storage 222, a decoder 223, switches 224-1 to 224-3, decoders 225-1 to 225-3, a mapping processing section 226, a rendering section 227, another reception section 228, and a visual line detection section 229.

The reception section 221 in the home server 133 receives six high-resolution encoded streams and one low-resolution encoded stream transmitted from the transmission section 158 in FIG. 10 via the network, not depicted. The reception section 221 supplies the received six high-resolution encoded streams and one low-resolution encoded stream to the storage 222 for recording therein.

The storage 222 records the six high-resolution encoded streams and one low-resolution encoded stream supplied from the reception section 221. The storage 222 supplies the one low-resolution encoded stream to the decoder 223.

From the six high-resolution encoded streams, the storage 222 reads the paired encoded streams of the +x plane 11 and −x plane 12 opposed to each other, and supplies the switch 224-1 with the retrieved streams. Likewise, the storage 222 supplies the switch 224-2 with the paired encoded streams of the +y plane 13 and −y plane 14 opposed to each other, and the switch 224-3 with the paired encoded streams of the +z plane 15 and −z plane 16 opposed to each other.

The decoder 223 (second decoding section) decodes one low-resolution encoded stream supplied from the storage 222 to generate a low-resolution image. The decoder 223 supplies the low-resolution image to the mapping processing section 226.

The switch 224-1 selects one of the paired high-resolution encoded steams of the +x plane 11 and the −x plane 12 based on plane selection information for selecting one of the +x plane 11 and the −x plane 12 supplied from the visual line detection section 229, and supplies the selected stream to the decoder 225-1. Likewise, the switch 224-2 supplies the decoder 225-2 with one of the paired high-resolution encoded steams of the +y plane 13 and the −y plane 14 based on the plane selection information. The switch 224-3 supplies the decoder 225-3 with one of the paired high-resolution encoded steams of the +z plane 15 and the −z plane 16 based on the plane selection information.

The decoder 225-1 (first decoding section) decodes the high-resolution encoded stream supplied from the switch 224-1 to generate a nigh-resolution image of the +x plane 11 or the −x plane 12 and supplies the generated high-resolution image to the mapping processing section 226. The decoder 225-2 (first decoding section) decodes the high-resolution encoded stream supplied from the switch 224-2 to generate a high-resolution image of the +y plane 13 or the −y plane 14 and supplies the generated high-resolution image to the mapping processing section 226. The decoder 225-3 (first decoding section) decodes the high-resolution encoded stream supplied from the switch 224-3 to generate a high-resolution image of the +z plane 15 or the −z plane 16 and supplies the generated high-resolution image to the mapping processing section 226.

The mapping processing section 226 maps the low-resolution image supplied from the decoder 223 to each of the planes 11 to 16 of the cube 10 as a texture. Thereafter, the mapping processing section 226 superimposes the images of the three planes supplied from the decoders 225-1 to 225-3 on the cube 10 mapped with the low-resolution image. The mapping processing section 226 supplies the resulting cube image to the rendering section 227.

The rendering section 227 projects the cube image supplied from the mapping processing section 226 onto the user's field of view supplied from the visual line detection section 229, thereby generating an image of the user's field of view. The rendering section 227 transmits to the converter 134 in FIG. 9 the generated image as the display image via an HDMI cable.

The reception section 228 receives the result of detection by the gyro sensor 135B in FIG. 9 via the converter 134 from the head-mounted display 135. The reception section 228 supplies the result of the detection to the visual line detection section 229.

The visual line detection section 229 determines the visual line vector of the user based on the result of detection by the gyro sensor 135B supplied from the reception section 228. On the basis of the user's visual line vector, the visual line detection section 229 (selection section) determines three of the planes 11 to 16 as the planes corresponding to the visual line vector.

Specifically, the visual line detection section 229 determines the +x plane 11 or the −x plane 12 such that the sign of the x axis component of the visual line vector and the sign of the x axis coordinate are the same, the +y plane 13 or the −y plane 14 such that the sign of the y axis component and the sign of the y axis coordinate are the same, and the +z plane 15 or the −z plane 16 such that the sign of the z axis component and the sign of the z axis coordinate are the same, as the three planes corresponding to the user's visual line vector.

The visual line detection section 229 further acquires an image captured of the marker 135A from the camera 133A, and detects the position of the user on the basis of the captured marker image. The visual line detection section 229 determines the user's field of view based on the user's position and visual line vector.

The visual line detection section 229 supplies the user's field of view to the rendering section 227. Also, the visual line detection section 229 generates plane selection information for selecting one of each opposed pair of the planes 11 to 16 as a plane corresponding to the user's visual line vector. The visual line detection section 229 supplies the switch 224-1 with the plane selection information for selecting either the +x plane 11 or the −x plane 12, the switch 224-2 with the plane selection information for selecting either the +y plane 13 or the −y plane 14, and the switch 224-3 with the plane selection information for selecting either the +z plane 15 or the −z plane 16.

(Typical Structure of the Decoder)

Figure 14:
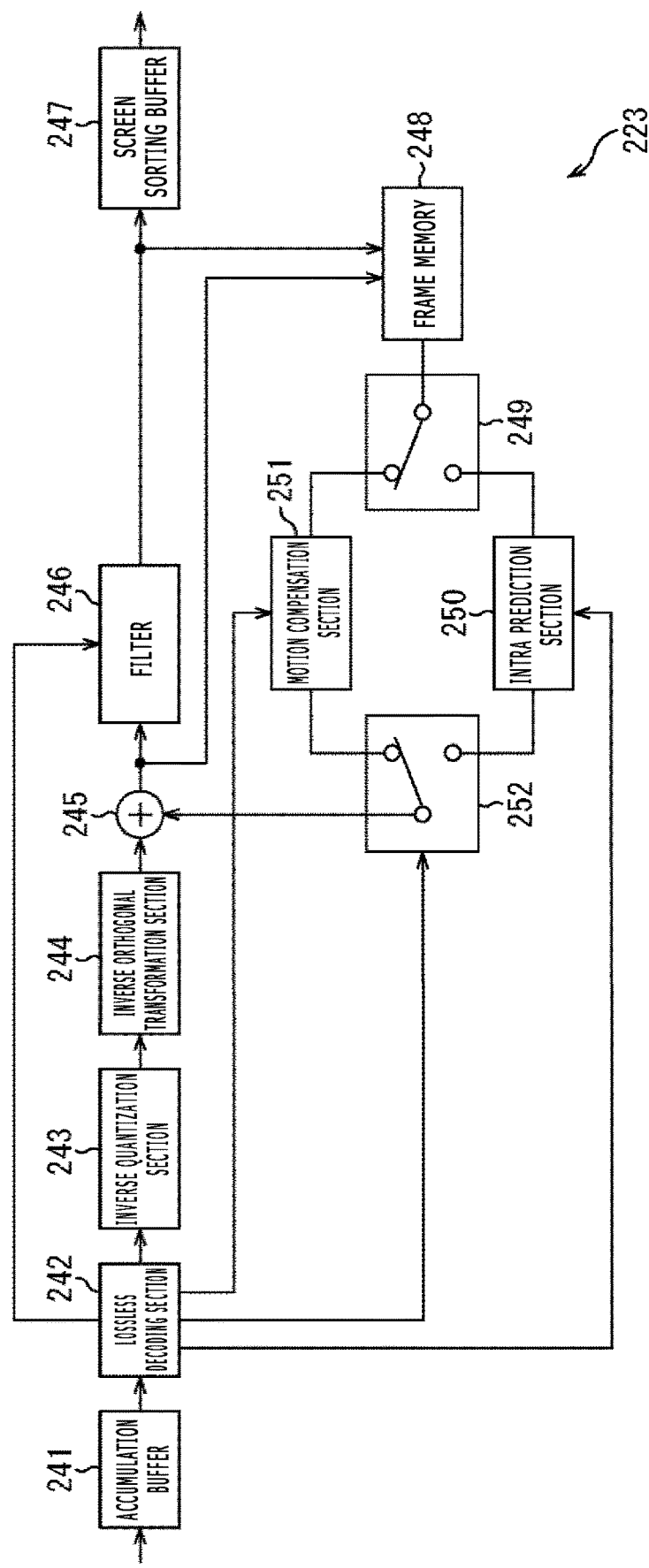
FIG. 14 is a block diagram depicting a typical structure of a decoder included in FIG. 13.

FIG. 14 is a block diagram depicting a typical structure of the decoder 223 included in FIG. 13.

The decoder 223 in FIG. 14 includes an accumulation buffer 241, a lossless decoding section 242, an inverse quantization section 243, an inverse orthogonal transformation section 244, an addition section 245, a filter 246, and a screen sorting buffer 247. The decoder 223 further includes a frame memory 248, a switch 249, an intra prediction section 250, a motion compensation section 251, and a switch 252.

The accumulation buffer 241 in the decoder 223 receives the low-resolution encoded stream from the storage 222 in FIG. 13 to accumulate encoded data. A parameter set included in the low-resolution encoded stream is supplied to the components of the decoder 223 as needed. The accumulation buffer 241 supplies the accumulated encoded data to the lossless decoding section 242.

The lossless decoding section 242 performs on the encoded data from the accumulation buffer 241 lossless decoding such as variable length decoding or arithmetic decoding corresponding to the lossless encoding performed by the lossless encoding section 195 in FIG. 11, thereby acquiring a quantized orthogonal transformation coefficient and encoded information. The lossless decoding section 242 supplies the quantized orthogonal transformation coefficient to the inverse quantization section 243. The lossless decoding section 242 supplies the intra prediction section 250 with intra prediction mode information or other information as the encoded information. The lossless decoding section 242 supplies the motion compensation section 251 with motion vectors, inter prediction mode information, and information for identifying a reference image, for example.

Furthermore, the lossless decoding section 242 supplies the switch 252 with intra prediction mode information or inter prediction mode information as the encoded information.

The inverse quantization section 243, inverse orthogonal transformation section 244, addition section 245, filter 246, frame memory 248, switch 249, intra prediction section 250, and motion compensation section 251 perform substantially the same processes as the inverse quantization section 198, inverse orthogonal transformation section 199, addition section 200, filter 201, frame memory 202, switch 203, intra prediction section 204, and motion prediction/compensation section 205 in FIG. 11, respectively. The processing decodes the low-resolution image.

Specifically, the inverse quantization section 243 inversely quantizes the quantized orthogonal transformation coefficient from the lossless decoding section 242. The inverse quantization section 243 supplies the resulting orthogonal transformation coefficient to the inverse orthogonal transformation section 244.

The inverse orthogonal transformation section 244 performs inverse orthogonal transformation on the orthogonal transformation coefficient from the inverse quantization section 243 in TUs. The inverse orthogonal transformation section 244 supplies the addition section 245 with residual information obtained as a result of the inverse orthogonal transformation.

The addition section 245 adds up the residual information supplied from the inverse orthogonal transformation section 244 and the predictive image supplied from the switch 252, thereby partially decoding the low-resolution image. If no predictive image is supplied from the switch 252, the addition section 245 uses the residual information supplied from the inverse orthogonal transformation section 244 as the partially decoded low-resolution image. If the entire screen of the low-resolution image has yet to be decoded, the addition section 245 supplies the decoded low-resolution image to the frame memory 248. When the entire screen is decoded, the addition section 245 supplies the decoded low-resolution image to the filter 246.

The filter 246 performs a deblock filtering process on the low-resolution image supplied from the addition section 245. Using an offset indicated by offset filter information from the lossless decoding section 242, the filter 246 performs for each LCU the type of adaptive offset filtering process indicated by the offset filter information on the low-resolution image having undergone the deblock filtering process. The filter 246 supplies the low-resolution image having undergone the adaptive offset filtering process to the frame memory 248 and screen sorting buffer 247.

The screen sorting buffer 247 stores in units of frames the low-resolution image supplied from the filter 246. The screen sorting buffer 247 sorts the frames of the stored low-resolution image in the encoding sequence back into the initial display sequence. The screen sorting buffer 247 supplies the sorted image to the mapping processing section 226 in FIG. 13.

The frame memory 248 accumulates the low-resolution image supplied from the filter 246 and the low-resolution image supplied from the addition section 245. The pixels adjacent to the PUs in the low-resolution image accumulated in the frame memory 248 and not yet undergoing the filtering process are supplied to the intra prediction section 250 as peripheral pixels via the switch 249. The low-resolution image accumulated in the frame memory 248 and having undergone the filtering process are supplied to the motion compensation section 251 as the reference image via the switch 249.

The intra prediction section 250 performs an intra prediction process on the optimal intra prediction mode indicated by intra prediction mode information supplied from the lossless decoding section 242 using in PUs the peripheral pixels read from the frame memory 248 via the switch 249. The intra prediction section 250 supplies the switch 252 with a predictive image generated as a result of the intra prediction process.

The motion compensation section 251 reads the reference image from the frame memory 248 via the switch 249, the reference image being identified by reference image identification information supplied from the lossless decoding section 242. Using the reference image and the motion vector supplied from the lossless decoding section 242, the motion compensation section 251 performs a motion compensation process in PUs on the optimal inter prediction mode indicated by inter prediction mode information supplied from the lossless decoding section 242. The motion compensation section 251 supplies the switch 252 with the predictive image generated as a result of the motion compensation process.

Given the intra prediction mode information from the lossless decoding section 242, the switch 252 supplies the addition section 245 with the predictive image supplied from the intra prediction section 250. Given the inter prediction mode information from the lossless decoding section 242, the switch 252 supplies the addition section 245 with the predictive image supplied from the motion compensation section 251.

(Typical Operational Timings of the Decoders)

Figure 15:
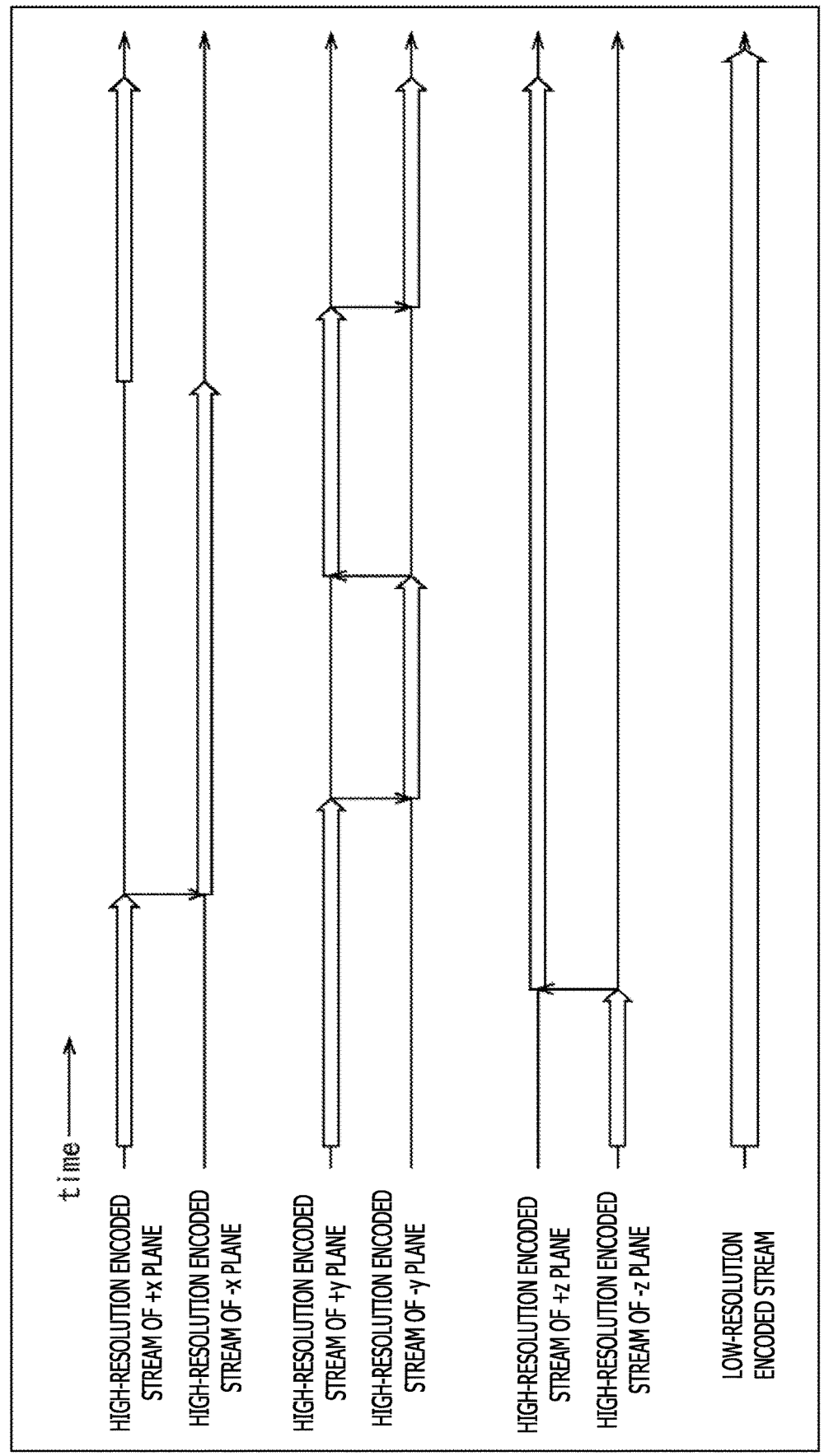
FIG. 15 is a timing chart depicting typical operational timings of the decoders in FIG. 13.

FIG. 15 is a timing chart depicting typical operational timings of the decoders 223 and 225-1 to 225-3 in FIG. 13.

In FIG. 15, the horizontal axis denotes time. Also in FIG. 15, thick arrows indicate the targets to be decoded by the decoders 223 and 225-1 to 225-3.

If the plane selection information supplied from the visual line detection section 229 is changed, the switches 224-1 to 224-3 each switch from one of the input paired high-resolution encoded streams to the other in a randomly accessible position. Thus, as depicted in FIG. 15, the decoders 225-1 to 225-3 change the high-resolution encoded streams targeted for decoding in randomly accessible positions.

The low-resolution encoded stream is always input to the decoder 223. The decoder 223 continuously decodes the low-resolution encoded stream.

As described above, the high-resolution encoded streams to be decoded can be switched only in randomly accessible positions. Thus, if the visual line vector is abruptly changed, each high-resolution encoded stream being decoded cannot be changed until the next randomly accessible position is reached. It is therefore impossible to generate the high-resolution images of the three planes corresponding to the changed visual line vector. However, since the low-resolution encoded stream is being continuously decoded, the display image may be generated using the low-resolution image of the planes corresponding to the changed visual line vector during the interim period.

The paired high-resolution encoded streams input to each of the switches 224-1 to 224-3 have their randomly accessible positions synchronized and have a closed GOP structure. Thus, each of the decoders 225-1 to 225-3 need only decode the newly selected stream from the position where the streams are switched.

By contrast, if the paired encoded streams each have different randomly accessible positions or if they do not have a closed GOP structure, the stream to be selected anew needs to be decoded before the position where the streams are to be switched. It follows that both the yet-to-be-selected encoded stream and the newly selected encoded stream need to be decoded simultaneously. Thus, there need to be as many decoders for decoding high-resolution encoded streams as the high-resolution encoded streams involved.

If the encoders 156-1 to 156-6 perform encoding in such a manner that each pair of encoded streams has a different randomly accessible position, the decoders 225-1 to 225-3 are allowed to have staggered timings for switching the streams to be decoded. This smoothes out the load of the decoding process.

(Typical Cube Images)

FIG. 16 is a schematic view explanatory of cube images generated by the mapping processing section 226 included in FIG. 13.

In FIG. 16, each square represents the LCU of the cube images. A and B in FIG. 16 depict the cube images as they are viewed from inside the cube 10.

In the example of A in FIG. 16, the planes corresponding to the user's visual line vector are the +x plane 11, -y plane 14, and +z plane 15. Thus, as depicted in A of FIG. 16, the mapping processing section 226 generates a cube image 261 through mapping such that the image 31, image 34, and image 35 are superimposed on the +x plane 11, -y plane 14, and +z plane 15, respectively, of the cube 10 mapped with a low-resolution image 260.

The images 31, 34, and 35 as well as the low-resolution image 260 are mapped to the planes of the same size. That means the LCU of the low-resolution image 260 is larger in size than the LCU of the images 31, 34, and 35.

In the example of B in FIG. 16, the planes corresponding to the user's visual line vector are the +x plane 11, -y plane 14, and -z plane 16. Thus, as depicted in B of FIG. 16, the mapping processing section 226 generates a cube image 262 through mapping such that the image 31, image 34, and image 36 are superimposed on the +x plane 11, -y plane 14, and -z plane 16, respectively, of the cube 10 mapped with the low-resolution image 260.

The images 31, 34, and 36 as well as the low-resolution image 260 are mapped to the planes of the same size. That means the LCU of the low-resolution image 260 is larger in size than the LCU of the images 31, 34, and 36.

As described above, one of each opposed pair of the planes constituting the cube 10 is mapped with the high-resolution image and the other one of the opposed pair of the planes is mapped with the low-resolution image.

When the user's visual line vector is changed, causing the planes corresponding to the user's visual line vector to be changed accordingly, at least one plane mapped with the high-resolution image is replaced by the other paired plane. For example, if the planes corresponding to the user's visual line vector are changed from the +x plane 11, -y plane 34, and +z plane 15 to the plane +x plane 11, -y plane 14, and -z plane 16, the cube image 261 is replaced by the cube image 262.

At this point, the cube images 261 and 262 are each an image having the planes 11 to 16 all mapped. Thus, the rendering section 227 can instantaneously generate a display image of the user's field of view using the cube image 262 until the cube image 262 corresponding to the changed visual line vector is generated.

(Example of the User's Field of View)

Figure 17:
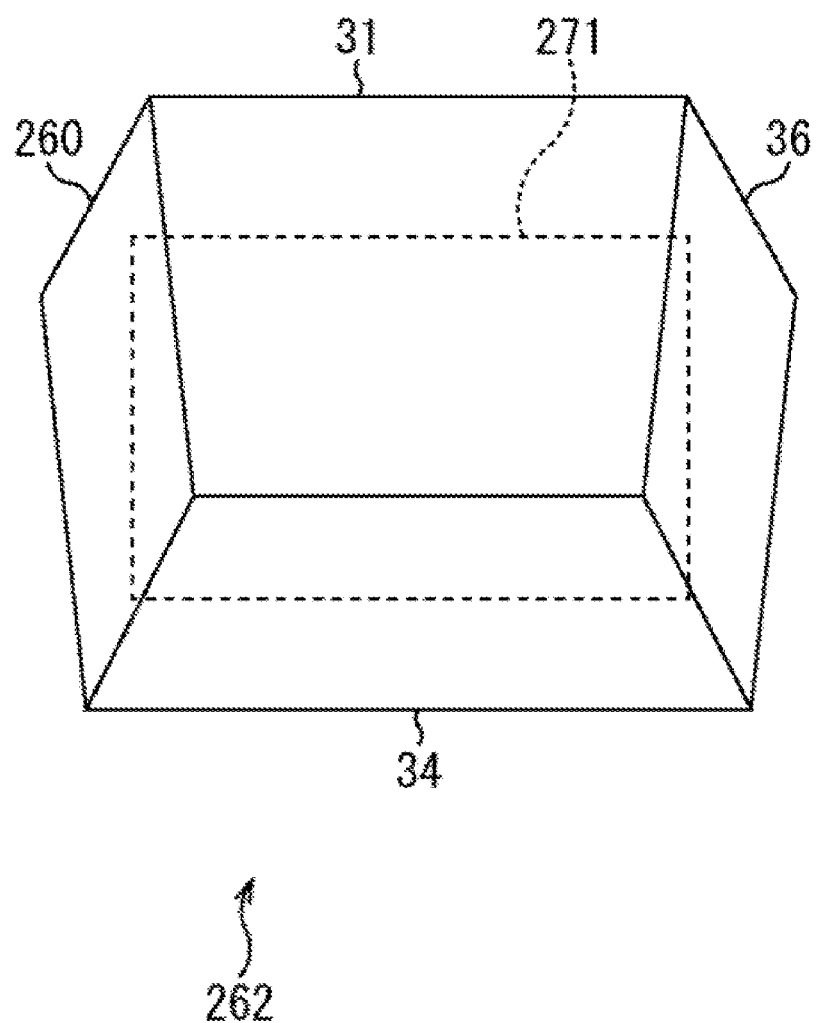
FIG. 17 is a schematic view depicting a user's typical field of view.

FIG. 17 is a schematic view depicting an example of the user's field of view.

In the example of FIG. 17, the cube image 262 is generated by the mapping processing section 226.

As depicted in FIG. 17, depending on the position inside the cube 10 corresponding to the user's position, it may be necessary, in generating the image of a user's field of view 271, to use the image of the +z plane 15 other than the +x plane 11, -y plane 14, and -z plane 16 corresponding to the user's visual line vector.

In such a case, the rendering section 227 can still generate the image of the field of view 271 using the image 31 of the +x plane 11, the image 34 of the -y plane 14, the image 36 of the -z plane 16, and the low-resolution image 260 of the +z plane 15. That is because the cube image 262 is an image having the planes 11 to 16 all mapped.

By contrast, if the low-resolution encoded stream is not generated, the cube image is an image such that only the three planes corresponding to the user's visual line vector are mapped. Thus, the image of the user's field of view 271 cannot be generated.

(Explanation of the Process Performed by the Home Server)

Figure 18:
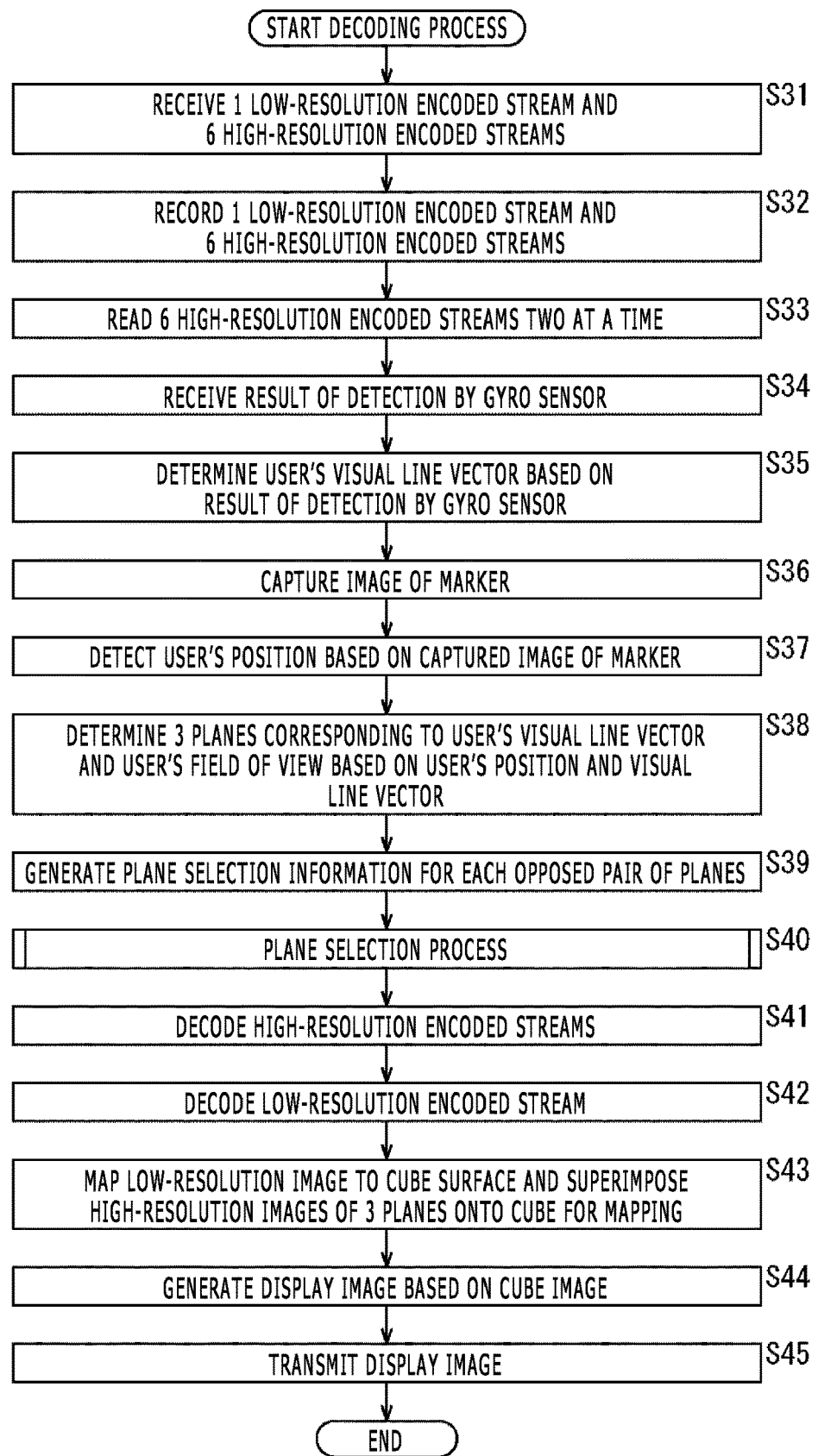
FIG. 18 is a flowchart explanatory of a decoding process performed by the home server in FIG. 13.

FIG. 18 is a flowchart explanatory of a decoding process performed by the home server 133 in FIG. 13. The decoding process is performed in units of frames, for example.

In step S31 of FIG. 18, the reception section 221 in the home server 133 receives one low-resolution encoded stream and six high-resolution encoded streams transmitted from the transmission section 158 in FIG. 10 via the network, not depicted. The reception section 221 supplies the received one low-resolution encoded stream and six high-resolution encoded streams to the storage 222.

In step S32, the storage 222 records the one low-resolution encoded stream and six high-resolution encoded streams supplied from the reception section 221.

In step S33, the storage 222 reads the paired encoded streams of the +x plane 11 and −x plane 12 opposed to each other from the six high-resolution encoded streams, and supplies the paired streams thus retrieved to the switch 224-1. Likewise, the storage 222 supplies the switch 224-2 with the paired encoded streams of the +y plane 13 and −y plane 14 opposed to each other, and the switch 224-3 with the paired encoded streams of the +z plane 15 and −z plane 16 opposed to each other. The storage 222 further reads one low-resolution encoded stream and supplies it to the decoder 223.

In step S34, the reception section 228 receives the result of detection by the gyro sensor 135B in FIG. 9 from the head-mounted display 135 via the converter 134. The reception section 228 supplies the result of the detection to the visual line detection section 229.

In step S35, the visual line detection section 229 determines the user's visual line vector based on the result of detection by the gyro sensor 135B supplied from the reception section 228.

In step S36, the camera 133A captures an image of the marker 135A and supplies the captured image to the visual line detection section 229. In step S37, the visual line detection section 229 detects the user's position based on the captured image of the marker 135A supplied from the camera 133A.

In step S38, the visual line detection section 229 determines the user's field of view and three of the planes 11 to 16 as the planes corresponding to the user's visual line vector on the basis of the user's position and visual line vector. The visual line detection section 229 supplies the user's field of view to the rendering section 227.

In step S39, the visual line detection section 229 generates plane selection information for selecting one of each opposed pair of the planes 11 to 16 as a plane corresponding to the user's visual line vector. The visual line detection section 229 supplies the switch 224-1 with the plane selection information for selecting either the +z plane 11 or the −x plane 12, the switch 224-2 with the plane selection information for selecting either the +y plane 13 or the −y plane 14, and the switch 224-3 with the plane selection information for selecting either the +z plane 15 or the −z plane 16.

In step S40, the switches 224-1 to 224-3 perform a plane selection process for selecting the high-resolution encoded streams based on the plane selection information supplied from the visual line detection section 229. The plane selection process will be discussed later in detail with reference to FIG. 19.

In step S41, the decoder 225-1 decodes the high-resolution encoded stream supplied from the switch 224-1 to generate a high-resolution image of the +x plane 11 or −x plane 12, and supplies the generated image to the mapping processing section 226. The decoder 225-2 decodes the high-resolution encoded stream supplied from the switch 224-2 to generate a high-resolution image of the +y plane 13 or −y plane 14, and supplies the generated image to the mapping processing section 226. The decoder 225-3 decodes the high-resolution encoded stream supplied from the switch 224-3 to generate a high-resolution image of the +z plane 15 or −z plane 16, and supplies the generated image to the mapping processing section 226.

In step S42, the decoder 223 decodes one low-resolution encoded stream supplied from the storage 222 to generate a low-resolution image. The decoder 223 supplies the generated low-resolution image to the mapping processing section 226.

In step S43, the mapping processing section 226 maps the low-resolution image supplied from the decoder 223 to the cube 10, and superimposes the high-resolution images of three planes supplied from the decoders 225-1 to 225-3 onto the cube 10 for mapping. The mapping processing section 226 supplies the rendering section 227 with the cube image obtained as a result of the mapping.

In step S44, the rendering section 227 projects the cube image onto the user's field of view based on the cube image from the mapping processing section 226 and on the user's field of view from the visual line detection section 229. By so doing, the rendering section 227 generates an image of the user's field of view as the display image.

In step S45, the rendering section 227 transmits the display image to the converter 134 in FIG. 9 via the HDMI cable. This brings the process to an end.

Figure 19:
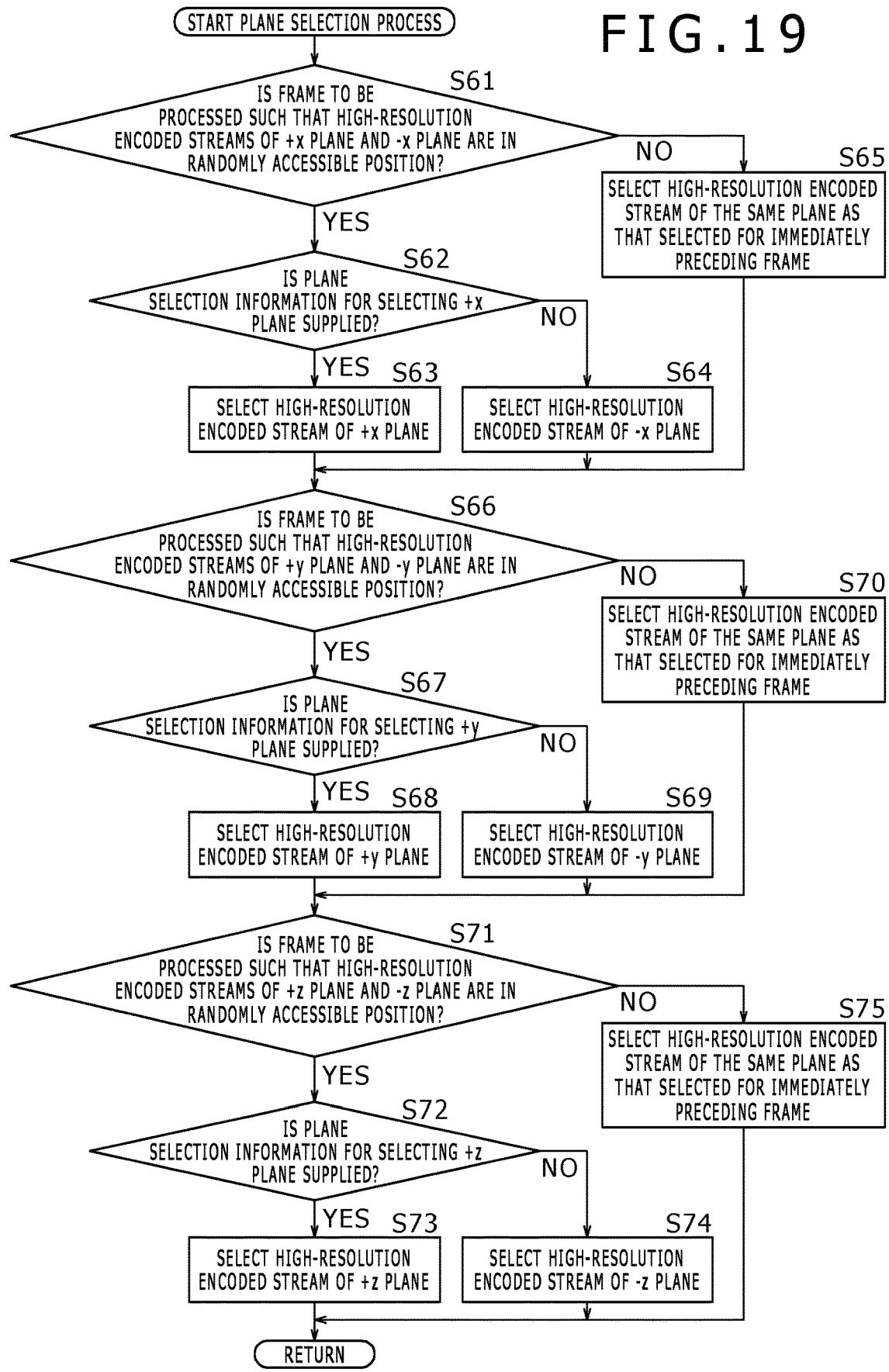
FIG. 19 is a flowchart explanatory of details of a plane selection process included in FIG. 18.

FIG. 19 is a flowchart explanatory of details of the plane selection process in step S40 of FIG. 18.

In step S61 of FIG. 19, the switch 224-1 determines whether the frame to be processed is such that the high-resolution encoded streams of the +x plane 11 and −x plane 12 are in a randomly accessible position.

If it is determined in step S61 that the frame to be processed is such that the high-resolution encoded streams of the +x plane 11 and −x plane 12 are in a randomly accessible position, the process is transferred to step S62. In step S62, the switch 224-1 determines whether the plane selection information for selecting the +x plane 11 is supplied from the visual line detection section 229.

If it is determined in step S62 that the plane selection information for selecting the +x plane 11 is supplied, the process is transferred to step S63. In step S63, the switch 224-1 selects the high-resolution encoded stream of the +x plane 11 as the stream to be decoded from the high-resolution encoded streams of the +x plane 11 and −x plane 12 supplied from the storage 222. The switch 224-1 supplies the selected high-resolution encoded stream to the decoder 225-1.

If it is determined in step S62 that the plane selection information for selecting the +x plane 11 is not supplied, i.e., that the plane selection information for selecting the −x plane 12 is supplied from the visual, line detection section 229, the process is transferred to step S64. In step S64, the switch 224-1 selects the high-resolution encoded stream of the −x plane 12 as the stream to be decoded from the high-resolution encoded streams of the +z plane 11 and −x plane 12 supplied from the storage 222. The switch 224-1 supplies the selected high-resolution encoded stream to the decoder 225-1.

If it is determined in step S61 that the frame to be processed is not such that the high-resolution encoded streams of the +x plane 11 and −x plane 12 are in a randomly accessible position, the process is transferred to step S65.

In step S65, the switch 224-1 selects, from the high-resolution encoded streams of +x plane 11 and −x plane 12 supplied from the storage 222, the high-resolution encoded stream of the same plane as that selected for the immediately preceding frame as the stream to be decoded.

That is, if the frame to be processed is not such that the high-resolution encoded streams of the +x plane 11 and −x plane 12 are in a randomly accessible position, the stream to be decoded is not switched between the high-resolution encoded streams of the +x plane 11 and −x plane 12. The switch 224-1 supplies the selected high-resolution encoded stream to the decoder 225-1. Upon completion of steps S63 to S65, the process is transferred to step S66.

In step S66, the switch 224-2 determines whether the frame to be processed is such that the high-resolution encoded streams of the +y plane 13 and −y plane 14 are in a randomly accessible position.

If it is determined in step S66 that the frame to be processed is such that the high-resolution encoded streams of the +y plane 13 and −y plane 14 are in a randomly accessible position, the process is transferred to step S67. In step S67, the switch 224-2 determines whether the plane selection information for selecting the +y plane 13 is supplied from the visual line detection section 229.

If it is determined in step S67 that the plane selection information for selecting the +y plane 13 is supplied, the process is transferred to step S68. In step S68, the switch 224-2 selects the high-resolution encoded stream of the +y plane 13 as the stream to be decoded from the high-resolution encoded streams of the +y plane 13 and −y plane 14 supplied from the storage 222. The switch 224-2 supplies the selected high-resolution encoded stream to the decoder 225-2.

If it is determined in step S67 that the plane selection information for selecting the +y plane 13 is not supplied, i.e., that the plane selection information for selecting the −y plane 14 is supplied from the visual line detection section 229, the process is transferred to step S69. In step S69, the switch 224-2 selects the high-resolution encoded stream of the −y plane 14 as the stream to be decoded from the high-resolution encoded streams of the +y plane 13 and −y plane 14 supplied from the storage 222. The switch 224-2 supplies the selected high-resolution encoded stream to the decoder 225-2.

If it is determined in step S66 that the frame to be processed is not such that the high-resolution encoded streams of the +y plane 13 and −y plane 14 are in a randomly accessible position, the process is transferred to step S70.

In step S70, the switch 224-2 selects, from the high-resolution encoded streams of +y plane 13 and −y plane 14 supplied from the storage 222, the high-resolution encoded stream of the same plane as that selected for the immediately preceding frame as the stream to be decoded.

That is, if the frame to be processed is not such that the high-resolution encoded streams of the +y plane 13 and −y plane 14 are in a randomly accessible position, the stream to be decoded is not switched between the high-resolution encoded streams of the +y plane 13 and −y plane 14. The switch 224-2 supplies the selected high-resolution encoded stream to the decoder 225-2. Upon completion of steps S68 to S70, the process is transferred to step S71.

In step S71, the switch 224-3 determines whether the frame to be processed is such that the high-resolution encoded streams of the +z plane 15 and −z plane 16 are in a randomly accessible position.

If it is determined in step S71 that the frame to be processed is such that the high-resolution encoded streams of the +z plane 15 and −z plane 16 are in a randomly accessible position, the process is transferred to step S72. In step S72, the switch 224-3 determines whether the plane selection information for selecting the +z plane 15 is supplied from the visual line detection section 229.

If it is determined in step S72 that the plane selection information for selecting the +z plane 25 is supplied, the process is transferred to step S73. In step S73, the switch 224-3 selects the high-resolution encoded stream of the +z plane 15 as the stream to be decoded from the high-resolution encoded streams of the +z plane 15 and −z plane 16 supplied from the storage 222. The switch 224-3 supplies the selected high-resolution encoded stream to the decoder 225-3.

If it is determined in step S72 that the plane selection information for selecting the +z plane 15 is not supplied, i.e., that the plane selection information for selecting the −z plane 16 is supplied from the visual line detection section 229, the process is transferred to step S74. In step S74, the switch 224-3 selects the nigh-resolution encoded stream of the −z plane 16 as the stream to be decoded from the high-resolution encoded streams of the +z plane 15 and −z plane 16 supplied from the storage 222. The switch 224-3 supplies the selected high-resolution encoded stream to the decoder 225-3.

If it is determined in step S71 that the frame to be processed is not such that the high-resolution encoded streams of the +z plane 15 and −z plane 16 are in a randomly accessible position, the process is transferred to step S75.

In step S75, the switch 224-3 selects, from the high-resolution encoded streams of +z plane 15 and −z plane 16 supplied from the storage 222, the high-resolution encoded stream of the same plane as that selected for the immediately preceding frame.

That is, if the frame to be processed is not such that the high-resolution encoded streams of the +z plane 15 and −z plane 16 are in a randomly accessible position, the stream to be decoded is not switched between the high-resolution encoded streams of the +z plane 15 and −z plane 16. The switch 224-3 supplies the selected high-resolution encoded stream to the decoder 225-3. Upon completion of steps S73 to S75, the process is transferred to step S41 in FIG. 18.

As depicted in FIG. 19, one of each opposed pair of the planes 11 to 16 is selected independently of the other opposed pairs as the decoding target on the basis of the plane section information.

In the manner described above, the content server 132 of the image display system 130 generates the high-resolution encoded stream of each of the planes 11 to 16 making up the celestial sphere image 30 and the low-resolution encoded stream representing the entire celestial sphere image 30.

Thus, if the visual line vector is abruptly changed, the image of the user's field of view is instantaneously displayed using the low-resolution image until the high-resolution encoded streams of the planes corresponding to the changed visual line vector are decoded. If it is necessary, in generating the image of the user's field of view, to use a plane other than the three planes corresponding to the visual line vector, the low-resolution image can still be used to display the image of the user's field of view.

The home server 133 is compatible with any home server that generates the display image by decoding one encoded stream representing the entire celestial sphere image 30.

Second Embodiment (Explanation of the Method for Generating the Celestial Sphere Image with the Second Embodiment)

Figure 20:
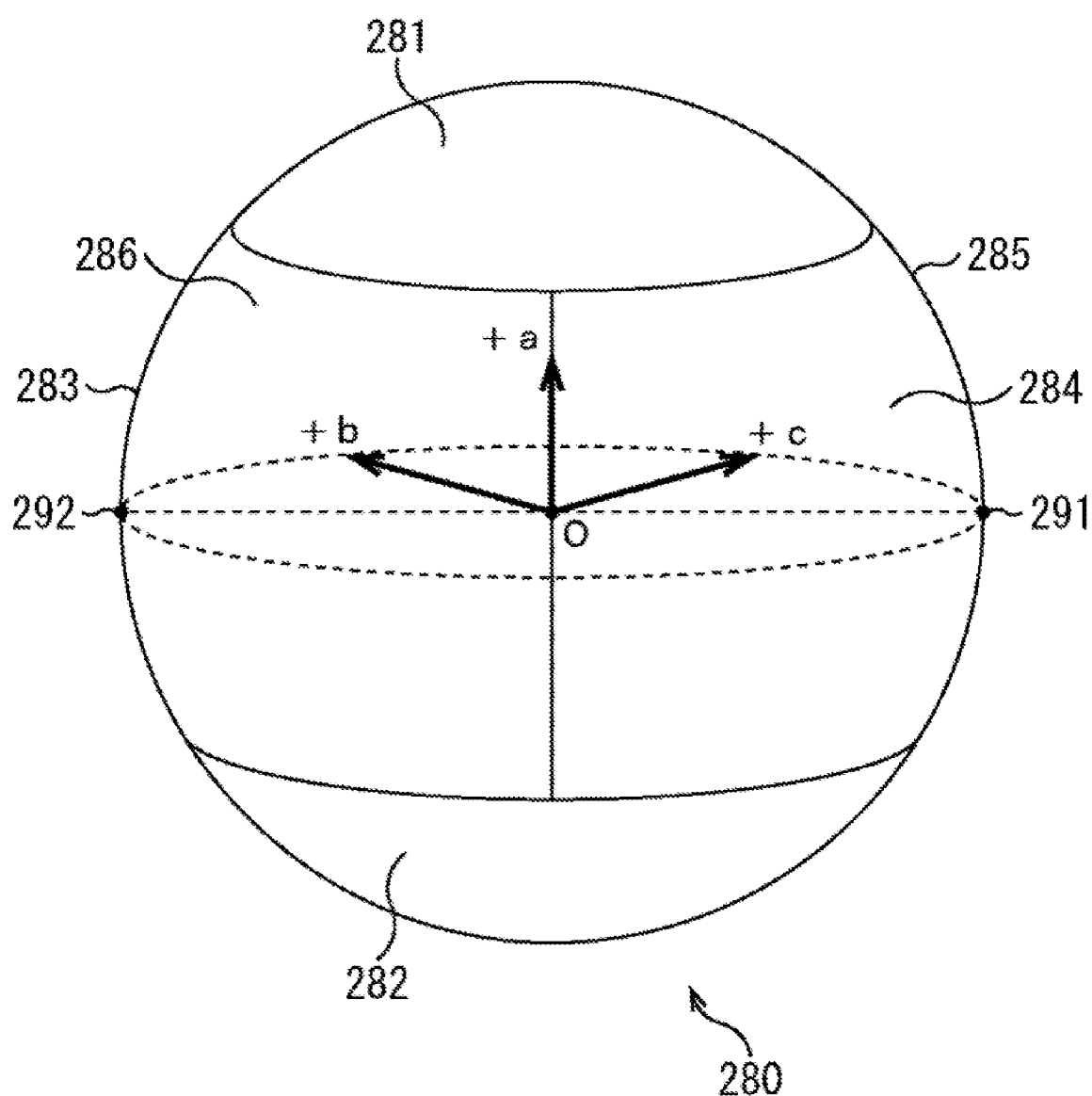
FIG. 20 is a schematic view depicting a sphere as a 3D model to which images are mapped by new equidistant cylindrical projection.

FIG. 20 is a schematic view depicting a sphere as a 3D model to which images are mapped by a method for generating a celestial sphere image in the second embodiment (the method is called new equidistant cylindrical projection hereunder).

As depicted in FIG. 20, images are mapped to the surface of a sphere 280 by new equidistant cylindrical projection as by equidistant cylindrical projection, except that the surface of the sphere 280 is divided vertically into three planes, of which the middle plane is further divided horizontally into four, to eventually make up six planes 281 to 286 of approximately the same area. In the example of FIG. 20, the middle plane of the sphere 280 is divided into the planes 283 to 286 in such a manner that a front 291 of the image mapped to the sphere 280 is positioned at the center on the boundary between the planes 284 and 285 and that a back 292 is positioned at the center on the boundary between the planes 283 and 286. The front 291 of the image is typically positioned at the center of the field of view in a reference visual line direction (e.g., the visual line direction applicable when the user wearing the head-mounted display 135 naturally faces forward).

In this description, an axis that passes through origin O as the center of the sphere 280 and through the center of the plane 281 and that of the plane 282 is called the a axis; an axis that passes the center of the plane 283 and that of the plane 284 is called the b axis; and an axis that passes through the center of the plane 285 and that of the plane 286 is called the c axis. The plane 281 such that a=r where r denotes the distance from the origin O to each of the planes 281 to 286 is called the +a plane 281 as needed. The plane 282 such that a=−r is called the −a plane 282 as needed. Likewise, the plane 283 such that b=r is called the +b plane 283; the plane 284 such that b=−r is called the −b plane 284; the plane 285 such that c=r is called the +c plane 285; and the plane 286 such that c=−r is called the −c plane 286 as needed.

The +a plane 281 is opposed to the −a plane 282, the +b plane 283 to the −b plane 284, and the +c plane 285 to the −c plane 286. The front 291 is positioned at the center on the boundary between the +c plane 285 and the −b plane 284. The back 292 is positioned at the center on the boundary between the −c plane 286 and the +b plane 283.

Figure 21:
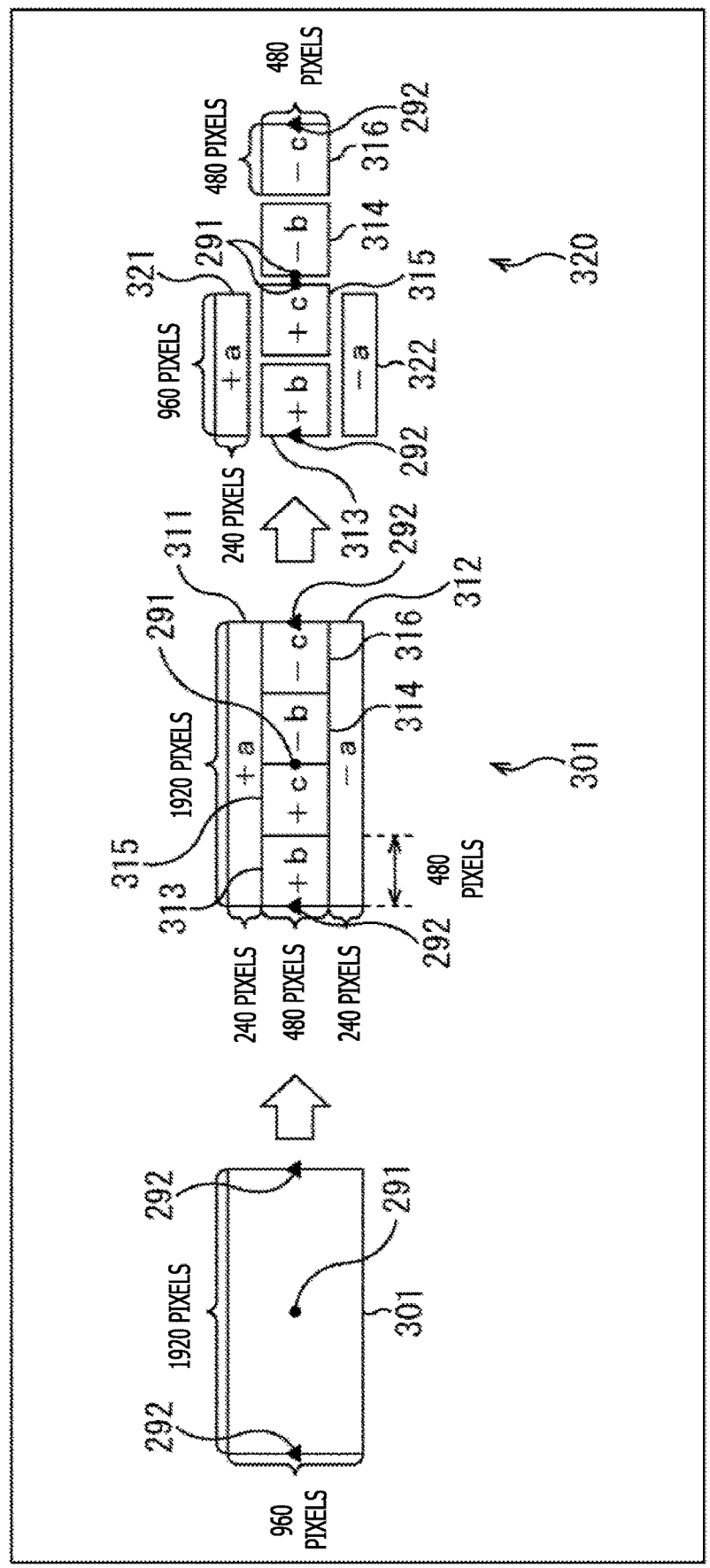
FIG. 21 is a schematic view explanatory of a celestial sphere image generated by new equidistant cylindrical projection.

FIG. 21 is a schematic view explanatory of a celestial sphere image generated by new equidistant cylindrical projection.

According to new equidistant cylindrical projection, as depicted on the left side of FIG. 21, an image 301 of the sphere 280 mapped with captured omnidirectional images by equidistant cylindrical projection is first generated in such a manner that the center of the image 301 coincides with the front 291. The back 292 is therefore positioned at the center between the right and left edges of the image 301. In the example of FIG. 21, the image 301 is made up of 1920 pixels (horizontally) by 960 pixels (vertically).

As depicted in the middle of FIG. 21, when the image 301 is divided vertically into three images, the uppermost image is an image 331 (top image) of the +a plane 281, and the lowermost image is an image 312 (bottom image) of the −a plane 282. When the middle image is divided into four images, the leftmost image is an image 313 of the +b plane 283, the second image from left is an image 315 of the +c plane 285, the third image from left is an image 314 of the −b plane 284, and the rightmost image is an image 316 of the −c plane 286. The front 291 is positioned at the center on the boundary between the images 315 and 314, and the back 292 is positioned at the center between the left edge of the image 313 and the right edge of the image 316.

In the example of FIG. 21, the images 311 and 312 are each made up of 1920 pixels by 240 pixels. The images 313 to 316 (divided middle images) are each made up of 480 pixels by 480 pixels.

Figure 23:
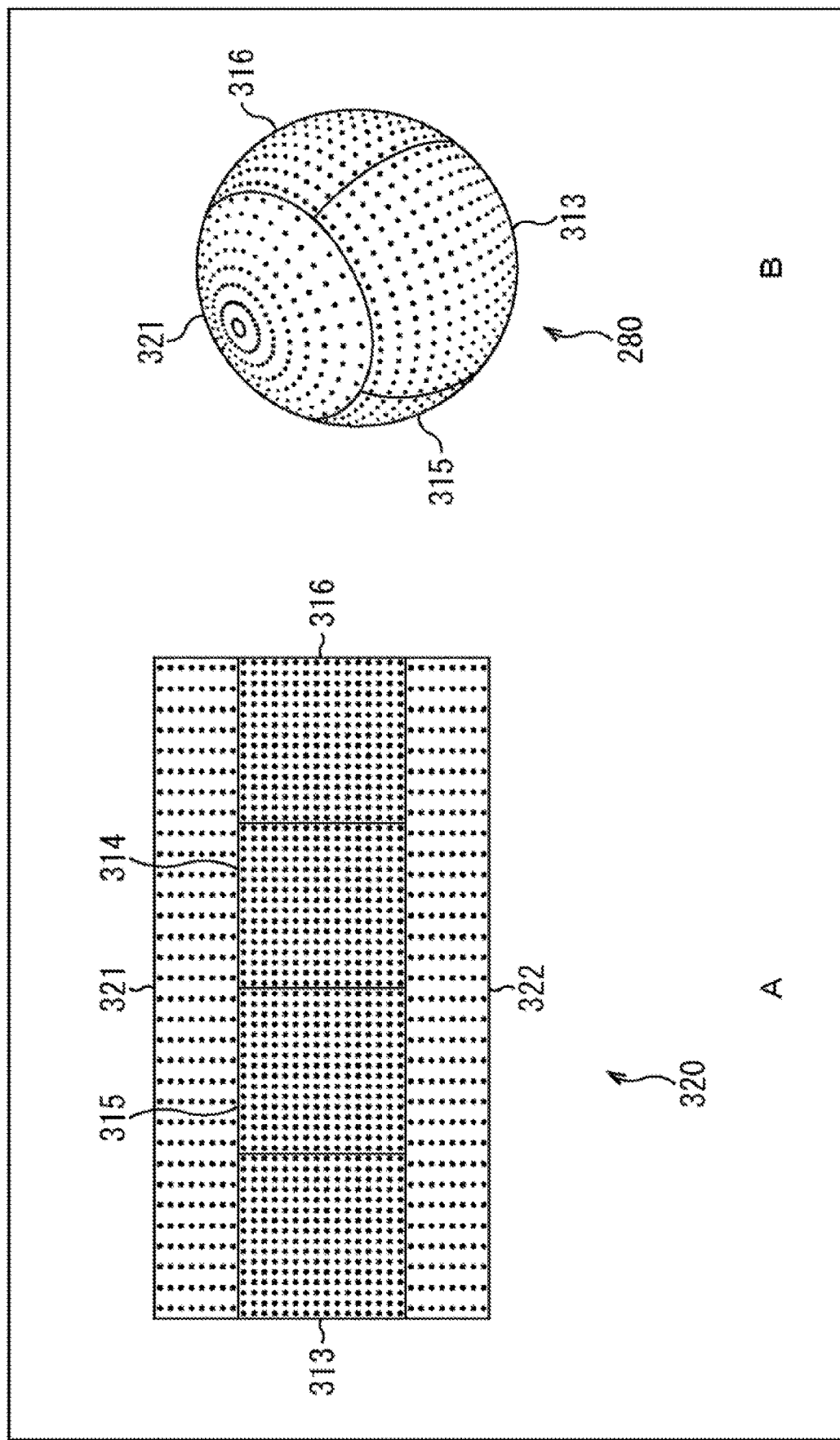
FIG. 23 is a schematic view depicting the distribution of pixels in the celestial sphere image in FIG. 21.

Next, as depicted on the right of FIG. 21, the images 311 and 312 in the image 301 are down-converted in such a manner that the resolution in the horizontal direction is halved. In the example of FIG. 23, a low-resolution top image 321 down-converted from the image 311 and a low-resolution bottom image 322 down-converted from the image 312 are each made up of 960 pixels by 240 pixels. The low-resolution top image 321, the low-resolution bottom image 322, and the images 313 to 316 are each given the same number of pixels, i.e., 230,400 pixels (=480×480=960×240).

As a result of the above process, the low-resolution top image 321, the low-resolution bottom image 322, and the images 313 to 316 are generated to constitute a celestial sphere image 320.

Figure 22:
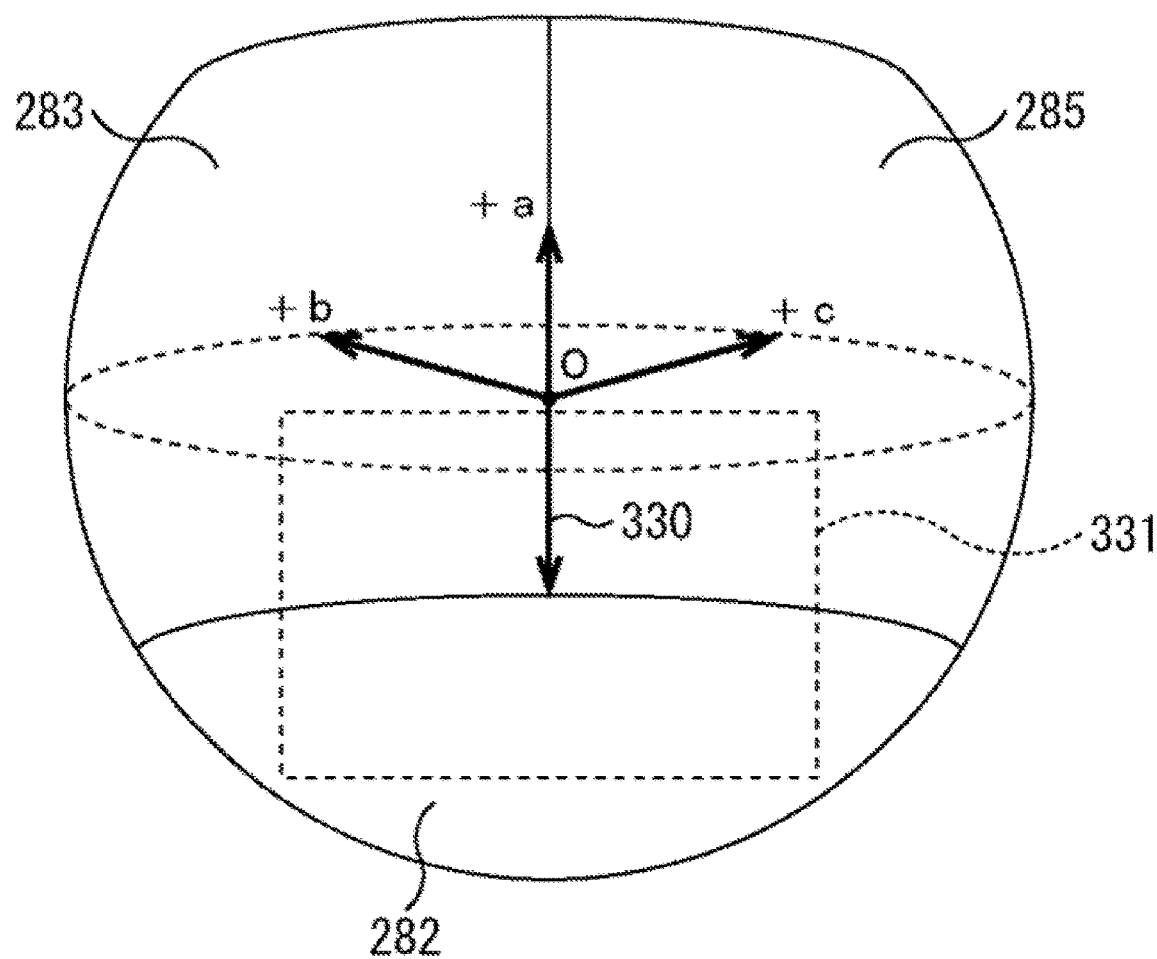
FIG. 22 is a schematic view depicting a typical image of a user's field of view generated by use of the celestial sphere image in FIG. 21.

FIG. 22 is a schematic view depicting a typical image of the user's field of view generated by use of the celestial sphere image 320 in FIG. 21.

In the example of FIG. 22, a user's visual line vector 330 is directed from the origin O to the points of intersection with the +b plane 283, +c plane 285, and −a plane 282.

In that case, an image of a user's field of view 331 may be generated using the image 313 of the +b plane 283, the image 315 of the +c plane 285, and the image 312 of the −a plane 282. That is, the planes corresponding to the user's visual line vector 330 are the −a plane 282 such that the sign of the a axis component of the visual line vector 330 and the sign of the a axis coordinate are the same, the +b plane 283 such that the sign of the b axis component and the sign of the b axis coordinate are the same, and the +c plane 285 such that the sign of the c axis component and the sign of the c axis coordinate are the same.

FIG. 23 is a schematic view depicting the distribution of pixels in the celestial sphere image 320 in FIG. 21. In FIG. 23, each point represents the center of a pixel.

As depicted in A of FIG. 23, the centers of the pixels making up the celestial sphere image 320 are arranged at equal distances apart horizontally and vertically. It is to be noted that the horizontal distance between the pixels constituting the low-resolution top image 321 and low-resolution bottom image 322 is twice the horizontal distance between the pixels making up the images 313 to 316.

As depicted in B of FIG. 23, when the celestial sphere image 320 is mapped to the surface of the sphere 280, the mapped low-resolution top image 321, low-resolution bottom image 322, and images 313 to 316 have the areas of the planes 281 to 286, respectively, the areas being substantially the same. The low-resolution top image 321, low-resolution bottom image 322, and images 313 to 316 are arranged on the sphere 280 in a manner similar to the arrangement of the cube-mapped images 31 to 36 on the sphere 60. The density of the pixels in each of the planes 281 to 286 is substantially the same.

As described above, the celestial sphere image 320 mapped to the sphere 280 by new equidistant cylindrical projection has better pixel isotropy than when mapped by equidistant cylindrical projection. This reduces the load of the decoding process near the upper and lower poles of the sphere 280. Also, the total number of pixels in the celestial sphere image 320 from new equidistant cylindrical projection is smaller than from equidistant cylindrical projection. The number of the planes corresponding to the visual line vector is the same three as in the case of cube mapping.

(Typical Structure of the Content Server in the Second Embodiment)

The configuration of the image display system as the second embodiment of the present disclosure is substantially the same as the configuration of the image display system 130 in FIG. 9, except that the content server is structured differently and that the 3D model to which the celestial sphere image is mapped by the home server is a sphere. Thus, the content server alone is explained hereunder.

Figure 24:
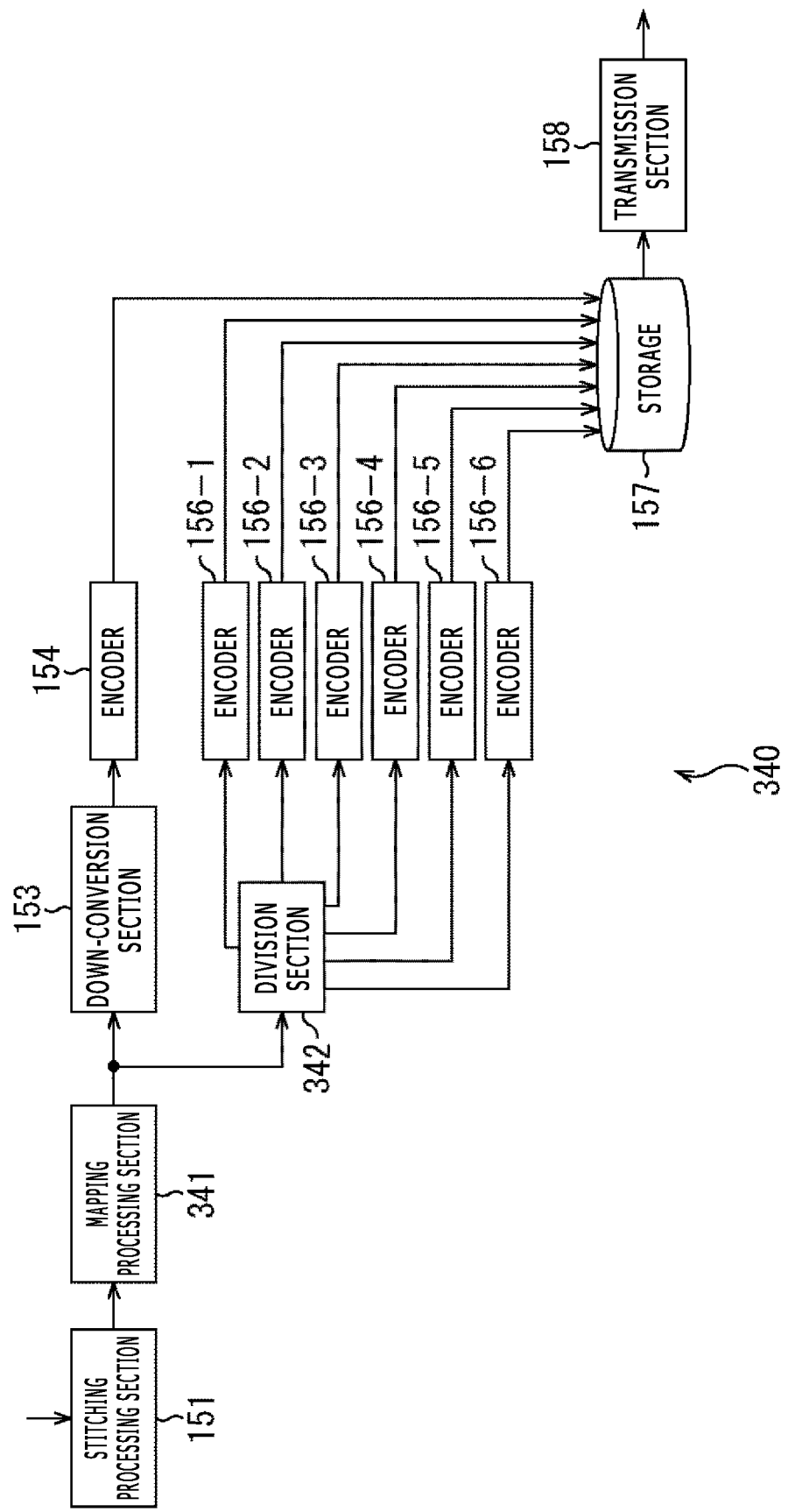
FIG. 24 is a block diagram depicting a typical configuration of a content server of an image display system as a second embodiment of the present disclosure.

FIG. 24 is a block diagram depicting a typical configuration of an image display system as the second embodiment of the present disclosure.

Of the components depicted in FIG. 24, those that are the same as in FIG. 10 are assigned the same reference numerals. Redundant explanations of the components are omitted hereunder where appropriate.

The structure of a content server 340 in FIG. 24 is different from that of the content server 132 in FIG. 10 in that a mapping processing section 341 and a division section 342 replace the mapping processing section 152 and the division section 155, respectively. The content server 340 (image processing device) down-converts, from among the images formed by equidistant cylindrical projection on the sphere 70 mapped with captured omnidirectional images, the top and bottom images to generate a celestial sphere image.

Specifically, the mapping processing section 341 generates by new equidistant cylindrical projection the celestial sphere image 320 from the captured images supplied by the stitching processing section 151. The mapping processing section 341 feeds the celestial sphere image 320 to the down-conversion section 153 and division section 342.

The division section 342 divides the celestial sphere image 320 fed from the mapping processing section 341 into the low-resolution top image 321, low-resolution bottom image 322, and images 313 to 316 of the six planes 281 to 286. The division section 342 supplies the encoder 156-1 with the low-resolution top image 321 as the high-resolution image of the +a plane 281 and the encoder 156-2 with the low-resolution bottom image 322 as the high-resolution image of the −a plane 282.

The division section 342 supplies the encoder 156-3 with the image 313 as the high-resolution image of the +b plane 283 and the encoder 156-4 with the image 314 as the high-resolution image of the −b plane 284. The division section 342 further supplies the encoder 156-5 with the image 315 as the high-resolution image of the +c plane 285 and the encoder 156-6 with the image 316 as the high-resolution image of the −c plane 286.

As a result of this, the high-resolution encoded streams of the planes 281 to 286 are generated in such a manner that the opposed pairs of the planes 281 to 286 on the sphere 280 are synchronized in randomly accessible positions and that the planes is arranged into a closed GOP structure.

(Typical Structure of the Mapping Processing Section)

Figure 25:
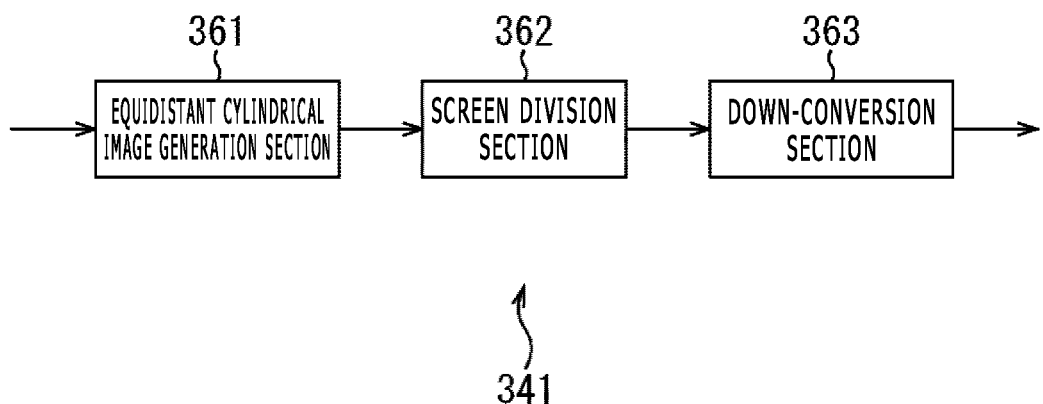
FIG. 25 is a block diagram depicting a typical structure of a mapping processing section included in FIG. 24.

FIG. 25 is a block diagram depicting a typical structure of the mapping processing section 341 included in FIG. 24.

The mapping processing section 341 in FIG. 25 is made up of an equidistant cylindrical image generation section 361, a screen division section 362, and a down-conversion section 363.

The equidistant cylindrical image generation section 361 in the mapping processing section 341 causes the sphere 280 to be mapped with the captured images supplied from the stitching processing section 151 in FIG. 24, thereby generating the image 301 of the mapped sphere 280 by equidistant cylindrical projection. The equidistant cylindrical image generation section 361 supplies the image 301 to the screen division section 362.

The screen division section 362 divides the image 301 fed from the equidistant cylindrical image generation section 361 vertically into three images: top image 311, middle image, and bottom image 312. The screen division section 362 further divides the middle image horizontally into four images 313 to 316. The screen division section 362 supplies the images 311 to 316 to the down-conversion section 363.

The down-conversion section 3613 (conversion section) down-converts the images 311 and 312 fed from the screen division section 362 to generate the low-resolution top image 321 and low-resolution bottom image 322, respectively. The down-conversion section 363 supplies the down-conversion section 153 and division section 342 in FIG. 24 with the celestial sphere image 320 constituted by the low-resolution top image 321 and low-resolution bottom image 322 thus generated and by the images 313 to 316 fed from the screen division section 362.

According to new equidistant cylindrical projection, as described above, the celestial sphere image 320 is generated by equidistant cylindrical projection using the image 301 of the sphere 280 mapped with the captured images. As with the celestial sphere image 90 generated by equidistant cylindrical projection, the coordinate transformation of the celestial sphere image 320 is accomplished easily according to new equidistant cylindrical projection. The celestial sphere image 320 is thus amenable to ordinary encoding methods for processing rectangular images.

According to new equidistant cylindrical projection, the images 311 and 312 are down-converted. That means the celestial sphere image 320 has fewer pixels than the celestial sphere image 90, which reduces the load of the decoding process involved. It is also possible to suppress the increase in pixel density near the upper and lower poles of the sphere 280 mapped with the celestial sphere image 320. Furthermore, the celestial sphere image 320 mapped near the upper and lower poles of the sphere 280 is prevented from being assigned numerous bits when encoded. The entire celestial sphere image 320 is thus encoded at the same bit rate. This improves the image quality of the celestial sphere image 320.

Also according to new equidistant cylindrical projection, the number of the planes corresponding to the visual line vector is the same three as when the celestial sphere image is generated by cube mapping. Compared with the case where the celestial sphere image is generated by equidistant cylindrical projection with four planes corresponding to the visual line vector, the number of the encoders and that of the decoders are reduced.

According to new equidistant cylindrical projection, the low-resolution top image 321, images 313 to 316, and low-resolution bottom image 322 of the planes 281 to 286 making up the celestial sphere image 320 have the same number of pixels. That means the load of the decoding process on the planes 281 to 286 is substantially the same. This suppresses the fluctuations in the load of the decoding process attributable to the fluctuations in the visual line vector.

It was explained above that the middle plane of the sphere 280 mapped with images is divided in such a manner that the image front 291 is positioned at the center on the boundary between the divided planes 284 and 285 and that the back 292 is positioned at the center on the boundary between the divided planes 283 and 286. Alternatively, the middle plane of the sphere 280 may be divided in such a manner that neither the front 291 nor the back 292 is positioned at the center on the boundary between the divided planes.

(Another Example of the Method of Dividing the Middle Plane of the Sphere)

Figure 26:
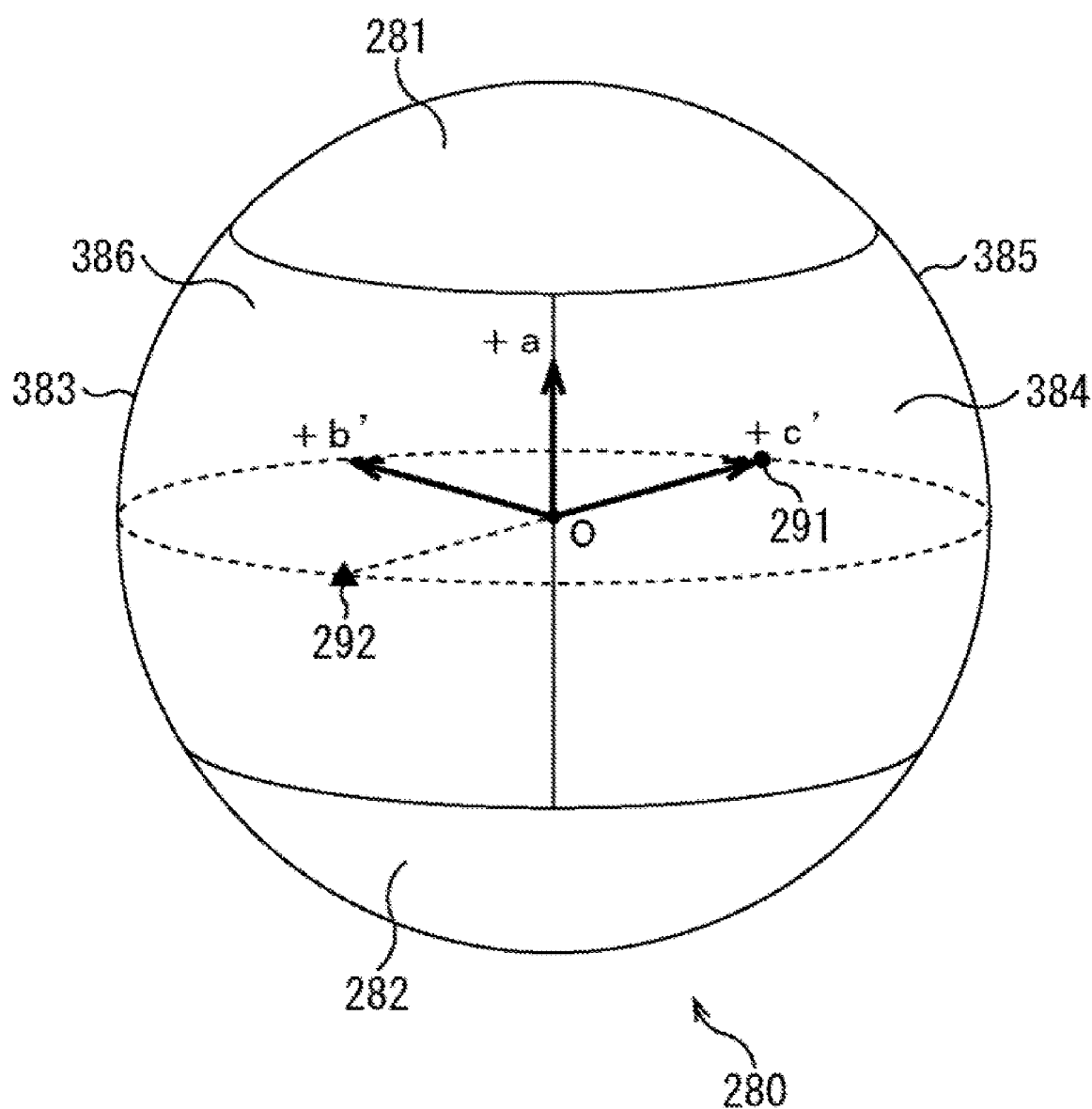
FIG. 26 is a schematic view depicting another typical sphere as a 3D model to which images are mapped by new equidistant cylindrical projection.

FIG. 26 is a schematic view depicting another typical sphere 280 of which the middle plane is divided in such a manner that the front 291 and the back 292 are positioned at the respective centers of the divided planes.

Of the portions depicted in FIG. 26, those that are the same as in FIG. 20 are assigned the same reference numerals.

In the example of FIG. 26, the surface of the sphere 280 is divided into a plane 281, a middle plane, and a plane 282. The middle plane is further divided into four planes 383 to 386 in such a manner that the front 291 is positioned at the center of the plane 385 and that the back 292 is positioned at the center of the plane 386.

In this description, an axis that passes through origin O as the center of the sphere 280 and through the centers of the planes 383 and 384 is called the b' axis, and an axis that passes through the centers of the planes 385 and 386 is called the c' axis. The plane 383 such that b'=r where r denotes the distance from the origin O to each of the planes 282, 282, and 383 to 386 is called the +b' plane 383; the plane 384 such that b'=−r is called the −b' plane 384; the plane 385 such that c'=r is called the +c' plane 385; and the plane 386 such that c'=−r is called the −c' plane 386 as needed.

On the sphere 280 in FIG. 26, the +a plane 281 is opposed to the −a plane 282; the +b' plane 383 to the −b' plane 384; and the +c' plane 385 to −c' plane 386. The front 291 is positioned at the center of the +c' plane 385. The back 292 is positioned at the center of the −c' plane 386.

(Another Example of the Celestial Sphere Image Generated by New Equidistant Cylindrical Projection)

Figure 27:
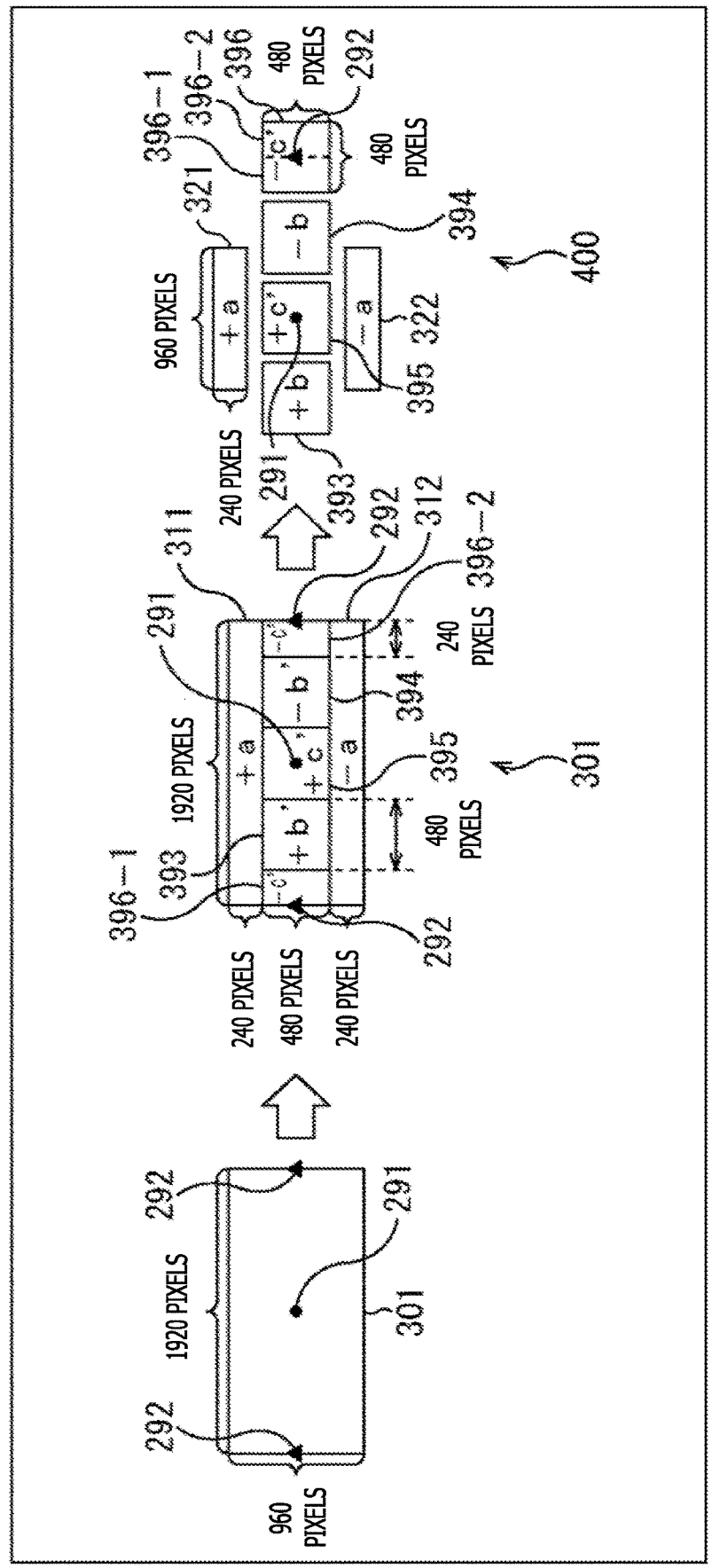
FIG. 27 is a schematic view explanatory of another typical celestial sphere image generated by new equidistant cylindrical projection.

FIG. 27 is a schematic view explanatory of a typical celestial sphere image generated when captured omnidirectional images are mapped to the sphere 280 in FIG. 26.

Of the portions depicted in FIG. 27, those that are the same as in FIG. 21 are assigned the same reference numerals.

As depicted on the left side of FIG. 27, when the sphere 280 in FIG. 26 is mapped with captured omnidirectional images according to new equidistant cylindrical projection, the image 301 is first generated in the same manner as in FIG. 21. As depicted in the middle of FIG. 27, the image 301 is divided vertically into three images. Of these images, the top image is the image 311 of the +a plane 283 and the bottom image is the image 312 of the −a plane 282. The middle image is then divided at one-eighth of the entire horizontal distance from each of the right and left edges. The middle portion between the two divided portions at the edges is further trisected horizontally. In this case, the leftmost image is a right-half image 396-1 of the −c' plane 386 (first divided middle image); the second image from left is an image 393 of the +b' plane 383 (third divided middle image); the third image from left is an image 395 of the +c' plane 385 (fourth divided middle image); the fourth image from left is an image 394 of the −b' plane 384 (fifth divided middle image); and the rightmost image is a left-half image 396-2 of the −c' plane 386 (second divided middle image).

That is, the middle images in the image 301 of FIG. 27 are obtained by shifting right the middle images in the image 301 of FIG. 21 by one-eighth of the entire horizontal distance.

As described above, when the sphere 280 in FIG. 26 is mapped with captured omnidirectional images, the image 396 of the −c' plane 386 amid the image 301 is divided horizontally into the images 396-1 and 396-2 disposed as depicted. The front 291 is positioned at the center of the image 395. The back 292 is positioned at the center of the left edge of the image 396-1 and at the center of the right edge of the image 396-2. In the example of FIG. 27, the images 393 to 395 are each made up of 480 pixels by 480 pixels, and the images 396-1 and 396-2 are each formed by 240 pixels by 480 pixels.

Next, as depicted on the right side of FIG. 27, the image 311 and 312 in the image 301 are down-converted in such a manner that their resolution in the horizontal direction is halved. Thus, the low-resolution top image 321, the low-resolution bottom image 322, and the images 393 to 396 are each given the same number of pixels, i.e., 230, 400 pixels (=480×480=960×240).

As a result of the above process, the low-resolution top image 321, the low-resolution bottom image 322, and the images 393 to 396 are generated to constitute a celestial sphere image 400. In the celestial sphere image 400, the front 291 is positioned at the center of the +c' plane 395 and the back 292 is positioned at the center of the −c' plane 396. Consequently, the front 291 is prevented from the deterioration of image quality resulting from the image quality deterioration incurred on the boundaries of the images 393 to 396 in the decoded celestial sphere image 400. This minimizes the deterioration of image quality of the celestial sphere image 400.

That is, the images 393 to 396 are encoded independently. According to compression encoding methods such as AVC or HEVC by which information is compressed by chronological motion compensation, when a moving target object moves over the screen, a manifestation of compression distortion propagates from frame to frame while maintaining a certain shape. When the screen is divided and the divided images are independently encoded, the motion compensation is not performed across the boundaries between the images. That means the compression distortion tends to manifest itself conspicuously on the boundaries. As a result, the images divided from a moving image reveal, when decoded, streaks resulting from the varying manifestation of compression distortion on the boundaries of the divided images. This phenomenon is known to occur between slices in AVC and between tiles in HEVC.

It follows that image quality is liable to deteriorate on the boundaries of the decoded images 393 to 396. In the celestial sphere image 400, however, the front 291 that is most likely to be viewed by the user is not positioned on the boundaries of the images 393 to 396. With no apparent image quality deterioration at the front 291, the deterioration of image quality of the celestial sphere image 400 remains inconspicuous.

Figure 28:
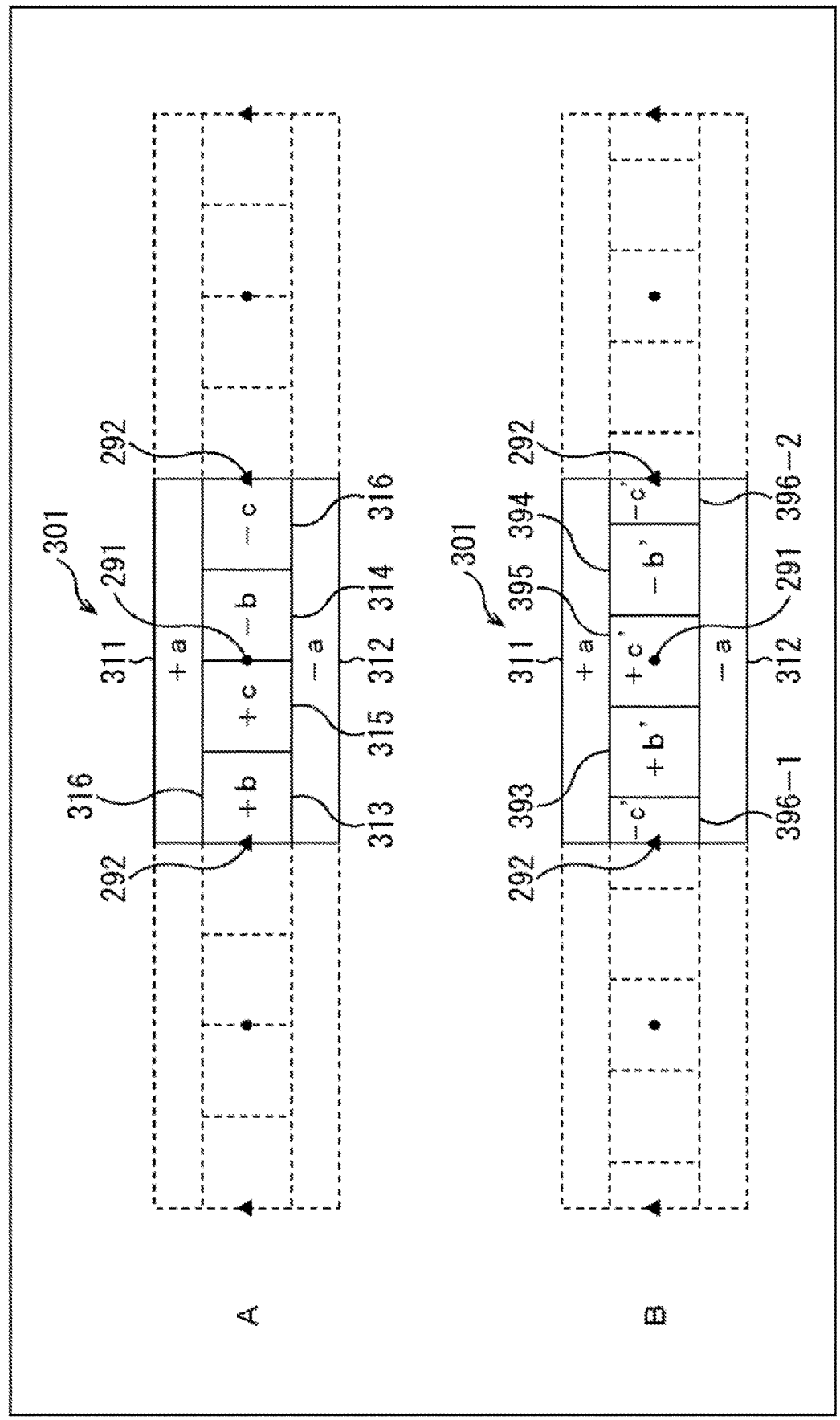
FIG. 28 is a schematic view explanatory of the continuity of a celestial sphere image.

The image 301 in FIGS. 21 and 28 is generated by equidistant cylindrical projection. That means the right edge of the image 301 is continued to the left edge of the image as depicted in A and B in FIG. 28. If the position corresponding to the visual line vector over the image 301 moves rightward beyond the right edge of the image 301, that position moves to the left edge of the image 301. That is, the image 301 is virtually continuous in the horizontal direction.

In the second embodiment, the high-resolution images alone may be encoded. In this case, the encoded streams of the high-resolution images of all planes may be decoded. Alternatively, only the encoded streams of the high-resolution images of the planes corresponding to the visual line vector may be decoded.

Third Embodiment (Typical Configuration of the Image Display System as the Third Embodiment)

FIG. 29 is a block diagram depicting a typical configuration of an image display system as the third embodiment of the present disclosure.

Of the components depicted in FIG. 29, those that are the same as in FIG. 9 are assigned the same reference numerals. Redundant explanations of the components are omitted hereunder where appropriate.

An image display system 470 in FIG. 29 is configured differently from the image display system 130 in FIG. 9 in that a home server 471 and a display unit 472 replace the home server 133 and the head-mounted display 135, respectively, that the converter 134 is omitted, and that a controller 473 is provided.

In the image display system 370, the user operates the controller 473 to input the user's position and visual line vector. The display unit 472 displays a display image reflecting the input position and visual line vector.

Specifically, the home server 471 in the image display system 370 receives six high-resolution encoded streams and one low-resolution encoded stream sent from the content server 132. The home server 471 receives instructions regarding the user's position and visual line vector from the controller 473.

As with the home server 133 in FIG. 9, the home server 471 determines, from among the planes 11 to 16, three planes corresponding to the user's visual line vector used as the basis for the determination. The home server 471 selectively decodes, from the six high-resolution encoded streams, three high-resolution encoded streams of the planes corresponding to the user's visual line vector. The home server 471 also decodes one low-resolution encoded stream.

As with the home server 133, the home server 471 determines the user's field of view based on the user's position and visual line vector. The home server 471 generates an image of the user's field of view as the display image based on the high-resolution and low-resolution images obtained by decoding. The home server 471 transmits the display image to the display unit 472 through the HDMI cable, not depicted.

The display unit 472 displays the display image supplied from the home server 471.

The controller 473 includes operation buttons and other controls. When the user inputs the position and visual line vector of the user typically by operating operation buttons, the controller 473 receives the input. The controller 473 instructs the home server 471 accordingly on the user's position and visual line vector.

Incidentally, the controller 473 and the display unit 472 may be formed integrally. The integrated entity may constitute a mobile terminal such as a mobile phone or a tablet terminal, or part of a personal computer. The controller 473 may include a gyro sensor, an acceleration sensor, and a geomagnetic sensor. The user's visual line vector may then be determined on the basis of the results of detection by these sensors.

(Explanation of the Methods for Generating the Celestial Sphere Images Corresponding to High-Resolution and Low-Resolution Images)

FIG. 30 is a schematic view explanatory of methods for generating celestial sphere images corresponding to high-resolution and low-resolution images in the image display system embodying the present disclosure.

In the first through the third embodiments of the present disclosure, high-resolution and low-resolution images are generated from the same celestial sphere image 30 (320, 400) generated by cube mapping. Alternatively, the high-resolution and low-resolution images may be generated from celestial sphere images generated by different methods. As another alternative, the celestial sphere image used for generating the high-resolution and low-resolution images may be generated by equidistant cylindrical projection.

That is, as depicted in FIG. 30, there may be seven patterns in which to combine the method for generating the celestial sphere image corresponding to the high-resolution images and the method for generating the celestial sphere image corresponding to the low-resolution image in the image display system embodying the present disclosure.

Specifically, according to the first pattern, the method for generating the celestial sphere image corresponding to the high-resolution images is cube mapping, and the method for generating the celestial sphere image corresponding to the low-resolution image is equidistant cylindrical projection. In this case, the method for generating the celestial sphere image corresponding to the low-resolution image is equidistant cylindrical projection, so that the image display system of the present disclosure is compatible with an existing image display system that encodes the celestial sphere image generated by equidistant cylindrical projection into one encoded stream. Also, because the method for generating the celestial sphere image corresponding to the high-resolution images is cube mapping, the pixel density throughout the high-resolution images making up the cube image is substantially constant. As a result, the display image has good image quality.

According to the second pattern, the method for generating the celestial sphere image corresponding to the high-resolution images and the method for generating the celestial sphere image corresponding to the low-resolution image are both cube mapping. As such, the second pattern is applicable to the first and the third embodiments. In this case, the pixel density throughout the cube image is substantially constant, so that the display image has good image quality.

According to the third pattern, the method for generating the celestial sphere image corresponding to the high-resolution images and the method for generating the celestial sphere image corresponding to the low-resolution image are both equidistant cylindrical projection. In this case, the image display system 130 (370) of the present disclosure is compatible with an existing image display system that encodes into one encoded stream the celestial sphere image generated by equidistant cylindrical projection.

According to the fourth pattern, the method for generating the celestial sphere image corresponding to the high-resolution images is equidistant cylindrical projection, and the method for generating the celestial sphere image corresponding to the low-resolution image is cube mapping.

According to the fifth pattern, the method for generating the celestial sphere image corresponding to the high-resolution images is cube mapping, and the method for generating the celestial sphere image corresponding to the low-resolution image is new equidistant cylindrical projection. In this case, the pixel density throughout the cube image is substantially constant, so that the display image has good image quality.

According to the sixth pattern, the method for generating the celestial sphere image corresponding to the high-resolution images and the method for generating the celestial sphere image corresponding to the low-resolution image are both new equidistant cylindrical projection. As such, the sixth pattern is applicable to the second embodiment of the present disclosure. In this case, the pixel density throughout the cube image is substantially constant, so that the display image has good image quality.

According to the seventh pattern, the method for generating the celestial sphere image corresponding to the high-resolution images is new equidistant cylindrical projection, and the method for generating the celestial sphere image corresponding to the low-resolution image is cube mapping. In this case, the pixel density throughout the cube image is substantially constant, so that the display image has good image quality.

In the fifth and the seventh patterns, cube mapping may be replaced by equidistant cylindrical projection.

FIG. 31 is a schematic view depicting an image of a sphere mapped by the home server where the methods for generating the celestial sphere image corresponding to the high-resolution and low-resolution images constitute the first pattern.

According to the first pattern, the celestial sphere image corresponding to the low-resolution image is the celestial sphere image 90 generated by equidistant cylindrical projection. Thus, as depicted in FIG. 31, a low-resolution image 501 down-converted from the celestial sphere image 90 is first mapped to the sphere 70. The images 31, 34, and 36 corresponding to the user's visual line direction are superimposed onto the sphere 70 mapped with the low-resolution image 501 for mapping, which generates a sphere image 500. The sphere image 500 is used to generate the display image.

The image display system using the first pattern is the same as the image display system 130, except that the celestial sphere image 30 is generated as a celestial sphere image for the high-resolution images and that the celestial sphere image 90 is generated as a celestial sphere image for the low-resolution image.

The image display system using the third pattern is the same as the image display system 130, except that the celestial sphere image 30 replaces the celestial sphere image 90, that the celestial sphere image 90 is divided into the images 91 to 98 of eight planes 71 to 78, and that there are nine encoders and five decoders.

The image display system using the fourth pattern is the same as the image display system 130, except that the celestial sphere image 90 is generated as a celestial sphere image for the high-resolution images, that the celestial sphere image 30 is generated as a celestial sphere image for the low-resolution image, that the celestial sphere image 90 is divided into the images 91 to 98 of eight planes 71 to 78, and that there are nine encoders and five decoders.

The image display system using the fifth pattern is the same as the image display system 130, except that the celestial sphere image 30 is generated as a celestial sphere image for the high-resolution images and that the celestial sphere image 320 (400) is generated for the low-resolution image.

The image display system using the seventh pattern is the same as the image display system as the second embodiment, except that the celestial sphere image 320 (400) is generated as a celestial sphere image for the high-resolution images and that the celestial sphere image 30 is generated as a celestial sphere image for the low-resolution image.

Fourth Embodiment (Explanation of the Computer to which the Present Disclosure is Applied)

The series of steps or processes described above in conjunction with the content server 132 (340) and home server 133 (471) may be executed either by hardware or by software. Where these steps or processes are to be carried out by software, the programs constituting the software are installed into a suitable computer. Variations of the computer include one with the software installed beforehand in its dedicated hardware, and a general-purpose personal computer or like equipment capable of executing diverse functions based on the programs installed therein.

FIG. 32 is a block diagram depicting a typical hardware structure of a computer that executes the above-described series of steps or processes using programs.

In a computer 900, a central processing unit (CPU) 901, a read-only memory (ROM) 902, and a random access memory (RAM) 903 are interconnected by a bus 904.

The bus 904 is further connected with an input/output interface 905. The input/output interface 905 is connected with an input section 906, an output section 907, a storage section 908, a communication section 909, and a drive 910.

The input section 906 may be formed by a keyboard, a mouse, and a microphone. The output section 907 may be made up of a display unit and speakers. The storage section 908 may be constituted by a hard disk or a nonvolatile memory. The communication section 909 may be made of a network interface. The drive 910 drives removable media 911 such as magnetic disks, optical disks, magneto-optical disks, or semiconductor memories.

In the computer 900 structured as described above, the CPU 901 performs the above-mentioned steps or processes by having the PAM 903 loaded with programs from the storage section 908 via the input/output interface 905 and bus 904 and by executing the loaded programs.

The programs to be executed by the computer 900 (CPU 901) may be offered recorded on the removable media 911 typically provided as package media. The programs may also be offered transmitted via wired or wireless media such as local area networks, the Internet, or digital satellite broadcasts.

In the computer 900, the programs may be installed via the input/output interface 905 into the storage section 908 from the removable media 911 loaded in the drive 910. The programs may alternatively be installed into the storage section 908 after being received by the communication section 909 via wired or wireless media. As another alternative, the programs may be preinstalled in the ROM 902 or in the storage section 908.

The programs to be executed by the computer 900 may be processed chronologically, i.e., in the sequence depicted in this description; in parallel, or in otherwise appropriately timed fashion such as when they are invoked as needed.

In this description, the term "system" refers to an aggregate of multiple components (devices or modules (parts)). It does not matter whether all components are housed in the same enclosure. Thus, a system may be configured with multiple devices housed in separate enclosures and interconnected via a network, as well as with a single device that houses multiple modules in a single enclosure.

The advantageous effects mentioned in this description are only examples and not limitative of the present disclosure that will also provide other advantages.

The present disclosure is not limited to the above-described embodiments that may be varied or modified diversely within the spirit and scope of the disclosure.

For example, the high-resolution images need not to be converted to the low-resolution images in such a manner that the resulting resolution is one-fourth of the original resolution. The resolution of the high-resolution images need only be higher than that of the low-resolution images. The high-resolution images may be generated by converting the resolution of the celestial sphere image. The captured images may be still images or moving images. The 3D model is not limited to a sphere or a cube; it may be a regular polyhedron such as a regular dodecahedron or an icosahedron.

The content server 132 (340) may transmit the encoded streams in real time to the home server 133 (471) without recording them. The encoders 156-1 to 156-6 may be disposed outside the content server 132 (340).

It was explained above that there are two resolutions for the encoded streams. Alternatively, there may be three or more resolutions for the encoded streams.

For example, if there are three resolutions, the planes of the 3D model are divided more finely than into the planes 11 to 16 (e.g., planes 71 to 78, planes 281 to 286, planes 281 and 282, and planes 383 to 386). For each of the planes divided more finely than the planes 11 to 16 (e.g., planes 71 to 78, planes 281 to 286, planes 281 and 282, and planes 383 to 386), the celestial sphere image 30 (90, 320, 400) is divided into high-resolution images before being encoded. The images 31 to 36 (e.g., images 91 to 98, low-resolution top image 321, low-resolution bottom image 322, and images 313 to 316 (393 to 396)) are each down-converted into a medium-resolution image before being encoded. The celestial sphere image 30 (90) is down-converted into an image with a resolution lower than the medium-resolution image before being encoded. The planes corresponding to the high-resolution images are then selected as the planes corresponding to the visual line vectors.

The 3D model to be mapped upon when the celestial sphere image is generated may be different in size from the 3D model to be mapped upon generation of the display image.

The 3D model to which the low-resolution and high-resolution images are mapped upon generation of the display image may be different from the 3D model to which the low-resolution image is mapped, provided the former 3D model includes the latter 3D model.

In the third embodiment, the display unit 472 may be dome-shaped. In this case, the home server 471 may generate the images of all planes 11 to 16 as the display images.

The present disclosure may be configured as a cloud computing setup in which a single function is processed cooperatively by multiple networked devices on a shared basis.

Each of the steps discussed in reference to the above-described flowcharts may be executed either by a single device or by multiple devices on a shared basis.

If a single step includes multiple processes, these processes may be executed either by a single device or by multiple devices on a shared basis.

The present disclosure may be configured as follows:

(1)

An image processing device including:

a first encoding section configured to encode a first celestial sphere image of a model formed by images of a plurality of planes generated from omnidirectional images, the encoding being performed plane by plane at a first resolution, to generate a first encoded stream corresponding to each of the planes; and a second encoding section configured to encode, at a second resolution, a second celestial sphere image generated from the omnidirectional images to generate a second encoded stream.

(2)

The image processing device as stated in paragraph (1) above, in which the first and the second celestial sphere images are generated by different methods.

(3)

The image processing device as stated in paragraph (2) above, in which the first celestial sphere image is generated by cube mapping, and the second celestial sphere image is generated by equidistant cylindrical projection.

(4)

The image processing device as stated in any one of paragraphs (1) to (3) above, in which the first encoding section is configured to generate the first encoded streams in such a manner that the first encoded streams of the opposed pairs of the planes are synchronized in randomly accessible positions.

(5)

The image processing device as stated in any one of paragraphs (1) to (4) above, in which the first encoding section is configured to generate the first encoded streams in such a manner that the first encoded streams are arranged into a closed GOP structure.

(6)

The image processing device as stated in any one of paragraphs (1) to (5) above, further including:

a conversion section configured to convert the resolution of the second celestial sphere image to the second resolution.

(7)

The image processing device as stated in any one of paragraphs (1) to (6) above, further including:

a storage section configured to store the first and the second encoded streams.

(8)

The image processing device as stated in paragraph (7) above, further including:

a delivery section configured to deliver the first and the second encoded streams stored in the storage section to a terminal that decodes the first and the second encoded streams.

(9)

The image processing device as stated in any one of paragraphs (1) to (8) above, in which the first encoding section is configured to generate the first encoded streams in accordance with the Advanced Video Coding/H.264 standard or the High Efficiency Video Coding/H.265 standard, and the second encoding section generates the second encoded stream in accordance with the Advanced Video Coding/264 standard or the High Efficiency Video Coding/H.265 standard.

(10)

An image processing method including:

a first encoding step by an image processing device of encoding a first celestial sphere image of a model formed by images of a plurality of planes generated from omnidirectional images, the encoding being performed plane by plane at a first resolution, to generate a first encoded stream corresponding to each of the planes; and a second encoding step by the image processing device of encoding, at a second resolution, a second celestial sphere image generated from the omnidirectional images to generate a second encoded stream.

(11)

An image processing device including:

a decoding section configured to decode, with respect to a first encoded stream generated by dividing a first celestial sphere image of a model formed by images of a plurality of planes generated from omnidirectional images into the planes and encoding the image plane by plane at a first resolution and a second encoded stream generated by encoding a second celestial sphere image generated from the omnidirectional images at a second resolution, the first encoded stream corresponding to one of each opposed pair of the planes to generate the first celestial sphere image of the corresponding plane at the first resolution.

(12)

The image processing device as stated in paragraph (11) above, in which the decoding section decodes the second encoded stream to generate the second celestial sphere image at the second resolution.

(13)

The image processing device as stated in paragraph (11) or (12) above, further including:

a selection section configured to select one of each opposed pair of the planes in accordance with a visual line direction of a user, in which the decoding section decodes the first encoded stream corresponding to the plane selected by the selection section.

(14)

The image processing device as stated in paragraph (13) above, further including:

a rendering section configured to generate an image of a field of view based on the visual line direction by use of the first celestial sphere image of one of each opposed pair of the planes generated by the decoding section at the first resolution and the second celestial sphere image generated by the decoding section at the second resolution.

(15)

The image processing device as stated in any one of paragraphs (11) to (14) above, in which the first and the second celestial sphere images are generated by different methods.

(16)

The image processing device as stated in paragraph (15) above, in which the first celestial sphere image is generated by cube mapping, and the second celestial sphere image is generated by equidistant cylindrical projection.

(17)

The image processing device as stated in any one of paragraphs (11) to (16) above, in which the first encoded streams of the opposed pairs of the planes are synchronized in randomly accessible positions.

(18)

The image processing device as stated in any one of paragraphs (11) to (17) above, in which the first encoded streams are arranged into a closed GOP structure.

(19)

The image processing device as stated in any one of paragraphs (11) to (18) above, in which the decoding section includes a first decoding section configured to decode the first encoded streams, and a second decoding section configured to decode the second encoded stream.

(20)

An image processing method including:

a decoding step by an image processing device of decoding, with respect to a first encoded stream generated by dividing a first celestial sphere image of a model formed by images of a plurality of planes generated from omnidirectional images into the planes and encoding the image plane by plane at a first resolution and a second encoded stream generated by encoding a second celestial sphere image generated from the omnidirectional images at a second resolution, the first encoded stream corresponding to one of each opposed pair of the planes to generate the first celestial sphere image of the corresponding plane at the first resolution.

REFERENCE SIGNS LIST

10 Cube
11 to 16 Plane
30 Celestial sphere image
132 Content server
133 Home server
154, 156-1 to 156-6 Encoder
223, 225-1 to 225-3 Decoder
227 Rendering section
229 Visual line detection section
301, 311 to 316 Image
320 Celestial sphere image
321. Low-resolution top image
340 Content server
322 Low-resolution bottom image
362 Screen division section
363 Down-conversion section
471 Home server

The invention claimed is:

1. An image processing device comprising:
a mapping processing section configured to
generate a first celestial sphere image of a model formed by images generated from omnidirectional images, by cube mapping the images to six planes constituting a cube, and
generate, by equidistant cylindrical projection, a second celestial sphere image of the model;
a dividing section configured to divide the first celestial sphere image into images of the six planes, the images of the six planes constituting an entirety of the first celestial sphere image;
a first encoding section configured to encode each of the images of the six planes at a first resolution to generate first encoded streams corresponding to respective planes of the six planes; and
a second encoding section configured to encode, at a second resolution, an entirety of the second celestial sphere image generated from the omnidirectional images to generate a second encoded stream corresponding to the entirety of the second celestial sphere image, the first resolution being higher than the second resolution, wherein a respective axis intersects perpendicularly with each opposed pair of planes of the six planes, wherein, for each opposed pair of planes of the six planes, the first encoding section is further configured to generate the first encoded streams in such a manner that the first encoded stream of one plane of the opposed pair of planes is synchronized with the first encoded stream of another plane of the opposed pair of planes in randomly accessible positions, and wherein the mapping processing section, the dividing section, the first encoding section, and the second encoding section are each implemented via at least one processor.

2. The image processing device according to claim 1, wherein
the first encoding section is further configured to generate the first encoded streams in such a manner that the first encoded streams are arranged into a closed group-of-pictures structure.

3. The image processing device according to claim 1, further comprising:
a conversion section configured to convert a resolution of the second celestial sphere image to the second resolution,
wherein the conversion section is implemented via at least one processor.

4. The image processing device according to claim 1, further comprising:
a computer-readable storage medium configured to store the first encoded streams and the second encoded stream.

5. The image processing device according to claim 4, further comprising:
a delivery section configured to deliver the first encoded streams and the second encoded stream stored in the computer-readable storage medium to a terminal that decodes the first encoded streams and the second encoded stream,
wherein the delivery section is implemented via at least one processor.

6. The image processing device according to claim 1, wherein
the first encoding section is further configured to generate the first encoded streams in accordance with Advanced Video Coding/H.264 standard or High Efficiency Video Coding/H.265 standard, and
the second encoding section is further configured to generate the second encoded stream in accordance with the Advanced Video Coding/H.264 standard or the High Efficiency Video Coding/H.265 standard.

7. An image processing method comprising:
generating a first celestial sphere image of a model formed by images generated from omnidirectional images, by cube mapping the images to six planes constituting a cube;
generating, by equidistant cylindrical projection, a second celestial sphere image of the model;
dividing the first celestial sphere image into images of the six planes, the images of the six planes constituting an entirety of the first celestial sphere image;
encoding, by an image processing device, each of the images of the six planes at a first resolution to generate first encoded streams corresponding to respective planes of the six planes; and
encoding, by the image processing device, at a second resolution, an entirety of the second celestial sphere image generated from the omnidirectional images to generate a second encoded stream corresponding to the entirety of the second celestial sphere image, the first resolution being higher than the second resolution, wherein a respective axis intersects perpendicularly with each opposed pair of planes of the six planes, and wherein, for each opposed pair of planes of the six planes, the first encoded streams are generated in such a manner that the first encoded stream of one plane of the opposed pair of planes is synchronized with the first encoded stream of another plane of the opposed pair of planes in randomly accessible positions.

8. An image processing device comprising:
a decoding section configured to:
decode, with respect to first encoded streams generated by
dividing a first celestial sphere image of a model, formed by images generated from omnidirectional images by cube mapping the images to six planes constituting a cube, into images of the six planes, the images of the six planes constituting an entirety of the first celestial sphere image, and
encoding each of the images of the six planes at a first resolution to generate the first encoded streams corresponding to respective planes of the six planes; and
decode a second encoded stream corresponding to an entirety of a second celestial sphere image generated by equidistant cylindrical projection, the second encoded stream being generated by encoding the entirety of the second celestial sphere image generated from the omnidirectional images at a second resolution to generate the second encoded stream corresponding to the entirety of the second celestial sphere image, the first resolution being higher than the second resolution, wherein a respective axis intersects perpendicularly with each opposed pair of planes of the six planes, wherein, for each opposed pair of planes of the six planes, the first encoded streams are generated in such a manner that the first encoded stream of one plane of the opposed pair of planes is synchronized with the first encoded stream of another plane of the opposed pair of planes in randomly accessible positions, and wherein the decoding section is implemented via at least one processor.

9. The image processing device according to claim 8, wherein
the decoding section decodes the second encoded stream to generate the second celestial sphere image at the second resolution.

10. The image processing device according to claim 9, further comprising:
a selection section configured to select one plane of each opposed pair of the six planes in accordance with a visual line direction of a user,
wherein the decoding section decodes one stream of the first encoded streams corresponding to the one plane selected by the selection section, and
wherein the selection section is implemented via at least one processor.

11. The image processing device according to claim 10, further comprising:
a rendering section configured to generate an image of a field of view based on the visual line direction by use of the first celestial sphere image of the one plane of each opposed pair of the six planes generated by the decoding section at the first resolution and the second celestial sphere image generated by the decoding section at the second resolution,
wherein the rendering section is implemented via at least one processor.

12. The image processing device according to claim 8, wherein
the first encoded streams are arranged into a closed group-of-pictures structure.

13. The image processing device according to claim 8, wherein
the decoding section includes
a first decoding section configured to decode the first encoded streams, and
a second decoding section configured to decode the second encoded stream,
wherein the first decoding section and the second decoding section are each implemented via at least one processor.

14. An image processing method comprising:
decoding, by an image processing device, with respect to first encoded streams generated by
dividing a first celestial sphere image of a model, formed by images generated from omnidirectional images by cube mapping the images to a model including six planes constituting a cube, into images of the six planes, the images of the six planes constituting an entirety of the first celestial sphere image, and
encoding each of the images of the six planes at a first resolution to generate the first encoded streams corresponding to respective planes of the six planes; and
decoding, by the image processing device, a second encoded stream corresponding to an entirety of a second celestial sphere image generated by equidistant cylindrical projection, the second encoded stream being generated by encoding the entirety of the second celestial sphere image generated from the omnidirectional images at a second resolution to generate the second encoded stream corresponding to the entirety of the second celestial sphere image, the first resolution being higher than the second resolution,
wherein a respective axis intersects perpendicularly with each opposed pair of planes of the six planes, and
wherein, for each opposed pair of planes of the six planes, the first encoded streams are generated in such a manner that the first encoded stream of one plane of the opposed pair of planes is synchronized with the first encoded stream of another plane of the opposed pair of planes in randomly accessible positions.

15. A non-transitory computer-readable medium having embodied thereon a program, which when executed by a computer causes the computer to execute a method, the method comprising:
generating a first celestial sphere image of a model formed by images generated from omnidirectional images, by cube mapping the images to six planes constituting a cube;
generating, by equidistant cylindrical projection, a second celestial sphere image of the model;
dividing the first celestial sphere image into images of the six planes, the images of the six planes constituting an entirety of the first celestial sphere image;
encoding, by an image processing device, each of the images of the six planes at a first resolution to generate first encoded streams corresponding to respective planes of the six planes; and
encoding, by the image processing device, at a second resolution, an entirety of the second celestial sphere image generated from the omnidirectional images to generate a second encoded stream corresponding to the entirety of the second celestial sphere image, the first resolution being higher than the second resolution,
wherein a respective axis intersects perpendicularly with each opposed pair of planes of the six planes, and
wherein, for each opposed pair of planes of the six planes, the first encoded streams are generated in such a manner that the first encoded stream of one plane of the opposed pair of planes is synchronized with the first encoded stream of another plane of the opposed pair of planes in randomly accessible positions.

16. A non-transitory computer-readable medium having embodied thereon a program, which when executed by a computer causes the computer to execute a method, the method comprising:
decoding, by an image processing device, with respect to first encoded streams generated by
dividing a first celestial sphere image of a model, formed by images generated from omnidirectional images by cube mapping the images to a model including six planes constituting a cube, into images of the six planes, the images of the six planes constituting an entirety of the first celestial sphere image, and
encoding each of the images of the six planes at a first resolution to generate the first encoded streams corresponding to respective planes of the six planes; and
decoding, by the image processing device, a second encoded stream corresponding to an entirety of a second celestial sphere image generated by equidistant cylindrical projection, the second encoded stream being generated by encoding the entirety of the second celestial sphere image generated from the omnidirectional images at a second resolution to generate the second encoded stream corresponding to the entirety of the second celestial sphere image, the first resolution being higher than the second resolution,
wherein a respective axis intersects perpendicularly with each opposed pair of planes of the six planes, and
wherein, for each opposed pair of planes of the six planes, the first encoded streams are generated in such a manner that the first encoded stream of one plane of the opposed pair of planes is synchronized with the first encoded stream of another plane of the opposed pair of planes in randomly accessible positions.

* * * * *